United States Patent
Yamauchi et al.

(10) Patent No.: US 6,381,398 B1
(45) Date of Patent: Apr. 30, 2002

(54) APPARATUS AND METHOD OF GENERATING BIT STREAM FOR INFORMATION RECORDING DISC STORAGE WHICH ENABLES SEAMLESS REPRODUCTION OF A PLURALITY OF PIECES OF IMAGE INFORMATION, AND RECORDING MEDIUM ON WHICH PROGRAM APPLIED TO THE GENERATING APPARATUS IS RECORDED

(75) Inventors: Kazuhiko Yamauchi; Tomoyuki Okada; Masayuki Kozuka, all of Osaka; Yasushi Uesaka, Hyogo; Kaoru Murase, Nara, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/101,500

(22) PCT Filed: Nov. 12, 1997

(86) PCT No.: PCT/JP97/04105

§ 371 Date: Jul. 9, 1998

§ 102(e) Date: Jul. 9, 1998

(87) PCT Pub. No.: WO98/21722

PCT Pub. Date: May 22, 1998

(30) Foreign Application Priority Data

Nov. 13, 1996 (JP) .............................. 8-301573

(51) Int. Cl.[7] .................................................. H04N 5/93
(52) U.S. Cl. ............................ 386/52; 386/98; 386/125
(58) Field of Search ................................ 386/4, 52, 54, 386/125, 55, 64, 98, 117, 95; 360/13; 345/328; 369/83

(56) References Cited

U.S. PATENT DOCUMENTS

| 5,940,573 A | * | 8/1999 | Beckwith ..................... 386/54 |
| 6,016,381 A | * | 1/2000 | Taira et al. .................. 386/112 |
| 6,064,796 A | * | 5/2000 | Nakamura et al. ............ 386/95 |
| 6,185,365 B1 | * | 2/2001 | Murase et al. ................ 386/95 |

FOREIGN PATENT DOCUMENTS

| EP | 645721 | 3/1995 |
| EP | 724264 | 7/1996 |
| JP | 7114627 | 5/1995 |
| JP | 8267963 | 10/1996 |
| JP | 8273304 | 10/1996 |

* cited by examiner

Primary Examiner—Andrew B. Christensen
Assistant Examiner—Christopher Onuaku
(74) Attorney, Agent, or Firm—Price and Gess

(57) ABSTRACT

The present invention provides a bitstream generation apparatus that enables an efficient editing of video objects in providing a finished audio video production. Audio and video data is encoded and an elementary encode unit correlates the audio and video data into video objects. The video objects can be assembled by an editing unit into a desired scenario of reproduction. An editor can re-arrange the scenes that are formed by the video objects with the assistance of a correction unit and an interleaving unit that can divide the pieces of audio data and the pieces of video data that form the video objects into new video objects which can be interleaved into the reproduction order of video objects without requiring a re-encoding of the entire set of video objects that constitute sequences of scenes for the audio video product.

6 Claims, 53 Drawing Sheets

FIG. 1 (PRIOR ART)
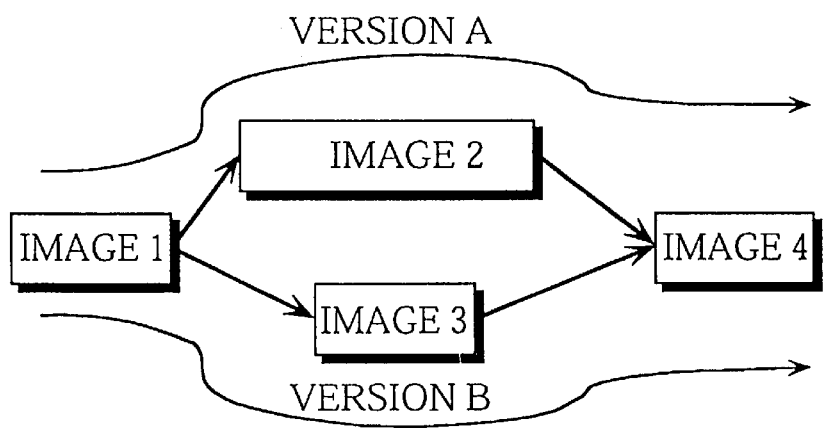
FIG. 2A (PRIOR ART)
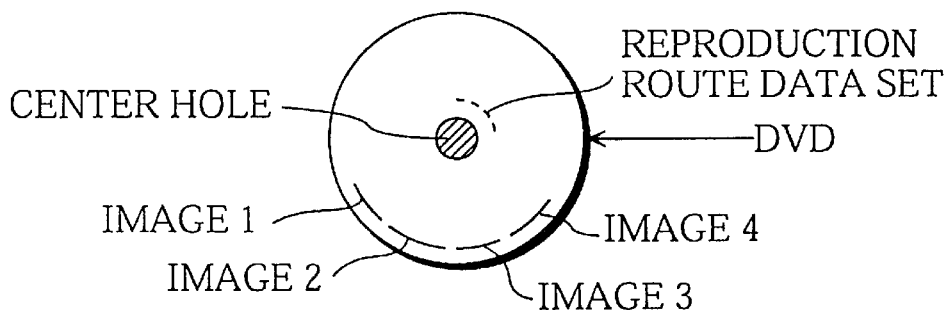
FIG. 2B (PRIOR ART)
REPRODUCTION ROUTE DATA SET
|  | CONTENTS |
|---|---|
| REPRODUCTION ROUTE DATA 1 | REPRODUCE IMAGE 1, REPRODUCE IMAGE 2, AND GO TO IMAGE 4 |
| REPRODUCTION ROUTE DATA 2 | REPRODUCE IMAGE 1, REPRODUCE IMAGE 3, AND GO TO IMAGE 4 |
| ⋮ | ⋮ |

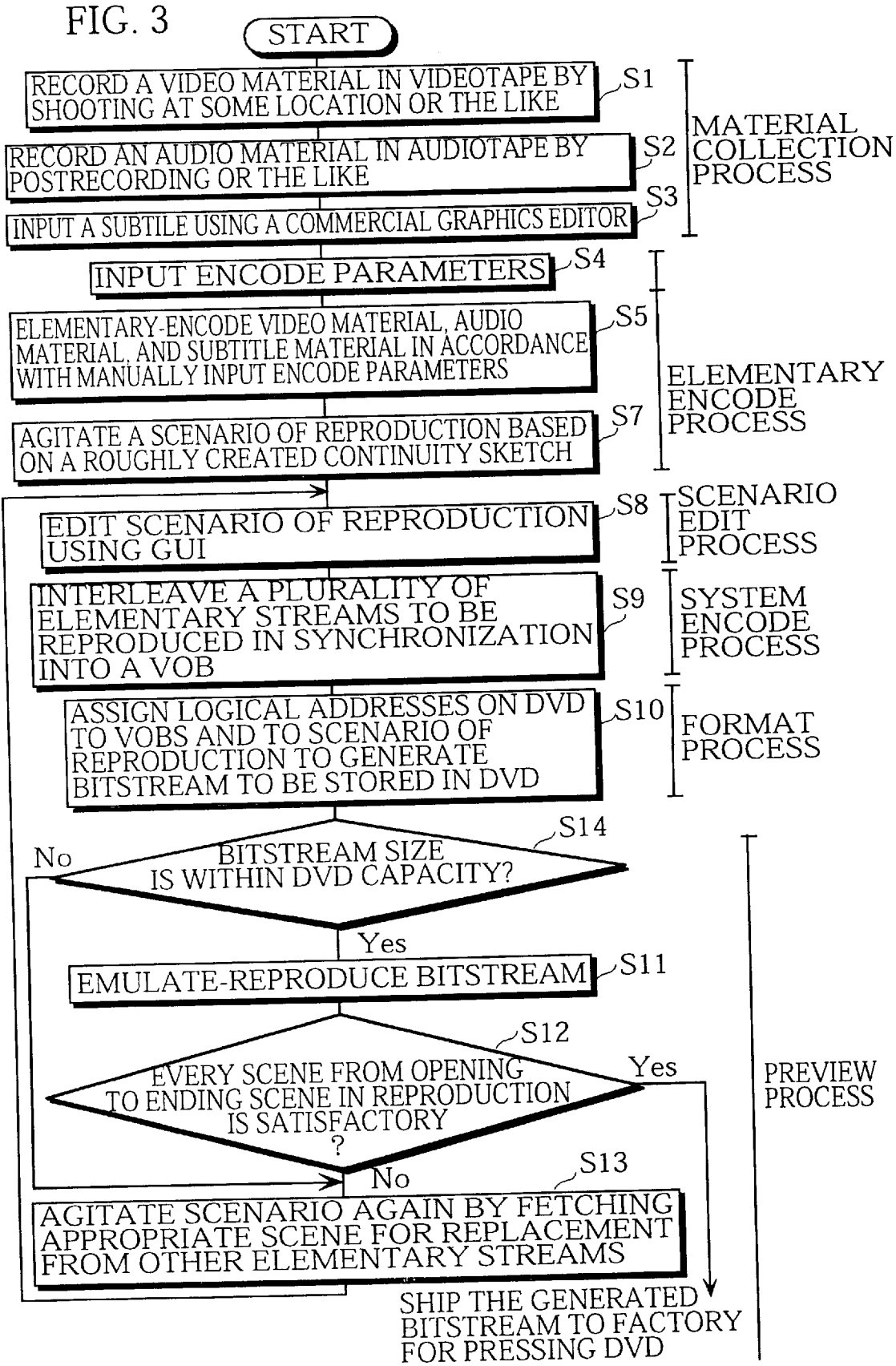

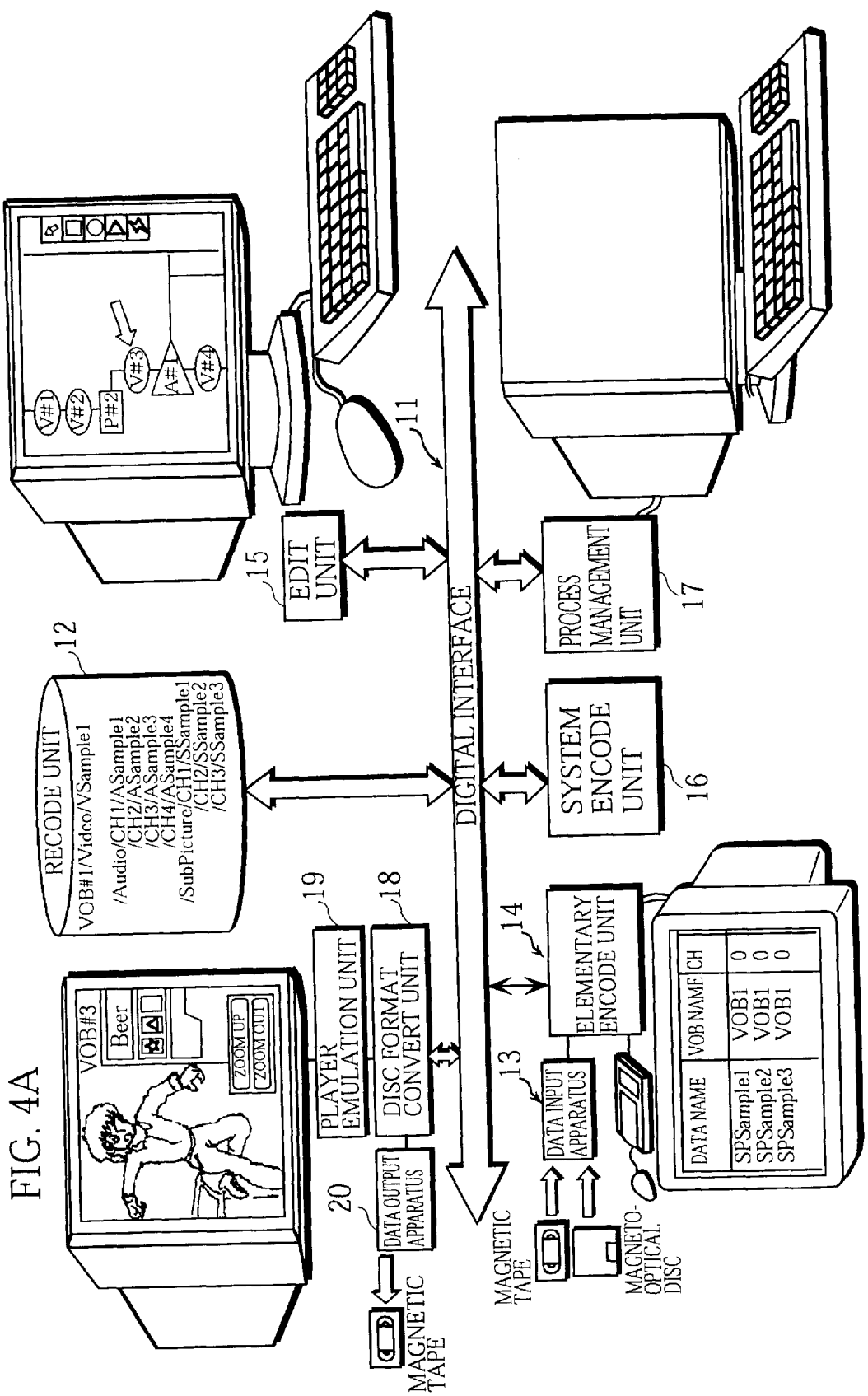

FIG. 5A

| DATA NAME | VOB NAME | SEAMLESS FLAG | START TIME CODE | END TIME CODE | NUMBER OF VOICES | |
|---|---|---|---|---|---|---|
| VSample1 | VOB1 | 0 | 00:12:00:00 | 00:12:10:00 | 2 | ⎫ TEMPORARY |
| VSample2 | VOB2 | 0 | 00:13:32:00 | 00:13:42:04 | 2 | ⎬ REPRODUCTION |
| VSample3 | VOB3 | 0 | 00:14:00:00 | 00:14:20:00 | 4 | ⎭ ORDER |
| PAUSE BETWEEN CONTINUOUS REPRODUCTIONS | | | | | | |
| VSample4 | VOB4 | 1 | 00:00:00:00 | 00:00:10:00 | 4 | ⎫ TEMPORARY |
| VSample5 | VOB5 | 1 | 00:05:11:00 | 00:05:21:00 | 2 | ⎬ REPRODUCTION |
| VSample6 | VOB6 | 1 | 00:06:00:00 | 00:06:10:00 | 2 | ⎭ ORDER |
| PAUSE BETWEEN CONTINUOUS REPRODUCTIONS | | | | | | |
| VSample7 | VOB7 | 0 | 00:15:00:00 | | | |

FIG. 5B

| DATA NAME | VOB NAME | CH | START TIME CODE | END TIME CODE |
|---|---|---|---|---|
| ASample1 | VOB1 | 0 | 00:12:00:35 | 00:12:10:35 |
| ASample1 | VOB2 | 0 | 00:12:10:35 | 00:12:20:35 |
| ASample1 | VOB3 | 0 | 00:12:20:35 | 00:12:30:35 |
| PAUSE BETWEEN CONTINUOUS REPRODUCTIONS | | | | |
| ASample2 | VOB4 | 1 | 00:12:30:35 | 00:12:40:35 |
| ASample2 | VOB5 | 1 | 00:12:40:35 | 00:12:50:35 |
| ASample2 | VOB6 | 1 | 00:12:50:35 | 00:13:00:35 |

FIG. 5C

| DATA NAME | VOB NAME | CH | SYNCHRONIZATION START TIME CODE | SYNCHRONIZATION END TIME CODE |
|---|---|---|---|---|
| SPSample1 | VOB1 | 0 | 00:12:00:35 | 00:12:10:35 |
| SPSample2 | VOB1 | 0 | 00:13:32:00 | 00:13:42:04 |
| SPSample3 | VOB1 | 0 | 00:14:00:00 | 00:14:20:00 |
| SPSample4 | VOB1 | 1 | 00:00:00:35 | 00:00:10:35 |
| SPSample5 | VOB1 | 1 | 00:05:11:00 | 00:05:21:04 |
| SPSample6 | VOB1 | 1 | 00:06:00:00 | 00:06:10:00 |

| ROUTE NAME | CONTENTS |
|---|---|
| P # 1 | REPRODUCE V # 1,REPRODUCE V # 2,LINK TO P # 2 |
| P # 2 | REPRODUCE V # 3,REPRODUCE EXCLUSIVELY A # 1,REPRODUCE V # 4,LINK TO P # |
| P # 3 | REPRODUCE V # 5,REPRODUCE V # 6 |
| P # 4 | REPRODUCE V # 7,REPRODUCE V # 8 |
| P # 5 | REPRODUCE V # 9,REPRODUCE V # 1 0 |

| EXCLUSIVE REPRODUCTION BLOCK NAME | CONTENTS |
|---|---|
| A # 1 | IF L V 1 LINK TO P # 4,IF L V 2 LINK TO P # 5 |

| VOB | PRE-CONNECTION TYPE | PRE-CONNECTION VOB | POST-CONNECTION TYPE | POST-CONNECTION VOB | INTERLEAVE FLAG |
|---|---|---|---|---|---|
| V#1 | SINGLE | NONE | SINGLE | V#2 | 0 |
| V#2 | SINGLE | V#1 | SINGLE | V#3 | 0 |
| V#3 | SINGLE | V#2 | BRANCH | V#7 V#9 | 0 |
| V#4 | MERGE | V#8 V#10 | SINGLE | V#5 | 0 |
| V#5 | SINGLE | V#4 | SINGLE | V#6 | 0 |
| V#6 | SINGLE | V#5 | SINGLE | NONE | 0 |
| V#7 | SINGLE | V#3 | SINGLE | V#8 | 1 |
| V#8 | SINGLE | V#7 | SINGLE | V#4 | 1 |
| V#9 | SINGLE | V#3 | SINGLE | V#10 | 1 |
| V#10 | SINGLE | V#9 | SINGLE | V#4 | 1 |

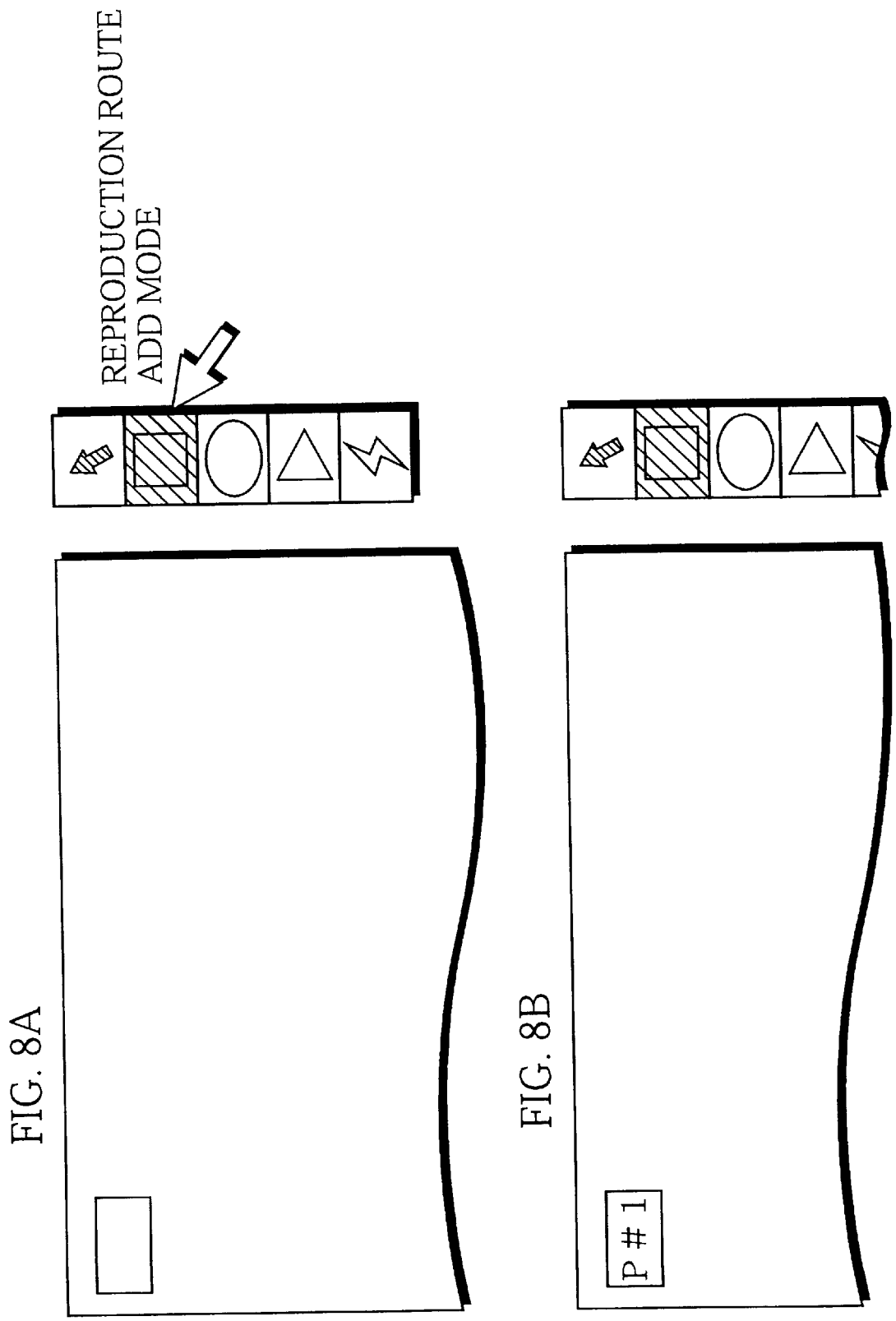

FIG. 9A
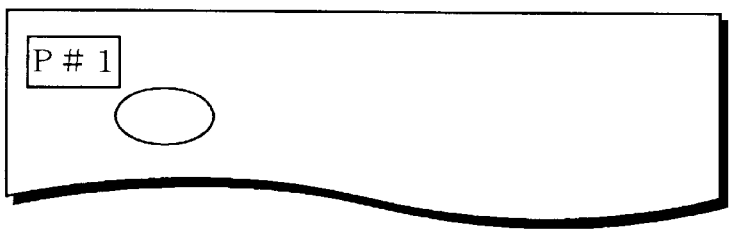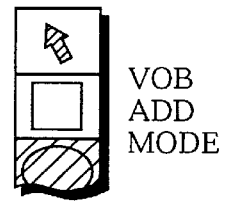
VOB
ADD
MODE
FIG. 9B
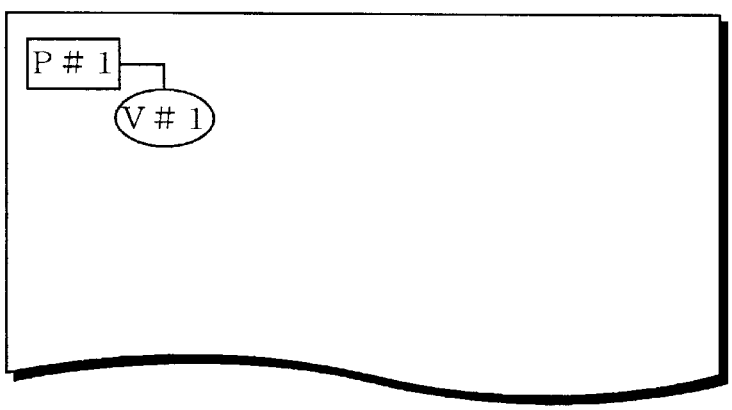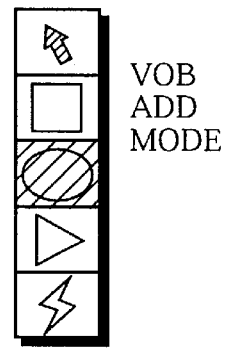
VOB
ADD
MODE
FIG. 9C
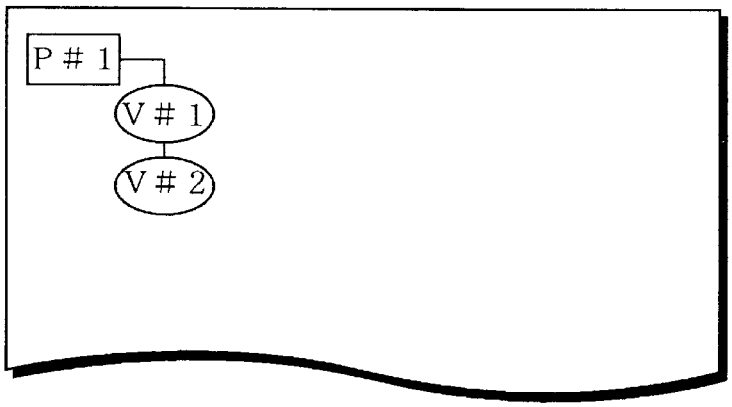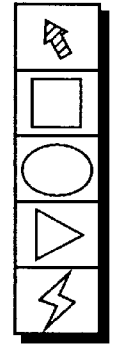
FIG. 9D
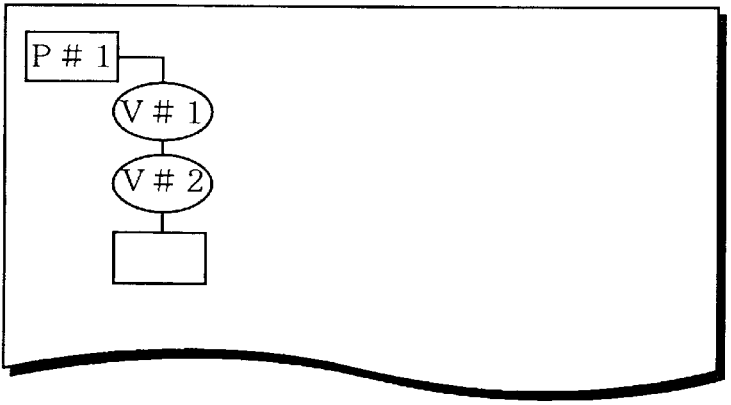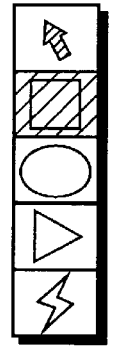
REPRODUCTION
ROUTE ADD
MODE

VOB ADD MODE

EXCLUSIVE REPRODUCTION BLOCK ADD MODE

FIG. 13

VOB#3 MANAGEMENT INFORMATION Pack.
DSIpacket

PCIpacket
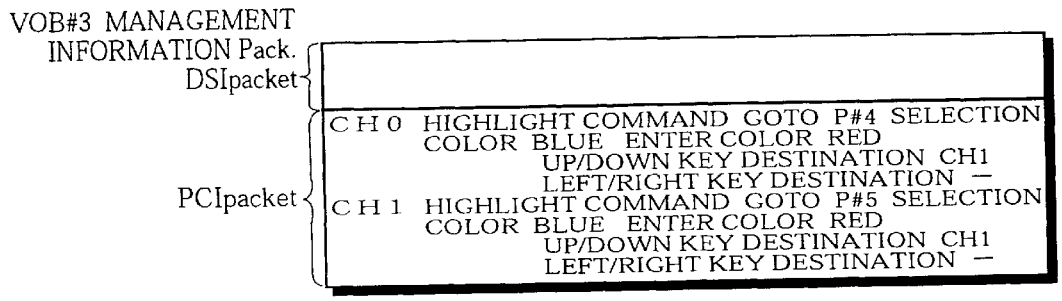
C H 0  HIGHLIGHT COMMAND GOTO P#4 SELECTION
COLOR BLUE  ENTER COLOR RED
UP/DOWN KEY DESTINATION CH1
LEFT/RIGHT KEY DESTINATION —
C H 1  HIGHLIGHT COMMAND GOTO P#5 SELECTION
COLOR BLUE  ENTER COLOR RED
UP/DOWN KEY DESTINATION CH1
LEFT/RIGHT KEY DESTINATION —

FIG. 14A

FIRST EDITING OF SCENARIO

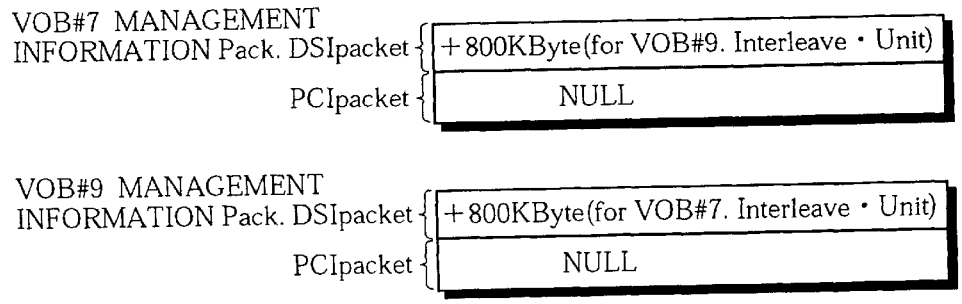

VOB#7 MANAGEMENT INFORMATION Pack. DSIpacket: +800KByte(for VOB#9. Interleave · Unit)
PCIpacket: NULL VOB#9 MANAGEMENT INFORMATION Pack. DSIpacket: +800KByte(for VOB#7. Interleave · Unit)
PCIpacket: NULL

FIG. 14B

SECOND EDITING OF SCENARIO

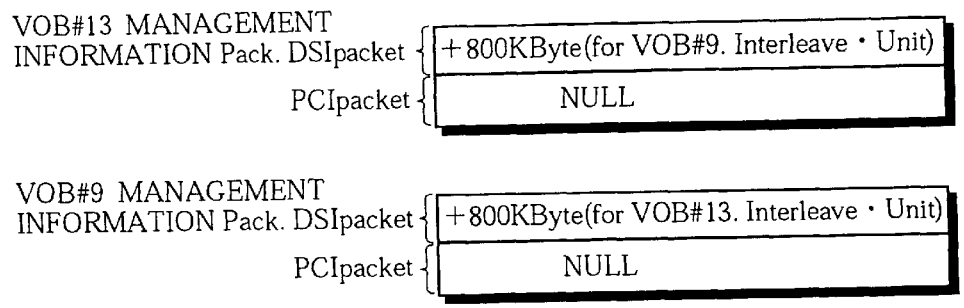

VOB#13 MANAGEMENT INFORMATION Pack. DSIpacket: +800KByte(for VOB#9. Interleave · Unit)
PCIpacket: NULL VOB#9 MANAGEMENT INFORMATION Pack. DSIpacket: +800KByte(for VOB#13. Interleave · Unit)
PCIpacket: NULL

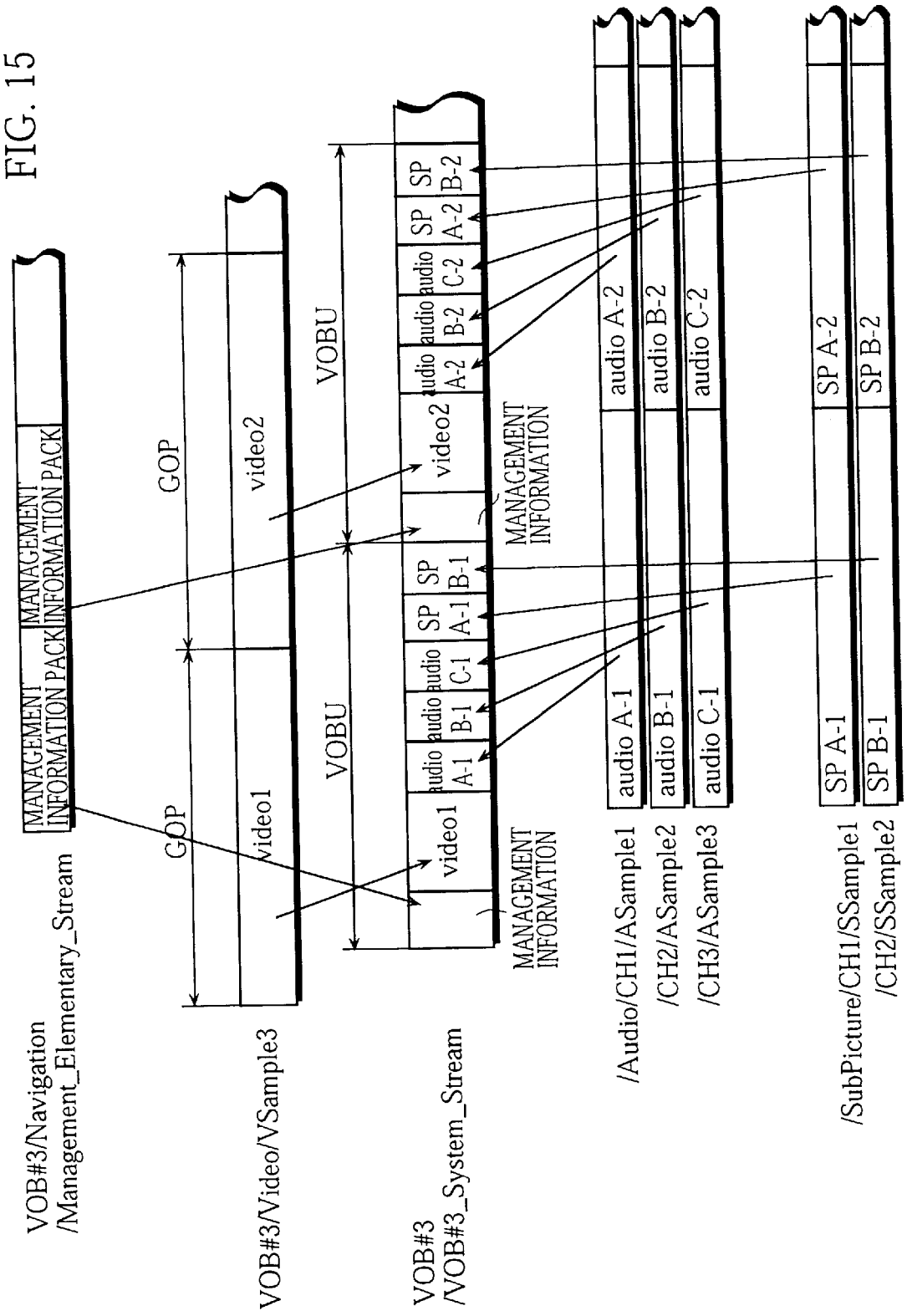

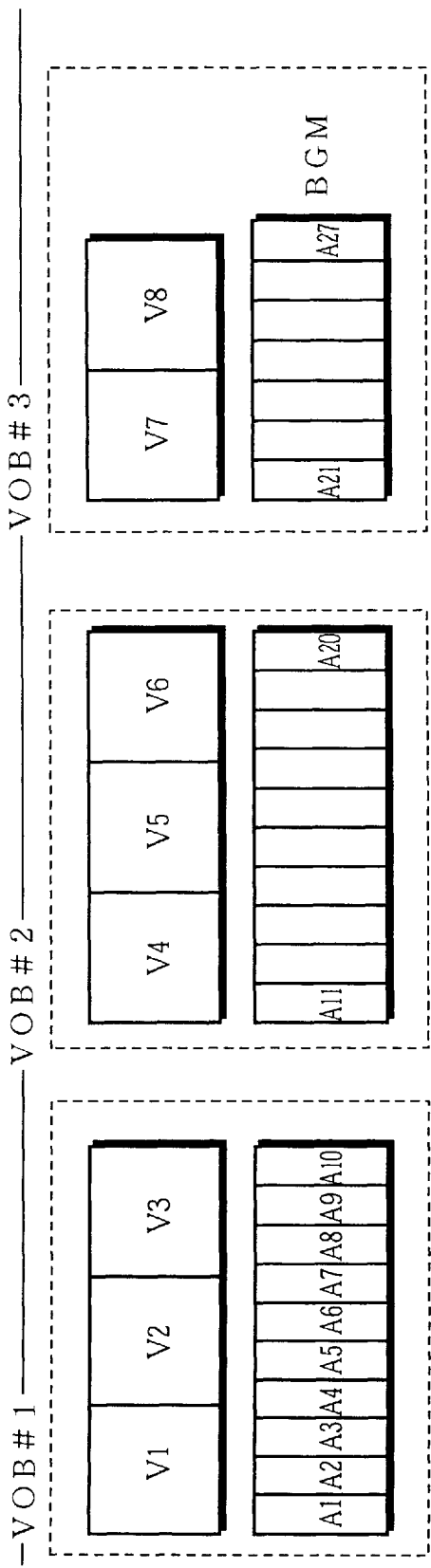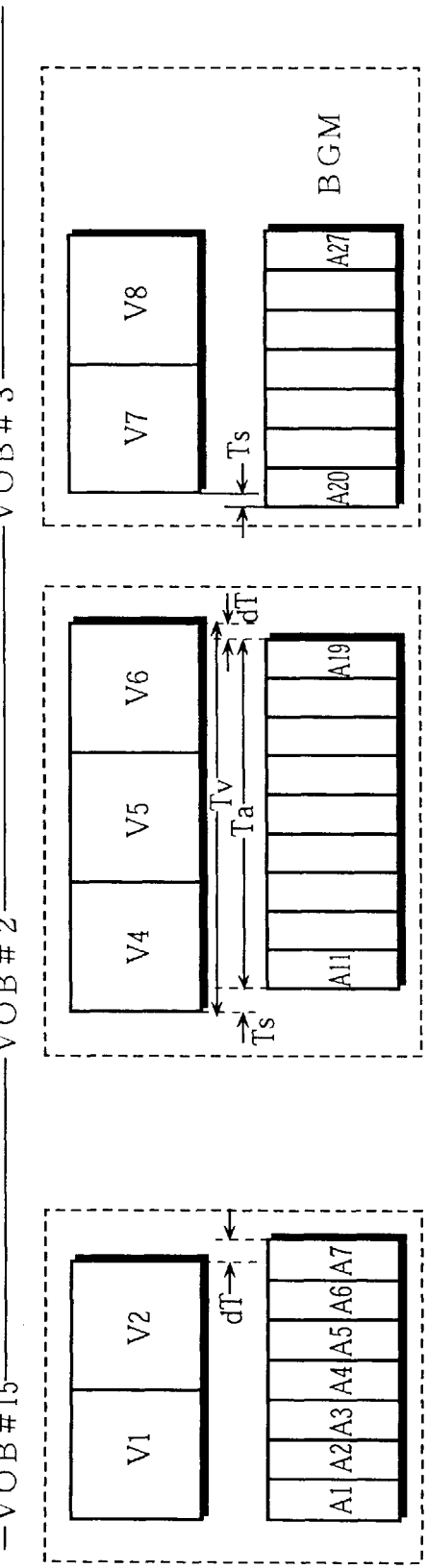

FIG. 17A

PGC INFORMATION TABLE    FIRST EDITING OF SCENARIO

| | | |
|---|---|---|
| +0 Kbyte | PGC INFORMATION #1 | LINK DESTINATION PGC_Table_START+128KByte(PGC#2address)<br>ACCESS DESTINATION VOB_Table_START+0MByte~+8MByte(VOB#1address)<br>+8MByte~+16MByte(VOB#2address) |
| +128 Kbyte | PGC INFORMATION #2 | LINK DESTINATION PGC_Table_START+256KByte(PGC#3address)<br>ACCESS DESTINATION VOB_Table_START+16MByte~+32MByte(VOB#3address)<br>+64MByte~+80MByte(VOB#4address) |
| +256 Kbyte | PGC INFORMATION #3 | LINK DESTINATION    NULL<br>ACCESS DESTINATION VOB_Table_START+80MByte~+96MByte(VOB#5address)<br>+96MByte~+128MByte(VOB#6address) |
| +384 Kbyte | PGC INFORMATION #4 | LINK DESTINATION    NULL<br>ACCESS DESTINATION VOB_Table_START+32MByte~+64MByte(VOB#7,#8address) |
| +512 Kbyte | PGC INFORMATION #5 | LINK DESTINATION    NULL<br>ACCESS DESTINATION VOB_Table_START+32MByte~+64MByte(VOB#9,#10address) |

FIG. 17B

PGC INFORMATION TABLE    SECOND EDITING OF SCENARIO

| | | |
|---|---|---|
| +0 Kbyte | PGC INFORMATION #1 | LINK DESTINATION PGC_TABLE_START+128KBYTE(PGC#2ADDRESS)<br>ACCESS DESTINATION VOB_TABLE_START+0MBYTE~+8MBYTE(VOB#15ADDRESS)<br>+8MBYTE~+16MBYTE(VOB#2ADDRESS) |
| +128 Kbyte | PGC INFORMATION #2 | LINK DESTINATION PGC_TABLE_START+256KBYTE(PGC#3ADDRESS)<br>ACCESS DESTINATION VOB_TABLE_START+16MBYTE~+32MBYTE(VOB#3ADDRESS)<br>+64MBYTE~+80MBYTE(VOB#4ADDRESS) |
| +256 Kbyte | PGC INFORMATION #3 | LINK DESTINATION    NULL<br>ACCESS DESTINATION VOB_TABLE_START+80MBYTE~+96MBYTE(VOB#5ADDRESS)<br>+96MBYTE~+128MBYTE(VOB#6ADDRESS) |
| +384 Kbyte | PGC INFORMATION #4 | LINK DESTINATION    NULL<br>ACCESS DESTINATION VOB_TABLE_START+32MBYTE~+64MBYTE(VOB#13,#8ADDRESS) |
| +512 Kbyte | PGC INFORMATION #5 | LINK DESTINATION    NULL<br>ACCESS DESTINATION VOB_TABLE_START+32MBYTE~+64MBYTE(VOB#9,#10ADDRESS) |

FIG. 18A
FIRST EDITING OF SCENARIO
VOB TABLE
START_ADDRESS
- +0Mbyte
  - VOB#1 (10sec)
- +8Mbyte
  - VOB#2 (10sec)
- +16Mbyte
  - VOB#3 (20sec)
- +32Mbyte
  - +0Mbyte
    - VOB#7_1/10sec
  - +0.8Mbyte
    - VOB#9_1/10sec
  - +1.6Mbyte
    - VOB#7_2/10sec
  - +2.4Mbyte
    - VOB#9_2/10sec
  - +3.2Mbyte
    - VOB#7_3/10sec
  - +4.0Mbyte
    - VOB#9_3/10sec
  - +4.8Mbyte
    - VOB#7_4/10sec
  - +5.6Mbyte
    - VOB#9_4/10sec
  - +6.4Mbyte
    - VOB#7_5/10sec
  - +7.2Mbyte
    - VOB#9_5/10sec
  - +8.0Mbyte
    - VOB#7_6/10sec
  - +8.8Mbyte
    - VOB#9_6/10sec
    ⋮
- +48Mbyte
  - +0Mbyte
    - VOB#8_1/10sec
  - +0.8Mbyte
    - VOB#10_1/10sec
  - +1.6Mbyte
    - VOB#8_2/10sec
  - +2.4Mbyte
    - VOB#10_2/10sec
  - +3.2Mbyte
    - VOB#8_3/10sec
  - +4.0Mbyte
    - VOB#10_3/10sec
  - +4.8Mbyte
    - VOB#8_4/10sec
  - +5.6Mbyte
    - VOB#10_4/10sec
  - +6.4Mbyte
    - VOB#8_5/10sec
  - +7.2Mbyte

FIG. 18B
SECOND EDITING OF SCENARIO
VOB TABLE
START_ADDRESS
- +0Mbyte
  - VOB#15 (8sec)
- +8Mbyte
  - VOB#2 (10sec)
- +16Mbyte
  - VOB#3 (20sec)
- +32Mbyte
  - +0Mbyte
    - VOB#13_1/10sec
  - +0.8Mbyte
    - VOB#9_1/10sec
  - +1.6Mbyte
    - VOB#13_2/10sec
  - +2.4Mbyte
    - VOB#9_2/10sec
  - +3.2Mbyte
    - VOB#13_3/10sec
  - +4.0Mbyte
    - VOB#9_3/10sec
  - +4.8Mbyte
    - VOB#13_4/10sec
  - +5.6Mbyte
    - VOB#9_4/10sec
  - +6.4Mbyte
    - VOB#13_5/10sec
  - +7.2Mbyte
    - VOB#9_5/10sec
  - +8.0Mbyte
    - VOB#13_6/10sec
  - +8.8Mbyte
    - VOB#9_6/10sec
- +48Mbyte
  - +0Mbyte
    - VOB#8_1/10sec
  - +0.8Mbyte
    - VOB#10_1/10sec
  - +1.6Mbyte
    - VOB#8_2/10sec
  - +2.4Mbyte
    - VOB#10_2/10sec
  - +3.2Mbyte
    - VOB#8_3/10sec
  - +4.0Mbyte
    - VOB#10_3/10sec
  - +4.8Mbyte
    - VOB#8_4/10sec
  - +5.6Mbyte
    - VOB#10_4/10sec
  - +6.4Mbyte
    - VOB#8_5/10sec
  - +7.2Mbyte

FIRST EDITING OF SCENARIO

SECOND EDITING OF SCENARIO

FIG. 21A  INTERLEAVE AFTER FIRST EDITING OF SCENARIO

FIG. 21B  TRANSFER AFTER FIRST EDITING OF SCENARIO

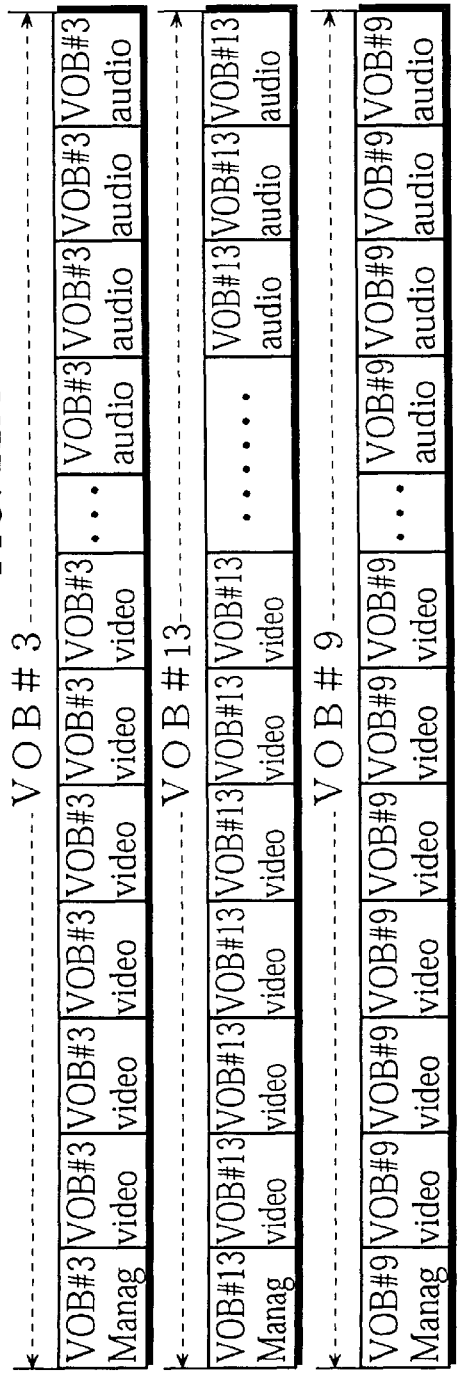
FIG. 22A INTERLEAVE AFTER SECOND EDITING OF SCENARIO
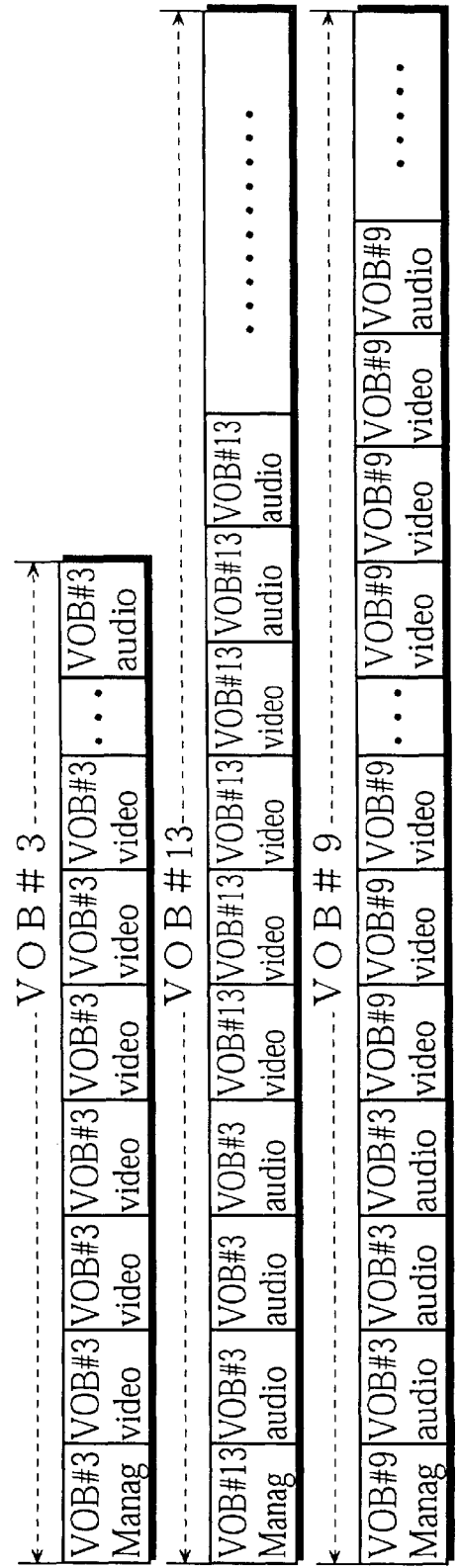
FIG. 22B TRANSFER AFTER SECOND EDITING OF SCENARIO

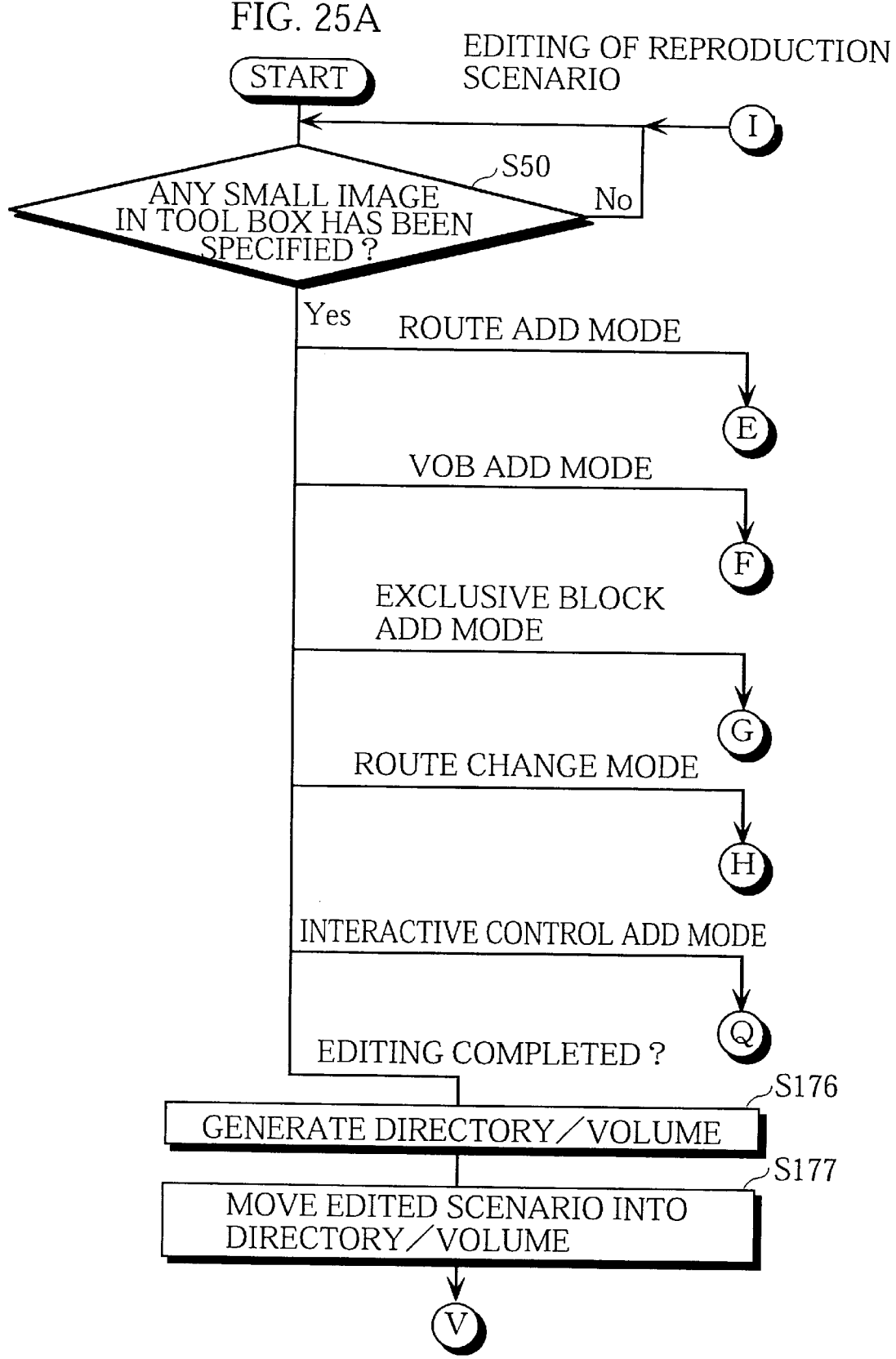

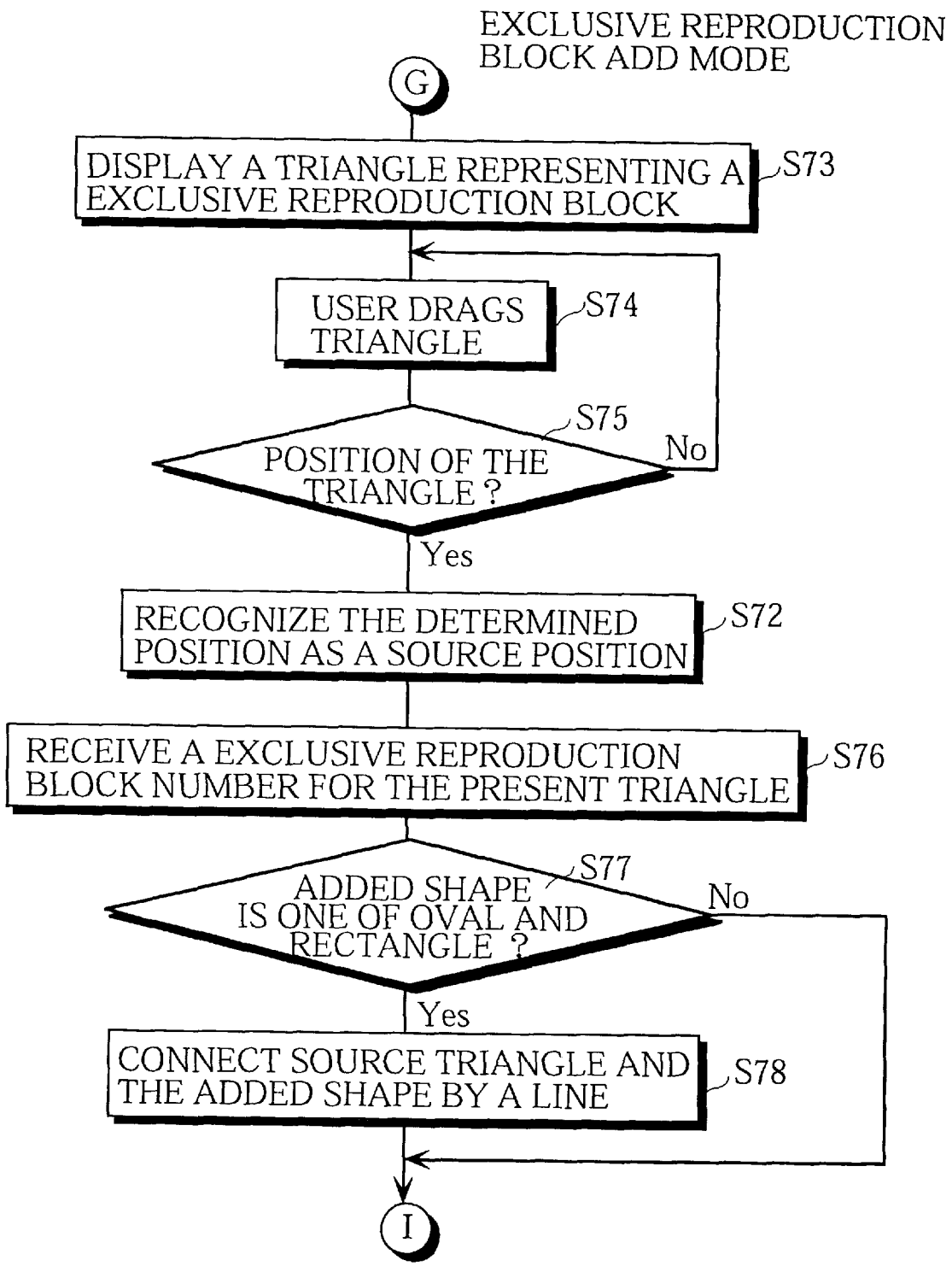

REPRODUCTION CONTROL
INFORMATION ENTER MODE

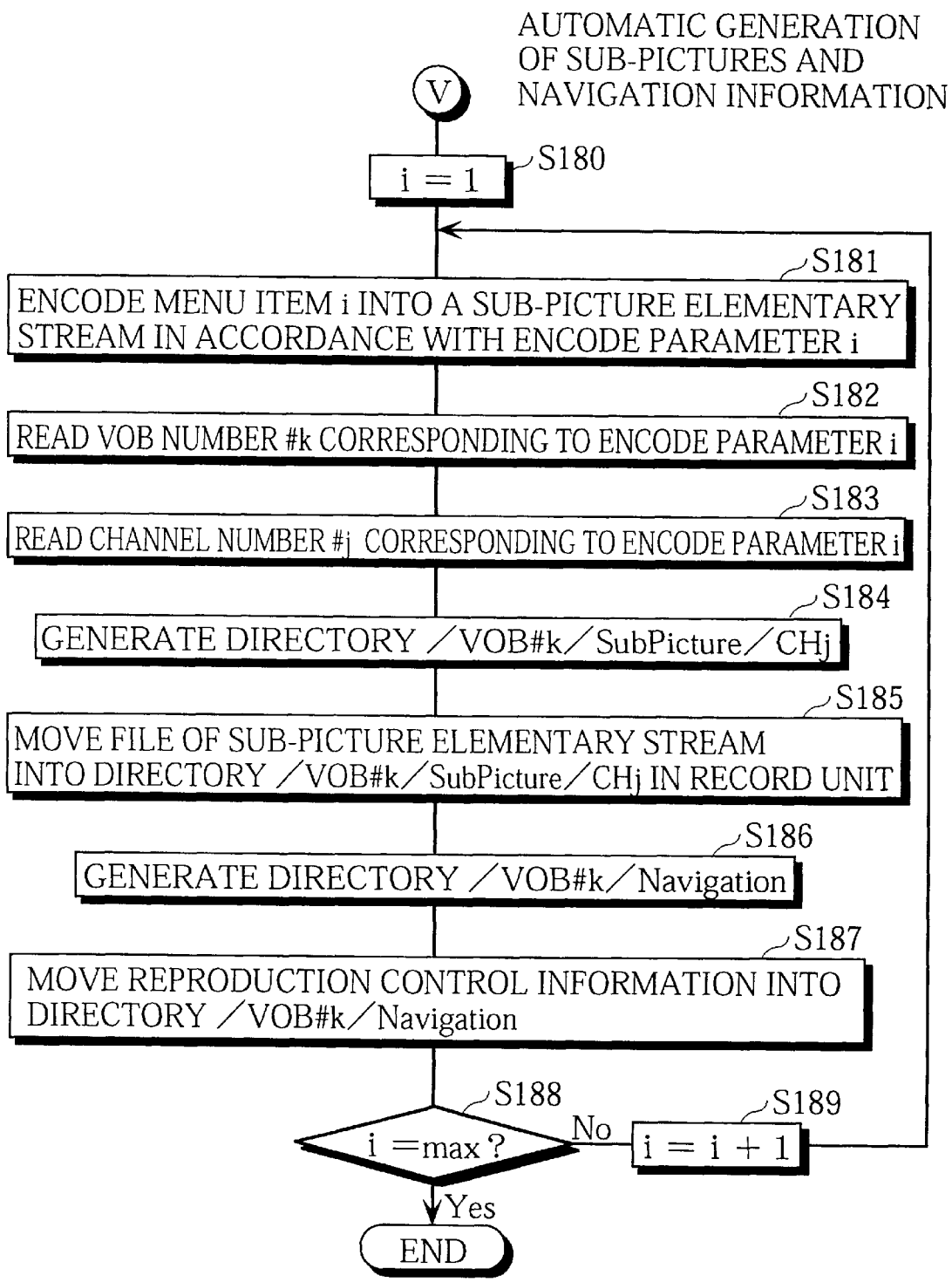

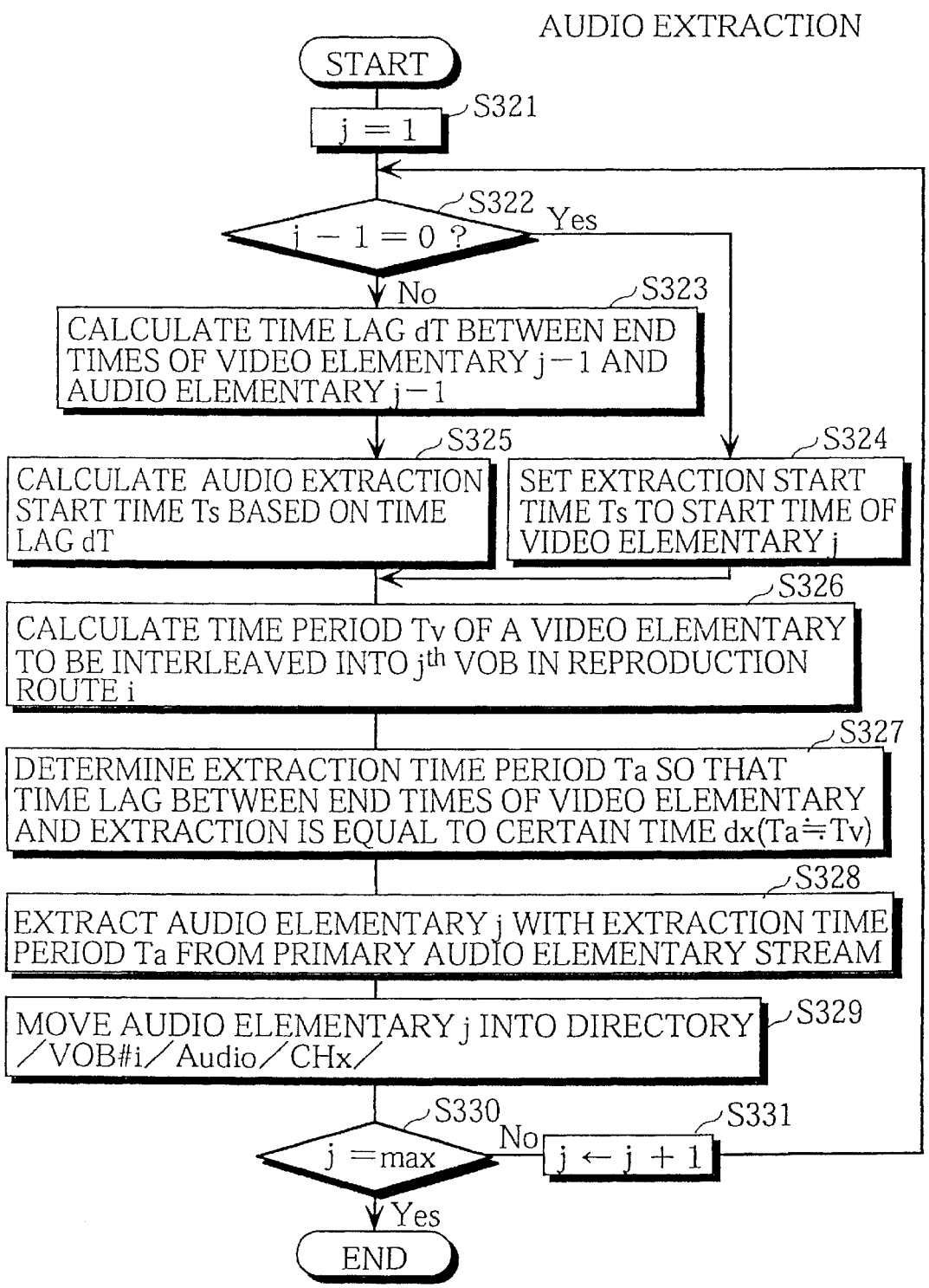

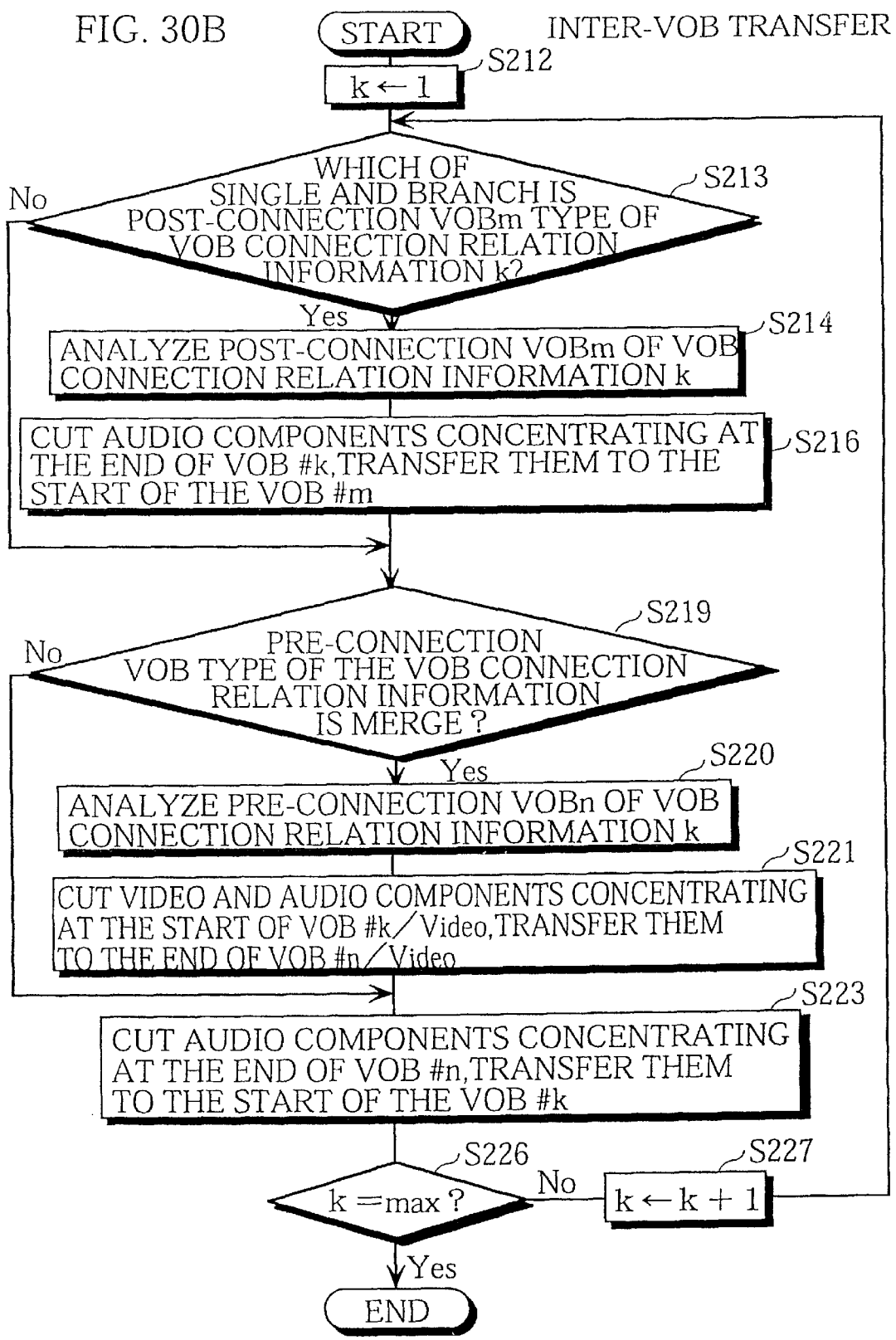

FIG. 33
SEAMLESS FLAG O F F
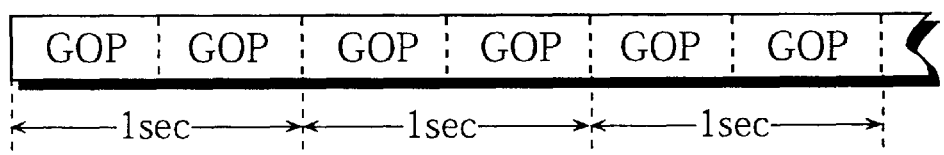
SEAMLESS FLAG O N
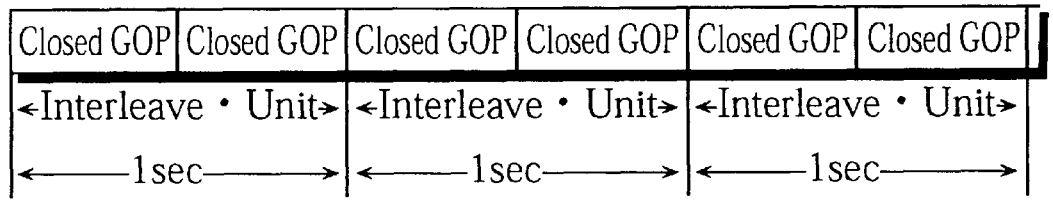

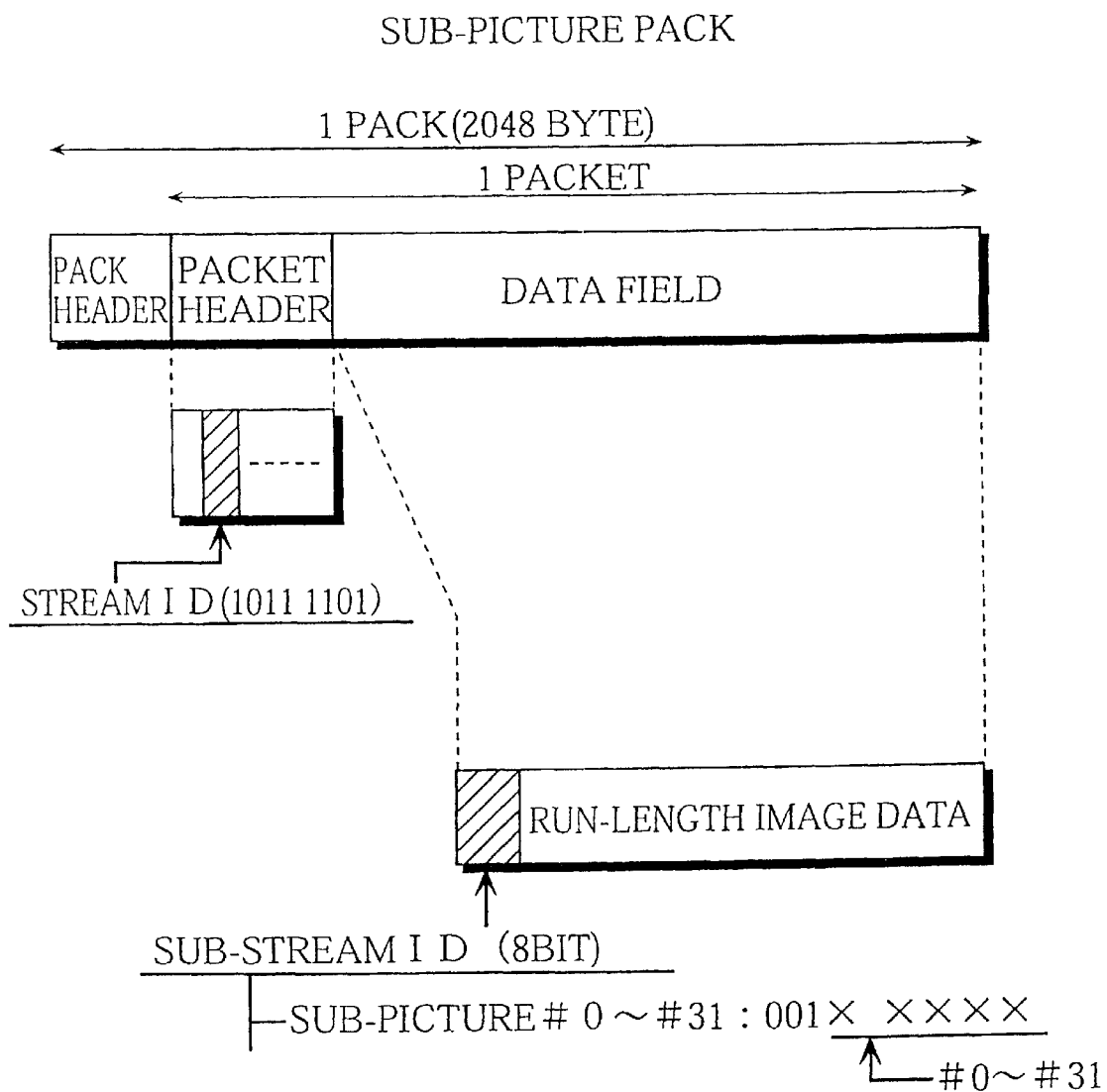

APPARATUS AND METHOD OF GENERATING BIT STREAM FOR INFORMATION RECORDING DISC STORAGE WHICH ENABLES SEAMLESS REPRODUCTION OF A PLURALITY OF PIECES OF IMAGE INFORMATION, AND RECORDING MEDIUM ON WHICH PROGRAM APPLIED TO THE GENERATING APPARATUS IS RECORDED

FIELD OF THE INVENTION

This invention relates to an apparatus and method for creating film applications of a multi-version type and generating bitstream for seamless reproduction to be stored in optical discs, and a recording medium storing program run on the apparatus.

BACKGROUND OF THE INVENTION

DVD (Digital Video Disc) sits in the strongest limelight of late among mediums for recording video works, such as films. About three hours of video information can be stored in one DVD. It is considered that the most suitable applications for DVD are film applications of multi-version types in which a plurality of video versions are managed together.

The film application of the multi-version type described here includes various versions, which have partially different video or audio data, of the same film. The various versions include, for example, versions with a viewing limitation differently imposed on adults and children, versions with different camera angles, versions for theaters, and versions for TV broadcasting. When viewing such a film application, the users can select a desired version based on their tastes or circumstances at home. This kind of film supply serves the interests of users, enabling the users to select a desired version at their discretion.

It is expected that such film applications of the multi-version type would be appreciated by the customer. However, creating such film applications is not so easy. The producer is expected to make enormous efforts which they have never experienced. In the DVD standard, video data is encoded under MPEG2 (ISO13818), where MPEG is short for Moving Picture Expert Group. The encoding of the video materials under MPEG2 goes through a first path and a second path. In the first path, characteristics are extracted from images every about 0.5 seconds, and parameters (e.g., quantization width) used for the compression are determined. In the second path, the video data is compressed using the determined parameters. This two-path system secures the high quality of the created film applications. On the contrary, it takes more than double the reproduction time of the film to encode corresponding video data. Furthermore, the time taken for the encoding increases proportional to the number of the versions of a film to be encoded. This puts a heavy load on the producer.

The DVD standard defines an exclusive reproduction function for the disc reproduction apparatus to prevent the encode time from increasing. By using the exclusive reproduction function, the disc reproduction apparatus can selectively reproduce video data as specified by the user. With this function, the entire video data for each version need not be encoded, but only different parts of video data are encoded. The exclusive reproduction function is described below with reference to FIGS. 1, 2A, and 2B.

FIG. 1 shows two versions A and B recorded in a DVD. Each rectangle in the drawing represents an image. The width of each rectangle is proportionate to the image reproduction time. FIG. 1 indicates that either of images 2 and 3 is selected and reproduced in the exclusive reproduction. Image 3, shorter than image 4, is a part of image 4. In version A, video data is reproduced in the order of images 1, 2, and 4. In version B, video data is reproduced in the order of images 1, 3, and 4.

FIG. 2A shows a layout of DVD storing the images 1–4. The present drawing shows that each of the images 1–4 is recorded in consecutive sectors of the disc.

In addition to the images, the DVD shown in FIG. 2A stores reproduction route data set which indicates the reproduction order of the images.

FIG. 2B shows the contents of the reproduction route data set. The present drawing includes reproduction route data 1 and 2 which respectively indicate the reproduction orders of versions A and B. The disc reproduction apparatus performs the exclusive reproduction by reproducing the images of each version in accordance with the reproduction orders shown in FIG. 2B.

As described above, when the disc reproduction apparatus uses the exclusive reproduction function, video data need not be encoded for each version. On the other hand, the exclusive reproduction is accompanied by disc seeks of a large scale. Large-scale disc seeks stop the reading of data from the disc, reduce the rate of displaying image, and generate such big gaps as can be detected with naked eyes in the displayed images while the images should be displayed continuously.

The disc reproduction apparatus under the DVD standard uses a seamless reproduction method to prevent the gaps between display images by disc seeks. Basically, for the seamless reproduction, the disc reproduction apparatus is provided with a track buffer in which data is temporarily stored. During disc seeks, the data stored in the track buffer is transferred to the decoder for video reproduction to secure video reproduction without gaps.

For the seamless reproduction by the disc reproduction apparatus, the address of each image on the disc is determined in consideration of the capacity of the track buffer. For example, to prevent the occurrence of gaps between images 1 and 2, images 1 and 3, images 2 and 4, and images 3 and 4, the addresses of the images 1–4 are determined so that each distance between each pair of images is adjusted in accordance with the capacity of the track buffer.

For achieving the seamless reproduction, it is also important to prevent disorder of synchronization from occurring in the video or audio reproduction and to prevent reduction in the display rate which would occur when video is synchronized with audio.

The video and audio data are encoded and interleaved into optical discs, the video data being encoded with the MPEG method. The interleaving process introduced in the present document generates digital data by alternately arranging 2 KB-audio and 2 KB-video components. The generated digital data is called a system stream in general. In the DVD standard, it is called a video object. An arrangement of the audio and video components based on a certain rule is called an interleave structure.

According to general interleave structures of system streams, the audio and video components are alternately arranged. However, to prevent the synchronization disorder and the reduction in the display rate, the interleave structure should be made special.

That is to say, each system stream should have dependent relation between the preceding and succeeding system streams. For example, an audio component which should be included in the preceding system stream is included in the succeeding system stream.

One problem in the above method is that the reproduction order of the system streams should be determined in advance. Also, a once-determined reproduction order cannot be changed.

As a result, when the producer of a film application has an urge to partially amend once-combined system streams from the viewpoint of total design, the producer need to perform the whole processes of encoding and interleaving the video data.

A typical amendment from the viewpoint of total design is to cut or replace system streams corresponding to a scene when the size of the system streams exceed the capacity of DVD.

It will take an enormous time before a whole film application has been created for shipment if the encoding process is repeated each time a trivial error is found from the viewpoint of total design. This renders the production of a film application of the multi-version type unrealistic.

DISCLOSURE OF THE INVENTION

It is therefore an object of the present invention to provide an apparatus and method for creating film applications of a multi-version type in which video data need not be encoded due to minor corrections such as cutting or replacing system streams corresponding to one scene, and a recording medium storing program run on the apparatus.

The above object is achieved by a bitstream generation apparatus for generating a bitstream including a plurality of video objects to be stored in an information recording disc, the bitstream generation apparatus comprising: a video encoder for encoding a plurality of pieces of input video information to obtain a plurality of pieces of video data; an audio encoder for encoding a plurality of pieces of input audio information to obtain a plurality of pieces of audio data; a recording means for recording the plurality of pieces of video data and the plurality of pieces of audio data; a structure information receiving means for receiving structure information which shows correspondence between each of the plurality of video objects and each piece of video data and each piece of audio data recorded in the recording means; an editing means for editing reproduction route information in accordance with an instruction from an operator, the reproduction route information indicating a reproduction order of the plurality of video objects when the information recording disc is reproduced by a reproduction apparatus; a correcting means for correcting each piece of audio data corresponding to each of the plurality of video objects in accordance with a limitation imposed on each of the plurality of video objects dependent on the reproduction order indicated by the reproduction route information, the correspondence being shown in the structure information; an interleaving means for dividing each of the corrected pieces of audio data and the plurality of pieces of video data into blocks and interleaving the blocks to obtain the plurality of video objects by arranging the blocks in accordance with a predetermined rule; and a generating means for generating the bitstream from the plurality of video objects and the reproduction route information.

With the above construction, after corrections such as cutting or replacing system streams corresponding to one scene are performed, the correcting means corrects each piece of audio data corresponding to each of the plurality of video objects in accordance with a limitation imposed on each of the plurality of video objects dependent on the reproduction order indicated by the reproduction route information. By interleaving the above-corrected audio data, each of the generated system streams have dependent relation between the preceding and succeeding system streams. With this arrangement, the reproduction order of the system streams can be changed as desired.

The bitstream can be generated reelecting the above correction without encoding the video and audio information.

With this arrangement, it takes a short time before a whole film application has been created by repeating partial modifications and deletions of video data from the viewpoint of total design. This renders the production of a film application of the multi-version type realistic for producers.

In the above bitstream generation apparatus, the limitation imposed on each of the plurality of video objects dependent on the reproduction order may be a limitation required to allow the reproduction apparatus to change, in reproduction, from one video object to a next video object with a predetermined display rate, wherein the correcting means includes: a first correcting unit for cutting one or more blocks located at the end of a piece of audio data corresponding to a video object and adding the cut blocks to the start of another piece of audio data which corresponds to a next video object.

With the above arrangement, the first correcting unit cuts blocks located at the end of a piece of audio data corresponding to a video object and adds the cut blocks to the start of another piece of audio data which corresponds to a next video object, each time the reproduction route information is edited. This performs a process for preventing the reproduction of video data from delaying. As a result, even if the reproduction route information is edited many times, the reproduction of video data is not delayed and the seamless reproduction is achieved.

In the above bitstream generation apparatus, the reproduction route information may include specification information specifying the video object and link information of the next video object, the editing means may include a link unit for setting the specification information and the link information into the reproduction route information, and the correcting means may include a second correcting unit for cutting one or more blocks located at the end of a piece of audio data corresponding to a link source video object which links to a plurality of link destination video objects and adding the cut blocks to the start of other pieces of audio data which correspond to the plurality of link destination video objects.

With the above arrangement, the second correcting unit cuts blocks located at the end of a piece of audio data corresponding to a link source video object which links to a plurality of link destination video objects and adds the cut blocks to the start of other pieces of audio data which correspond to the plurality of link destination video objects. This performs a process for preventing the reproduction of video data from delaying. As a result, even if a video object links to another video object, the reproduction of video data is not delayed.

In the above bitstream generation apparatus, the correcting means may include: a third correcting unit for cutting one or more blocks located at the start of each piece of video and audio data corresponding to a link destination video object which is linked from a plurality of link source video objects and adding the cut blocks to the end of other pieces of video and audio data which correspond to the plurality of link source video objects; and a fourth correcting unit for cutting one or more blocks located at the end of a plurality of pieces of audio data which correspond to the plurality of link source video objects and have been corrected by the third correcting unit and adding the cut blocks to the start of another piece of audio data which corresponds to the link destination video object and has been corrected by the third correcting unit.

With the above arrangement, the third and fourth correcting units perform correction processes even when the link setting unit sets relation of a plurality of link-source video objects to a link-destination video object. This performs a process for preventing the reproduction of video data from delaying. As a result, even if a video object links to another video object, the reproduction of video data is not delayed.

In the above bitstream generation apparatus, each of the plurality of pieces of audio data obtained by the audio encoder uniquely may include a reproduction start time and a reproduction end time, the limitation imposed on each of the plurality of video objects dependent on the reproduction order may be a limitation required to allow the reproduction apparatus to change, in reproduction, from one video object to a next video object, keeping a synchronization of a video display with an audio output, and the correcting means may include an adjusting unit for, based on a reproduction end time of a piece of audio data corresponding to a video object, adjusting a reproduction start time of a piece of audio data corresponding to a next video object.

With the above construction, the synchronization between the video and audio reproduction is kept even if the reproduction order of the VOBs in the exclusive reproduction block is changed after the elementary streams are generated.

BRIEF DESCRIPTION OF THE DRAWINGS

FIG. 1 shows prior-art reproduction orders of a plurality of video versions.

FIG. 2A shows a prior-art layout of a plurality of images in storage.

FIG. 2B shows prior-art reproduction route data.

FIG. 3 is a flowchart showing the whole process of generating a video work in the present embodiment.

FIG. 4A shows the construction of the authoring apparatus in the present embodiment.

FIG. 5A shows encode parameters for video data encoding.

FIG. 5B shows encode parameters for audio data encoding.

FIG. 5C shows encode parameters for sub-picture data encoding.

FIGS. 8A–8B show an illustrated composition of the reproduction scenario being edited in the first editing by the edit unit 15.

FIGS. 9A–9D show an illustrated composition of the reproduction scenario being edited in the first editing by the edit unit 15.

FIG. 13 shows a management information pack with reproduction control information written in the PCI packet.

FIG. 14A shows management information packs with addresses written in the DSI packets after the first editing of the reproduction scenario.

FIG. 14B shows management information packs with addresses written in the DSI packets after the second editing of the reproduction scenario.

FIG. 15 shows interleaving of elementary streams stored in respective directories in the record unit 12.

FIGS. 16A shows video and audio elementary streams in a VOB after the first editing of the reproduction scenario.

FIGS. 16B shows video and audio elementary streams in a VOB after the second editing of the reproduction scenario.

FIG. 17A shows PGC information in which connection information and access information have been written after the first editing of the reproduction scenario.

FIG. 17B shows PGC information in which connection information and access information have been written after the first editing of the reproduction scenario.

FIG. 18A shows a VOB access table in which VOBs have been assigned addresses after the first editing of the reproduction scenario.

FIG. 18B shows a VOB access table in which VOBs have been assigned addresses after the first editing of the reproduction scenario.

FIG. 21A shows interleaved VOBs after the first editing of the reproduction scenario.

FIG. 21B shows VOBs which have been subjected to the transfer process after the first editing of the reproduction scenario.

FIG. 22A shows interleaved VOBs after the second editing of the reproduction scenario.

FIG. 22B shows VOBs which have been subjected to the transfer process after the second editing of the reproduction scenario.

FIGS. 25A–25E are flowcharts of the procedures of the editing of the reproduction scenario by the edit unit 15.

FIGS. 27A–27B are flowcharts of the procedures of the automatic generation of the sub-pictures and the reproduction control information by edit unit 15.

FIG. 30A is a flowchart of the audio elementary stream extraction process.

FIG. 30B is a flowchart of the inter-VOB transfer process.

FIG. 33 shows video elementary streams differently generated based on the ON/OFF of the seamless flag.

FIG. 35C shows a format of the sub-picture pack.

DESCRIPTION OF THE PREFERRED EMBODIMENTS

A DVD authoring apparatus, as an embodiment of an apparatus for recording, is described below with reference to the drawings. The description of the authoring apparatus is divided into five chapters.

Chapter 1 describes the generation of video using the authoring apparatus of the present embodiment.

Figure 4B:
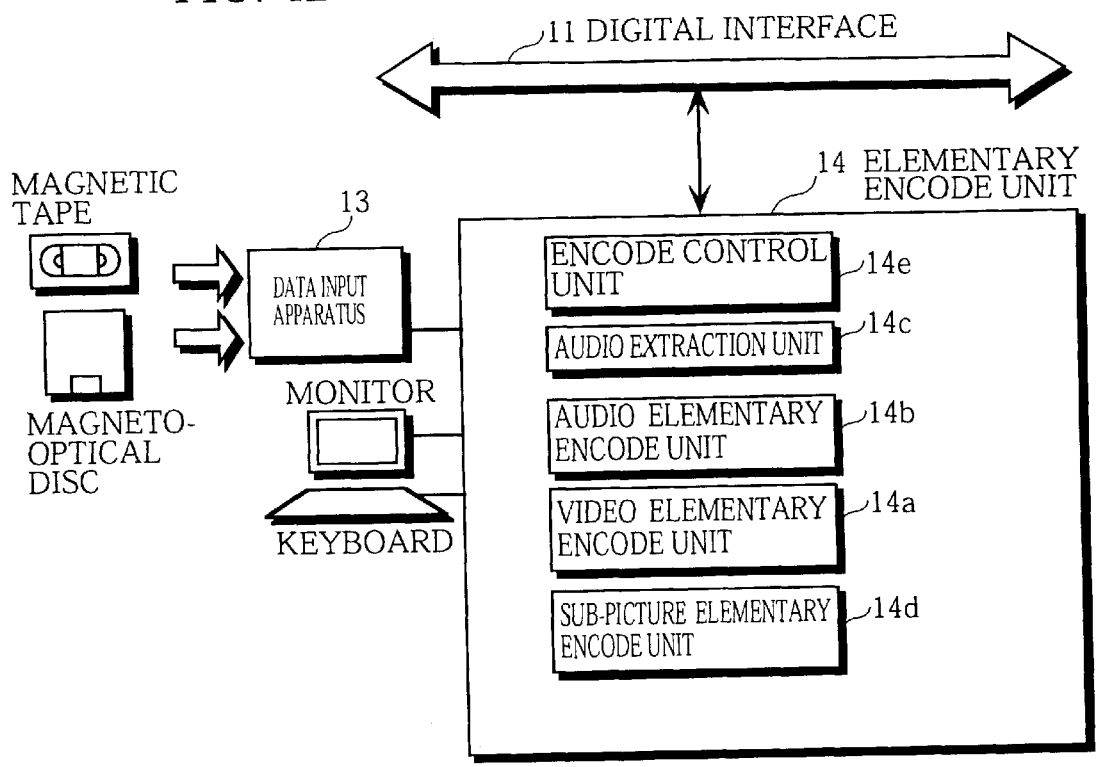
FIG. 4B shows the construction of the elementary encode unit 14 in the present embodiment.
Figure 4C:
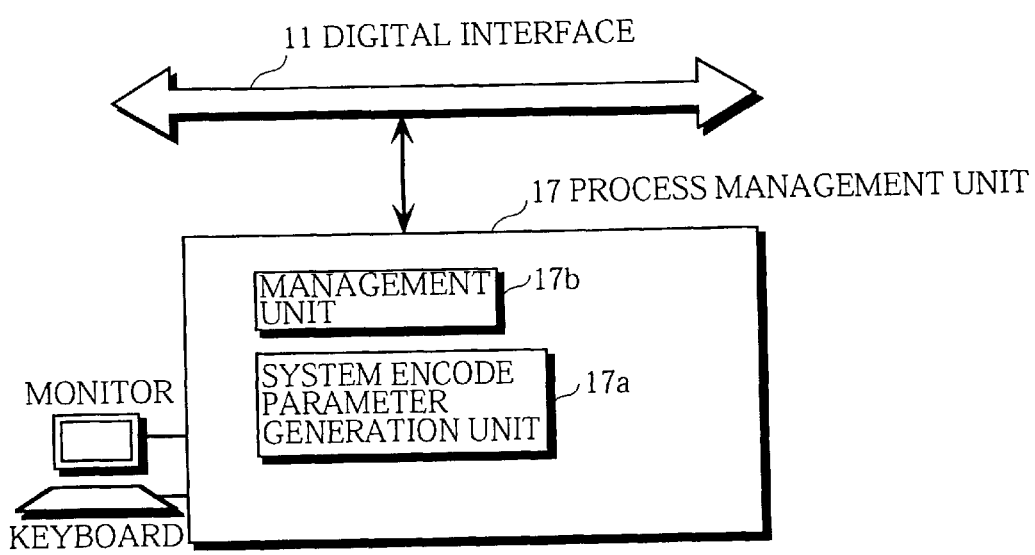
FIG. 4C shows the construction of the process management unit 17 in the present embodiment.

Chapter 2 describes each component of the authoring apparatus with reference to block diagrams shown in FIGS. 4A, 4B, and 4C.

Following are the contents of Chapter 2.
2.1: Internal Construction of Authoring Apparatus
2.2: Digital Interface
2.3: Record Unit
2.4: Data Input Apparatus
2.5: Elementary Encode Unit
2.5.1: Encode Parameters for Video Data Encoding
2.5.2: Encode Parameters for Audio Data Encoding
2.5.3: Encode Parameters for Sub-Picture Data Encoding
2.5.4: Elementary Encode Unit
2.6: Edit Unit
2.6.1: Reproduction Scenario
2.6.2: Scenario Editor
2.6.3: Generation of Sub-Pictures
2.6.4: Generation of Management Information
2.7: Process Management Unit
2.7.1: System Encode Parameter Generation Unit
2.7.2: Management Unit
2.8: System Encode Unit
2.9: Disc Format Convert Unit
2.10: Player Emulation Unit
2.11: Data Output Apparatus
2.12: Role of Each Element in Entire Process Chapter 3 describes the operation of each component of the authoring apparatus with reference to the flowcharts.

Following are the contents of Chapter 3.
3.1: Operation of Encode Control Unit
3.1.1: Management Control
3.1.2: Video Encode Control
3.1.3: Audio Encode Control
3.1.4: Sub-Picture Encode Control
3.2: Edit Unit
3.2.1: Route Add Mode
3.2.2: VOB Add Mode
3.2.3: Exclusive reproduction Block Add Mode
3.2.4: Route Change Mode
3.2.5: Interactive Control Add Mode
3.2.6: Synchronization Information Generate Mode
3.2.7: Reproduction Control Information Enter Mode
3.2.8: Generation of Sub-Pictures
3.2.9: Generation of Management Information
3.3: Operation of Process Management Unit
3.3.1: Generation of VOB connection relation information
3.3.2: Process Management
3.3.3: Audio Extraction
3.4: Operation of System Encode Unit
3.4.1: Calculation of Transfer Amount
3.4.2: System Encode
3.5: Operation of Disc Format Convert Unit 18
3.5.1: VOB Mapping
3.5.2: Writing into DSI Packet
3.5.3: Writing into PGC Information
3.6: Operation of Re-Editing Reproduction Scenario and Re-Generating Bitstream for Recording
3.7: Conclusion Chapter 4 provides notes for the description in Chapters 1–3. Following are the contents of Chapter 3.
*note 1: Encoding with a Reduced Bit Rate
*note 2: Closed GOP
*note 3: Interleaving into VOBs
*note 4: VOBU
*note 5: PCI packet, *note 8: DSI packet
*note 6: Transfer Process
*note 7: VOB Interleave with Interleave Units
*note 9: Bitstream for Recording
*note 10: Disc Index Chapter 5 presents modifications of the authoring apparatus of the present embodiment.

Chapter 1: Process Outline

The outline of the process is described in this chapter. FIG. 3 is a flowchart showing the whole process of generating a bitstream which is to be recorded in an optical disc. In the material collection process, materials of a picture title are collected. In step S1, the producer records a video material in the videotape by shooting at some location or the like. In step S2, the producer records an audio material in the audiotape by postrecording or the like. In step S3, the producer manually inputs the subtitle using a commercial graphics editor. The subtitle is recorded in a magneto-optical disc.

The elementary encode process is then performed. In step S4, the producer manually inputs encode parameters using a certain editor. The producer elementary-encodes the video material, audio material, and subtitle material in accordance with the manually input encode parameters to obtain digital data of the materials. The obtained digital data is stored as an elementary stream. In step S7, the producer agitates a scenario of reproduction based on a roughly created continuity sketch.

In step S8 of the scenario edition process, the producer uses a GUI to edit the scenario of reproduction for reproducing a plurality of elementary streams.

The system encode process is also called the interleave process. In step S9, a plurality of elementary streams to be reproduced in synchronization are interleaved into a VOB.

In the above process, audio elements and video elements are transferred to fill a gap between VOBs for a seamless reproduction when the VOBs are reproduced with the seamless reproduction.

In step S10 of the format process, logical addresses on a DVD are assigned to a plurality of VOBs and to the scenario of reproduction to generate a bitstream which is to be stored in the DVD.

The preview process is then performed. In step S14, it is judged whether the size of the bitstream is within the capacity of the DVD. If it is judged so, in step S11, the bitstream is emulate-reproduced to preview the reproduction defined by the scenario. In step S12, it is judged whether every scene from the opening scene to the ending scene in the reproduction is satisfactory. If it is judged so, the generated bitstream is shipped to a factory for pressing the DVD. When it is judged as negative in step S14 or S12, for example, when an NG scene is detected, control goes to step S13. In step S13, the producer agitates the scenario again by fetching an appropriate scene for replacement from other elementary streams. Control then returns to step S8. In step S8 of this round, the producer uses a GUI to edit the scenario by replacing a defect scene to the fetched scene. The succeeding steps are repeated, from step S9 to S12.

It should be noted that in the above-described process flowchart, the scenario edition process is performed between the elementary encode process and the system encode process and that the preview process and the scenario edition process are feedback-type.

That is to say, VOBs for seamless reproduction can be changed or deleted from the viewpoint of total design. In doing so, an appropriate VOB is fetched from other element streams. With such a construction, the bitstream is generated in accordance with the re-agitated scenario without elementary-encoding the picture twice.

Chapter 2: Construction of Authoring Apparatus 2.1: Internal Construction of Authoring Apparatus FIG. 4A shows the construction of the authoring apparatus.

As shown in FIG. 4A, the authoring apparatus is composed of a digital interface 11, a record unit 12, a data input apparatus 13, an elementary encode unit 14, an edit unit 15, a system encode unit 16, a process management unit 17, a disc format convert unit 18, a player emulation unit 19, and a data output apparatus 20.

These components are used in the processes shown in the flowchart of FIG. 3. The data input apparatus 13 and elementary encode unit 14 are used in the material collection process. The edit unit 15 is used in the scenario edit process. The system encode unit 16 is used in the system encode process. The disc format convert unit 18 is used in the format process. The player emulation unit 19 is used in the preview process.

2.2: Digital Interface

The digital interface 11, being achieved by the Ethernet, transfers digital data with a transfer rate of 100 Mbps. The digital interface 11 connects to the record unit 12, data input apparatus 13, elementary encode unit 14, edit unit 15, system encode unit 16, process management unit 17, disc format convert unit 18, player emulation unit 19, and data output apparatus 20.

2.3: Record Unit

The record unit 12, being achieved by a hard disk apparatus, stores several tens of Giga Bytes of digital data. The digital data is managed by a filing system. That is, digital data can be input or output in units of files or directories, the directory being a group of files.

2.4: Data Input Apparatus

The data input apparatus 13 is achieved by a digital magnetic tape apparatus and a magneto-optical disc drive apparatus connected to the encode unit. The data input apparatus 13 fetches digital video data or digital audio data from digital magnetic tape loaded into the digital magnetic tape apparatus. The data input apparatus 13 fetches digital sub-picture data being graphics data from a magneto-optical disc loaded into the magneto-optical disc drive apparatus. That is to say, the data input apparatus 13 fetches, into a multimedia data generation apparatus, images and voices filmed and recorded for creation of an application. Here, the digital magnetic tape is typically D1-type digital magnetic tape; the digital video data is non-compression YUV-type video information; the digital audio data is 16-bit PCM audio information; the digital graphics data is TIFF(Tagged Image File Format)-type data. The data input apparatus 10, in accordance with instructions from the connected elementary encode unit 14, reproduces the loaded digital magnetic tape or magneto-optical disc to fetch digital data of audio, sub-picture, or video information, and outputs the fetched digital data to the connected elementary encode unit 14.

2.5: Elementary Encode Unit

The elementary encode unit 14, as shown in FIG. 4B, is composed of a video elementary encode unit 14a, an audio elementary encode unit 14b, an audio extraction unit 14c, a sub-picture elementary encode unit 14d, and an encode control unit 14e. The elementary encode unit 14 also connects to a monitor and a keyboard.

The elementary encode unit 14 is achieved by a typical personal computer and special hardware units added to the computer with a dedicated board to encode video and audio data. A control program and a program for encoding the sub-picture data are loaded into the personal computer.

The elementary encode unit 14 selectively fetches digital video data or digital audio data from the data input apparatus in accordance with parameters input by the producer, and compresses the digital video data with the MPEG method and compresses the digital audio data with the AC-3 method. The elementary encode unit 14 also compresses the digital sub-picture data with the run-length method.

For the purpose of differentiating digital data after the encode process from that before the process, hereinafter, the compressed digital video data is called video elementary stream, the compressed digital audio data is called audio elementary stream, and the compressed digital sub-picture data is called sub-picture elementary stream.

Now, the parameters input by the producer are described. Note that typically, the parameters are input via the keyboard attached to the elementary encode unit 14. It is needless to say that text data generated by another external personal computer may be input to the elementary encode unit 14 via a recording medium such as a floppy disk.

2.5.1: Encode Parameters for Video Data Encoding

FIG. 5A shows a format of encode parameters for video data encoding. The encode parameters are classified into items such as "data name," "start time code," "end time code," "VOB name," "number of voices," and "seamless flag." The elementary encode unit 14 regards the order of the encode parameters in the encode table as a temporary order of continuous reproductions in a seamless reproduction. Also, the elementary encode unit 14 regards blank lines as pauses between the continuous reproductions.

The "data name" is an identifier of a piece of digital data to be fetched by the data input apparatus 13. The "start time code" and "end time code" show a start point and an end point of encoding of the digital data identified by the "data name."

The "VOB name" indicates an name of a system stream to be interleaved by the system encode unit 16 which is described later. It should be noted here that MPEG system streams are called video objects (VOBs) in DVDs. Each VOB corresponds to one scene in a picture and is composed of a video elementary stream, audio elementary stream, sub-picture elementary stream, and management information elementary stream, which is described later, to be reproduced in synchronization together which are interleaved in the encode process.

The "number of voices" indicates the number of voices interleaved in the VOB. The value is required when the maximum bit rate of video data is obtained. Note that the number of pieces of subtitle data is not set since the bit rate of the sub-titles is small and the maximum number is determined to be 32.

The "seamless flag" indicates the VOB is reproduced with the seamless reproduction. It should be noted here that the seamless reproduction indicates a reproduction in which gaps in the reproduction cannot be detected with naked eyes, with a display rate of a plurality of images under a certain display rate. Digital video data included in a VOB with this flag ON is encoded with a reduced bit rate (* note 1).

Also, digital video data included in a VOB with this flag ON is encoded so that all GOPs (Groups of Picture) are formed as closed GOPs.

2.5.2: Encode Parameters for Audio Data Encoding

FIG. 5B shows a parameter table for audio data encoding. The parameter table includes items "data name," "start time code," "end time code," "VOB name," and "CH." The "data name" is an identifier of a piece of digital data to be fetched by the data input apparatus 13. The "start time code" and "end time code" show a start point and an end point of encoding of the digital data identified by the "data name."

The "VOB name" indicates an name of a system stream to be interleaved by the system encode unit 16 which is described later.

The "CH" indicates a channel number of a channel assigned when data is interleaved into a VOB. Up to eight channels of audio data can be interleaved. As a result, any of "0" to "7" is set in the "CH" item.

2.5.3: Encode Parameters for Sub-Picture Data Encoding

FIG. 5C shows a parameter table for sub-picture data encoding. The parameter table includes items "data name," "synchronization start time code," "synchronization end time code," "VOB name," "number of voices," and "seamless flag."

The "data name" is an identifier of a piece of digital data to be fetched by the data input apparatus 13.

The "VOB name" indicates an name of a system stream to be interleaved by the system encode unit 16 which is described later.

The "synchronization start time code" and "synchronization end time code" show synchronization points in the VOB.

The "CH" indicates a channel number of a channel assigned when data is interleaved into a VOB. Up to 32 channels of sub-picture data can be interleaved. As a result, any of "0" to "31" is set in the "CH" item.

Now, the construction of the elementary encode unit 14 is described with reference to FIG. 4B.

2.5.4: Elementary Encode Unit

The video elementary encode unit 14a encodes input digital video data to a video elementary stream with the MPEG method in accordance with an instruction received from the encode control unit 14e. For this process, the encode control unit 14e specifies a bit rate. The video elementary encode unit 14a encodes the data in accordance with the specified bit rate. The encode control unit 14e also specifies whether to form all GOPs as closed GOPs. The video elementary encode unit 14a encodes the data in accordance with this specification. The closed GOP will be described in Chapter 4.

The audio elementary encode unit 14b encodes an audiotape of digital audio data to generate a primary audio elementary stream with the AC-3 method in accordance with an instruction received from the encode control unit 14e.

The audio extraction unit 14c extracts a section from the primary audio elementary stream, the section being specified by the encode control unit 14e. The "extraction" here indicates copying of a specified section from a file of digital data stored in the hard disk apparatus into another file.

The sub-picture elementary encode unit 14d encodes input digital sub-picture data to a sub-picture elementary stream with the run-length method in accordance with an instruction received from the encode control unit 14e.

The encode control unit 14e controls a parameter reception, an audio data encode, a video data encode, an audio data extraction, and a sub-picture data encode, and performs a management control operation for changing these operations.

In the management control operation, the encode control unit 14e activates each control operation specified by the producer via the keyboard.

In the parameter reception control, the encode control unit 14e activates an editor, receives a keyboard input from the producer to obtain a parameter table, and stores the parameter table in an internal memory (not illustrated) in the elementary encode unit 14. Also, on receiving an instruction to store an encode parameter, the encode control unit 14e generates a directory called PARAMETER in the record unit 12, and stores the generated encode parameter under the generated directory. After obtaining the parameter table, the encode control unit 14e reads all the VOB names shown in the table, regards these VOB names as directory names, and forms a directory structure in the record unit 12. For example, from the encode parameters shown in FIG. 5A, directories VOB #1, VOB #2, VOB #3, VOB #4, VOB #5, and VOB #6 are generated.

Figure 24A:
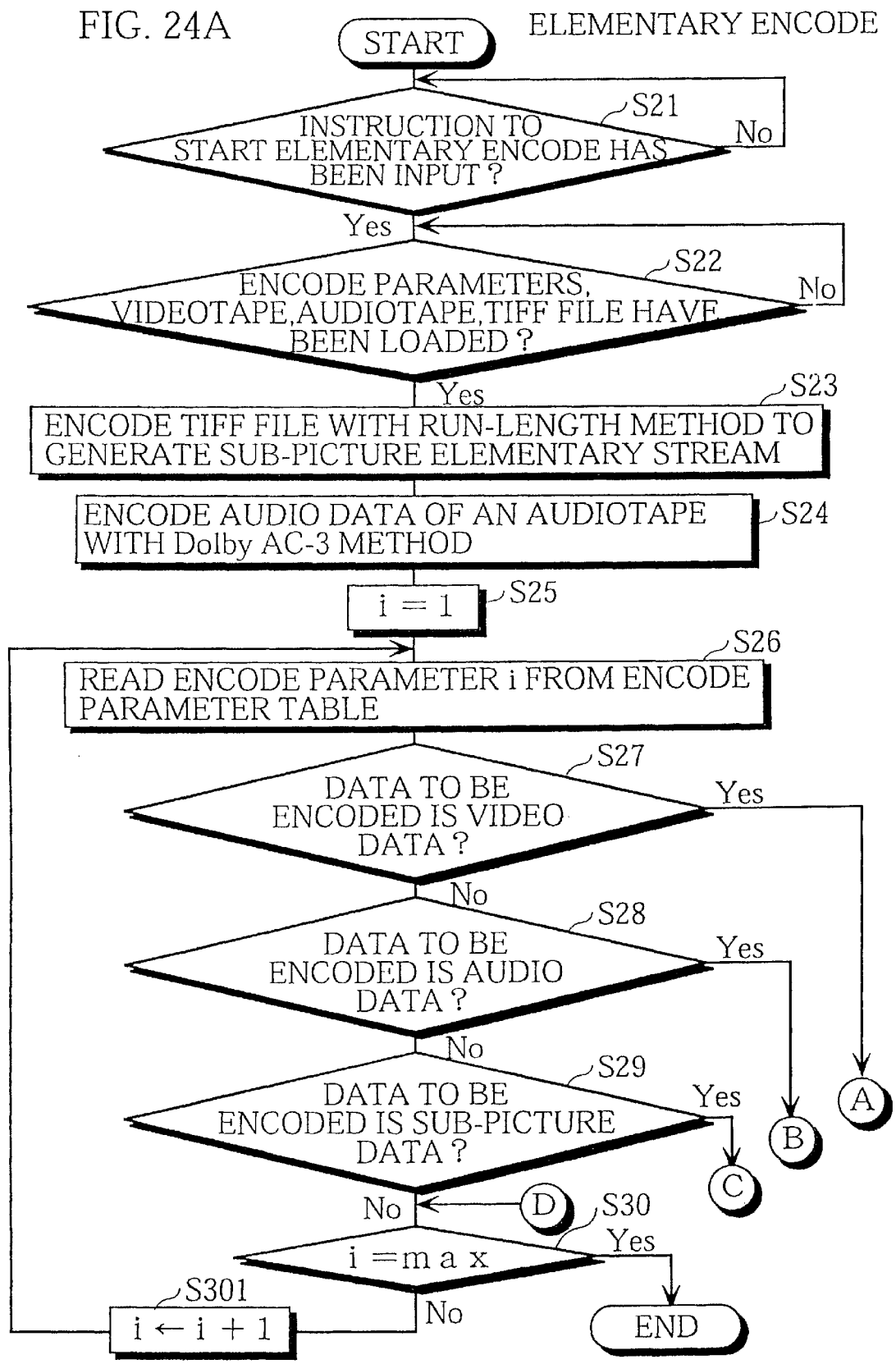
FIGS. 24A–24D are flowcharts of the procedures of the elementary encoding by the elementary encode unit 14.

FIG. 24A is a flowchart of the management control operation. The flowchart will be described in Chapter 3.

In the video data encode control, the encode control unit 14e refers to the parameter table to determine digital data to be encoded for each entry in the table, and determines a partial section. In the example shown in FIG. 5A, the encode control unit 14e refers to the first entry, determines, as an extraction target section, a section specified by the start time code and end time code for a piece of digital data called "Vsample1." The encode control unit 14e then instructs the data input apparatus 13 to extract the digital data. After the data input apparatus 13 outputs the digital data, the encode control unit 14e inputs the digital data into the video elementary encode unit 14a, in which the digital data is converted into a video elementary stream. In doing so, the bit rate is also specified. As described earlier, the bit rate is calculated based on the number of voices, the number of sub-pictures and the seamless flag specified in the parameter table. When the seamless flag is ON, the encode control unit 14e specifies to form all GOPs as closed GOPs. When the video elementary encode unit 14a outputs a video elementary stream, the encode control unit 14e stores the video elementary stream in a directory in the record unit 12 corresponding to the VOB name in the parameter table, with the same file name as the data name. In the example shown in FIG. 5A, data is stored in the directory "VOB #1" with the file name "Vsample1" from the first entry.

Figure 24B:
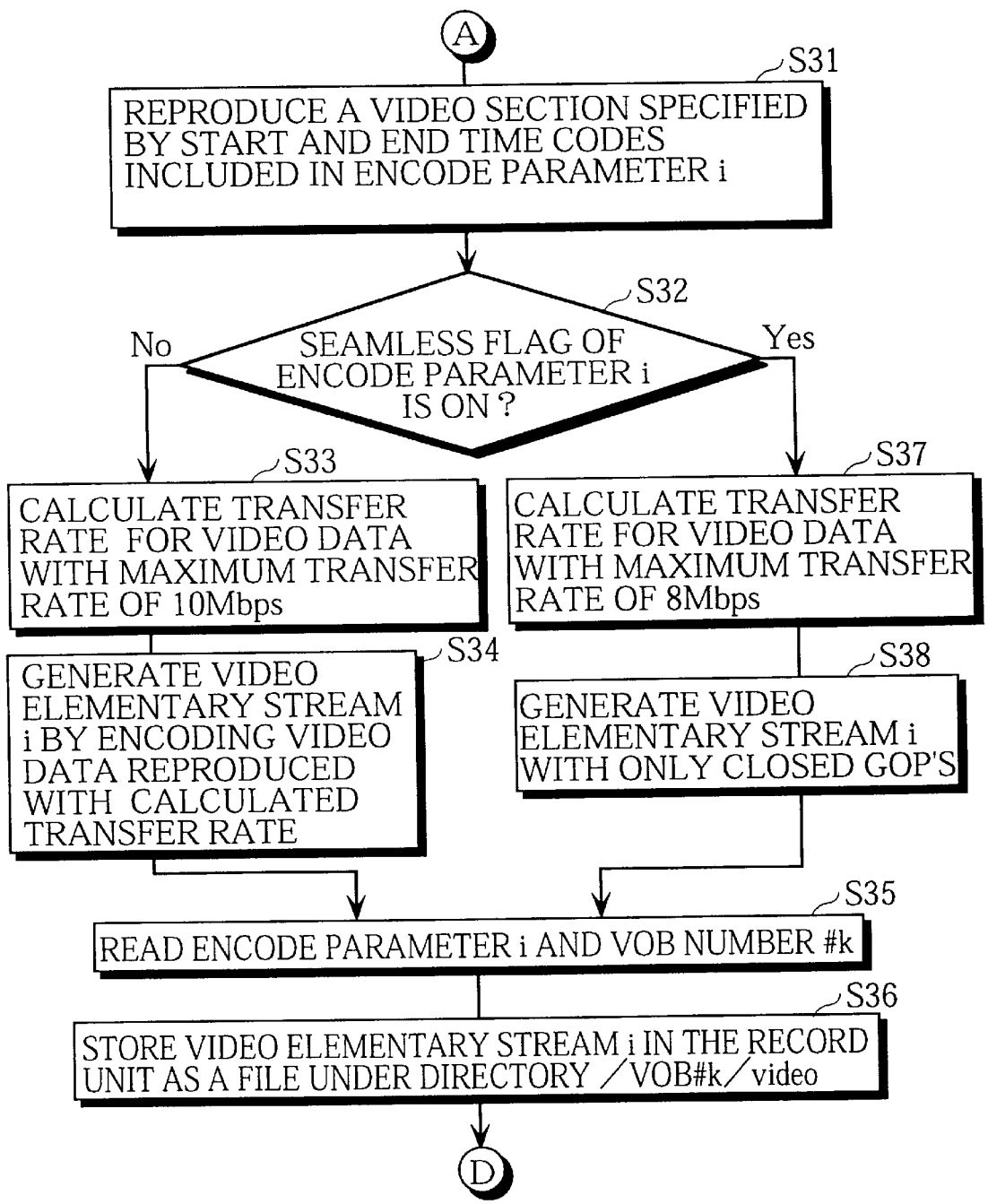

FIG. 24B is a flowchart of the video encode control. The flowchart will be described in Chapter 3.

In the audio data encode control, the encode control unit 14e instructs the data input apparatus 13 to fetch all of the digital audio data identified by the data name for each entry of the parameter table, without specifying partial sections by the time codes, in contrast to the video data encode control. That is, in the example shown in FIG. 5B, the encode control unit 14e specifies outputting of digital audio data with data names "Asample1" and "Asample2." After the data input apparatus 13 outputs the digital data, the encode control unit 14e inputs the digital data into the audio elementary encode unit 14b, in which the digital data is converted into an audio elementary stream. The encode control unit 14e stores the primary audio elementary stream in a directory in the record unit 12 with the same file name as the data name. The audio data encode control then activates the audio data extraction.

Figure 24C:
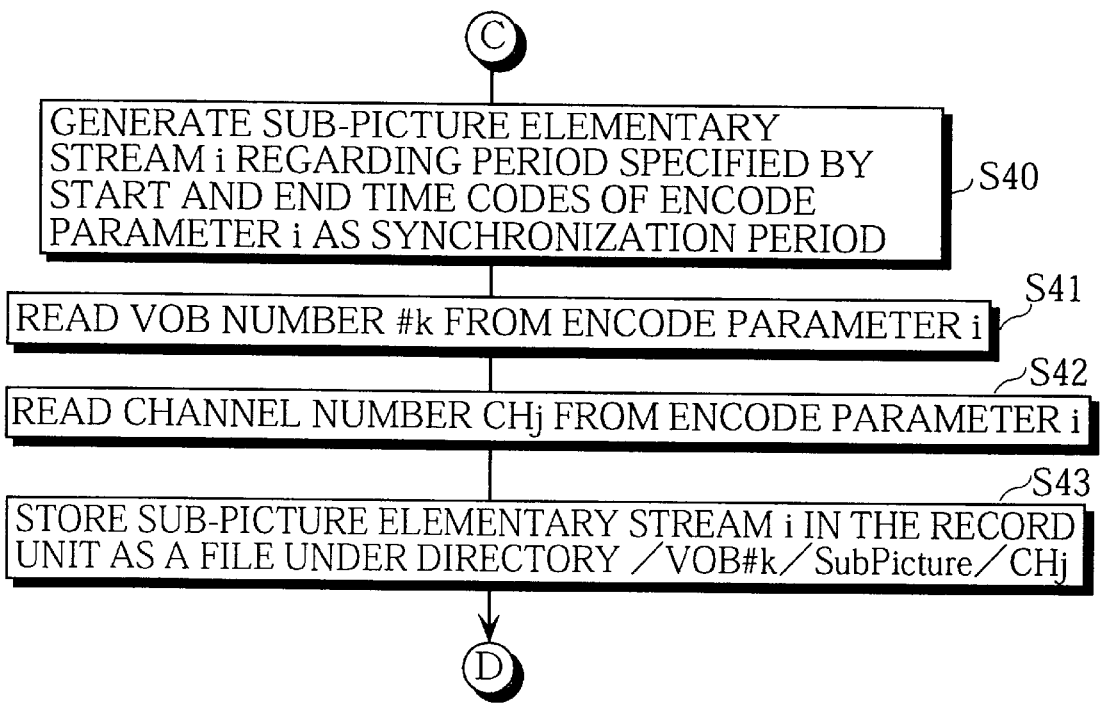
Figure 24D:
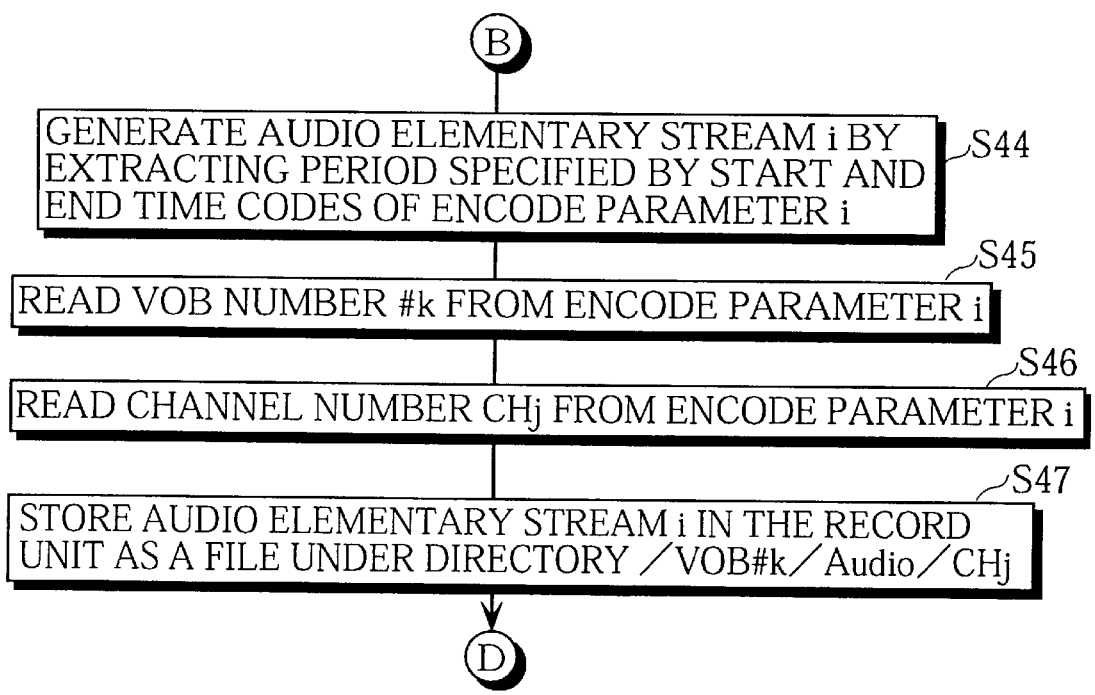

FIG. 24D is a flowchart of the audio encode control. The flowchart will be described in Chapter 3.

In the audio data extraction control, the encode control unit 14e refers to the parameter table to fetch, as other files, partial sections of the audio elementary stream on a hard disk identified by the data name, start time code, and end time code for each entry. The encode control unit 14e then stores the fetched sections under the directories specified by the VOB names corresponding to the entries in the table. In case of the audio elementary stream, eight audio elementary streams at maximum are interleaved into the same VOB, unlike the video elementary stream. As a result, a sub-directory for audio data is created under a VOB of corresponding VOB when the audio elementary stream is moved to the record unit 12. Furthermore, a sub-directory for each channel is created under the sub-directory for the audio elementary stream. As a result, the audio elementary stream is stored for each channel. For example, the file path is described as "/VOB #1/Audio/CH1/ASample1" according to the file path description format of UNIX.

In the sub-picture data encode control, the encode control unit 14e refers to the parameter table to determine digital data to be encoded for each entry in the table, and instructs the data input apparatus 13 to extract the digital data. After the data input apparatus 13 outputs the digital data, the encode control unit 14e inputs the digital data into the sub-picture elementary encode unit 14b, in which the digital data is encoded with the run-length method. The encode control unit 14e then refers to the parameter table for the synchronization time codes. The encode control unit 14e creates control data with a certain format. The control data, which allows the sub-picture element stream to be displayed as specified by the synchronization time codes, is added to the run-length-method data as header data. Also, the encode control unit 14e stores the sub-picture elementary stream in a directory in the record unit 12 with the same file name as the data name. Furthermore, a sub-directory is created for each channel under the sub-directory for the sub-picture elementary stream, in the same way as the audio elementary stream. Accordingly, the sub-picture elementary stream is stored for each channel.

FIG. 24C is a flowchart of the sub-picture encode control. The flowchart will be described in Chapter 3.

The following is the description of the other components of the authoring apparatus.

2.6: Edit Unit

The edit unit 15, being achieved by a general-purpose personal computer with a scenario editor for editing reproduction scenarios, provides an interactive production environment using a monitor, keyboard, and mouse to the user.

The edit unit 15 activates a program as a producer interface called GUI. The GUI helps the scenario editor interpret instructions input by the producer via the mouse apparatus. Note that the GUI and mouse are not detailed here since they are not relevant to the present embodiment. Generally, a GUI under Windows (TM) for PC-AT compatible machines or a GUI under MacOS (TM) for personal computers made by Apple Inc. may be used.

The "reproduction scenario" is information indicating the order of reproduction for one scene in a picture. The scenario editor is an editor used for creating an illustrated composition of the reproduction scenario.

2.6.1: Reproduction Scenario

Figures 6A, 6B, 6C:
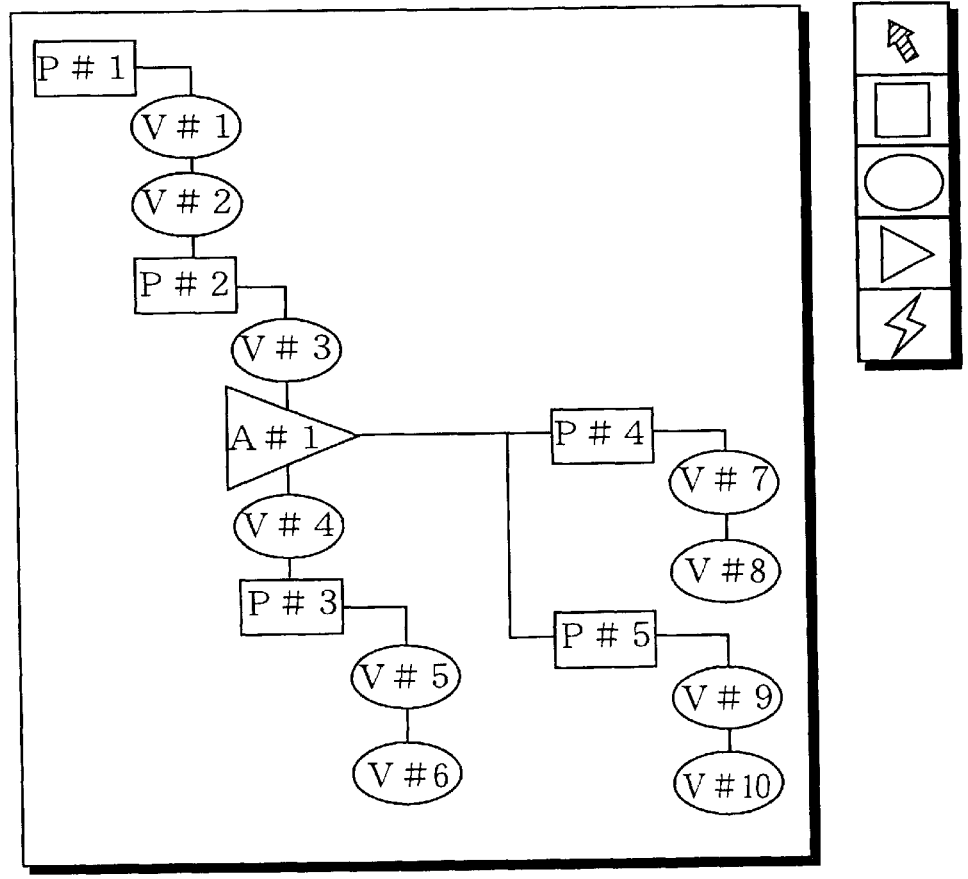
FIG. 6A shows an illustrated composition of a reproduction scenario after the first editing by the edit unit 15.
FIG. 6B shows the reproduction order of each rectangle in the illustrated composition of the reproduction scenario.
FIG. 6C shows the contents of the exclusive reproduction block in the illustrated composition of the reproduction scenario.

FIG. 6A shows an illustrated composition of a reproduction scenario described with the scenario editor. The rectangles P #1–P #5 represent reproduction routes as minimum units. Each line extending from these rectangles connects to one or more ovals. The ovals represent VOBs and show the corresponding VOB names inside themselves. Each line indicates VOBs to be reproduced in the order, showing links between VOBs from the viewpoint of reproduction.

When a line connects to another rectangle at the end, it indicates that another reproduction route starts from there. The lines may also connect to triangles which represent exclusive reproduction blocks. Each line extending from a side of a triangle branches and connects to two rectangles which are selectively reproduced.

In the illustrated composition shown in FIG. 6A, each rectangle connects to one or more VOBs to be reproduced without branches. The VOBs are reproduced in the order. Each route can specify another route to be reproduced. For example, the illustrated composition shown in FIG. 6A is interpreted as shown in FIG. 6B. In route P #1, VOB "V #1" is reproduced first, then VOB "V #2." After the reproduction of route P #1, route P #2 is reproduced.

The route P #2 includes exclusive reproduction route A #1. The exclusive reproduction route is called an exclusive reproduction block. A route selected in each exclusive reproduction block is indicated by exclusive reproduction block information stored in an internal memory. FIG. 6B shows the contents. That is, in the route P #2, VOB "V #3" is reproduced first. Then, in the exclusive reproduction route A #1, either route P #4 or P #5 is reproduced. Returning to the route P #2, VOB "V #5" is reproduced. The route P #3 is then reproduced.

2.6.2: Scenario Editor

The edition mode dealt with by the scenario editor is classified into a route change mode, a route add mode, a VOB add mode, an exclusive reproduction block add mode, and an interactive control add mode. The route add mode is used to add reproduction routes to an edited reproduction scenario. The VOB add mode is used to add reproduction routes to an edited reproduction scenario. The exclusive reproduction block add mode is used to add exclusive reproduction blocks to an edited reproduction scenario. Only VOBs with the seamless flags ON can be assigned to the added exclusive reproduction blocks.

The interactive control add mode is used to add information to a VOB in the reproduction scenario to achieve an interactive control, which allows the edit unit 15 to generate sub-pictures and management information.

The reference sign a11 in FIG. 6A represents a tool box for receiving a specification of an operation mode of the scenario editor. The tool box includes five edition modes respectively represented by small images of an arrow, a rectangle, an oval, a triangle, and a thunder. When the user clicks a mouse button on a small image, the GUI program recognizes that the edition mode is changed to the route change mode based on coordinate information and an ON signal input from the mouse. Similarly, when the small image of rectangle is entered with the mouse, the route add mode is activated. When the small image of oval is entered, the VOB add mode is activated. When the small image of triangle is entered, the exclusive reproduction block add mode is activated. When the small image of thunder is entered, the interactive control add mode is activated.

The route change mode enables the user to change the reproduction scenario shown in FIG. 6A. With the drag and drop operation on the mouse, positions of the rectangles, ovals, and triangles in the illustrated composition can be changed. For example, while the user holds down the rectangle of VOB V #1, the selection state of the rectangle continues. By dragging and releasing the rectangle between the rectangles of VOB V #7 and VOB V #8 on the line of route P #4, the rectangle of VOB V #1 is inserted there. At the same time, the rectangle is deleted from the original position.

After the above operation, the scenario is changed so that after the reproduction of VOB V #1 in route P #1, route P #2 is reproduced. And in route P #4, the VOBs are reproduced in the order of V #7, V #1, and V #8. When the user presses the delete key on the keyboard while any of the rectangles, ovals, and triangles is selected, the selected one is deleted from the route.

Similarly, in the route add mode, a new route is added to the scenario shown in FIG. 6A at a position specified with the mouse.

Similarly, in the VOB add mode, a new VOB is added to the scenario shown in FIG. 6A at a position specified with the mouse.

Similarly, in the exclusive reproduction block add mode, a new exclusive reproduction block is added to the scenario shown in FIG. 6A at a position specified with the mouse.

The operation of the edit unit 15, which is shown in the flowcharts of FIGS. 25A–27B, will be described in Chapter 3.

2.6.3: Generation of Sub-Pictures

In the sub-picture generation operation, the sub-picture elementary streams related to the interactive reproduction are generated to be interleaved into VOBs.

The sub-picture generation operation is shown in the flowchart of FIG. 27A and will be described in Chapter 3.

2.6.4: Generation of Management Information

In the management information generation operation, the management information elementary streams are generated to be interleaved into VOBs.

The management information elementary stream includes the following information in time series: a transfer rate required to reproduce the video, audio, and sub-picture data for about 0.5 seconds; a transfer rate required for each of the video, audio, and sub-picture stream; management information for specifying a buffer size. The present flowchart describes an interactive reproduction control which synchronizes with the images, voices, and sub-pictures with the time accuracy of about 0.5 seconds, where reproduction control information for achieving the interactiveness is included in the management information elementary stream.

Figure 27B:
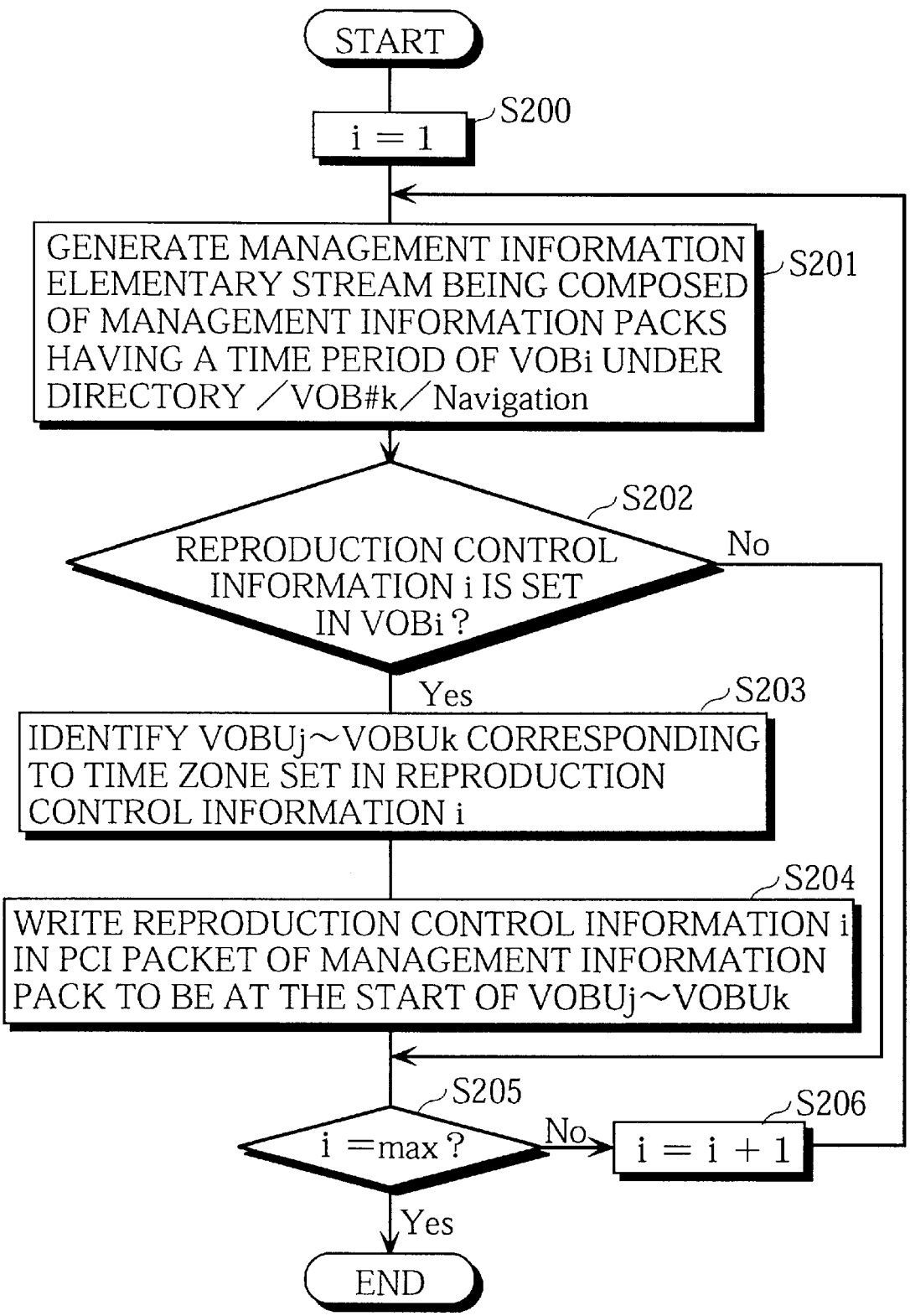

The management information generation operation is shown in the flowchart of FIG. 27B and will be described in Chapter 3.

2.7: Process Management Unit

The process management unit 17 performs a system encode in which the video, audio, sub-picture, and management information elementary streams are interleaved in synchronization with the completion of the reproduction scenario edition by the edit unit 15.

The construction of the process management unit 17 is shown in FIG. 4C. As shown in the drawing, the process management unit 17 is composed of a system encode parameter generation unit 17a and a management unit 17b.

2.7.1: System Encode Parameter Generation Unit

The system encode parameter generation unit 17a generates VOB construction information and VOB connection relation information as parameters used for the system encode. The VOB construction information shows what elementary streams make up a VOB as a system stream. This information is used by the system encode unit 16 when it performs interleaving. The VOB construction information is generated from the directory/file construction under VOB directories stored in the record unit 12. That is, each elementary stream under each VOB directory is each elementary stream making up each VOB. The VOB connection relation information specifies a VOB related to the seamless reproduction and shows the VOBs before and after the present VOB. The VOB connection relation information is used in the transfer process which is performed to enable the seamless reproduction. The VOB connection relation information is generated based on the reproduction scenario recorded in the record unit 12.

Figures 7A, 7B:
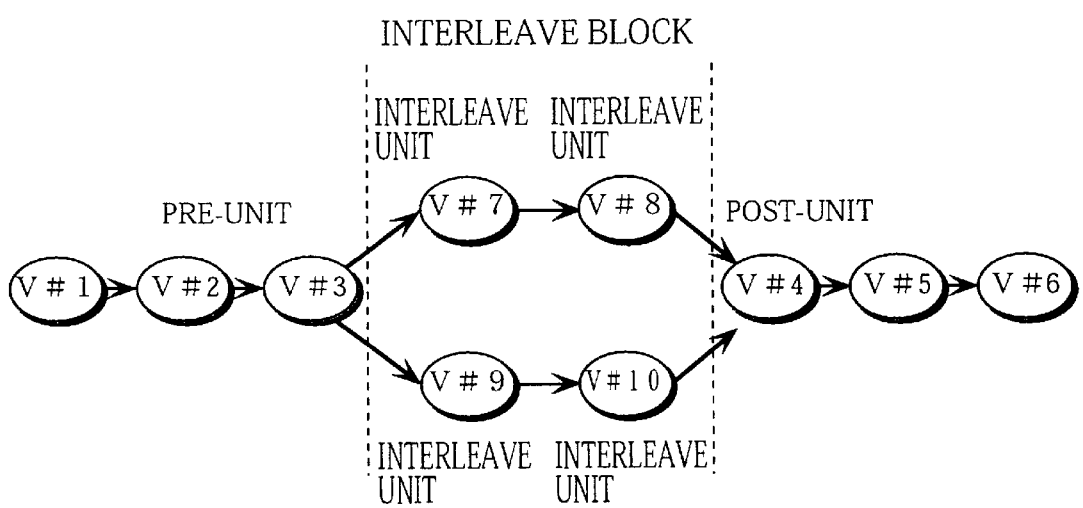
FIG. 7A shows VOB connection relation information.
FIG. 7B shows reproduction orders of VOBs in accordance with the VOB connection relation information shown in FIG. 7A.

FIG. 7A shows the data format of the VOB connection relation information. As shown in the drawing, the data format is represented as a table. The table includes columns "VOB," "pre-connection type," "pre-connection VOB, " "post-connection type," "post-connection VOB," and "interleave flag."

The "VOB" column shows VOB names belonging to a node. The node is an idea representing a group of VOBs. Some nodes may include one or more VOBs in common, others may not. As a result, a plurality of different pieces of VOB connection relation information for respective nodes may include the same VOBs in common. Needless to say, in this case, the same VOB is reproduced more than once.

The "pre-connection type" column shows the connection relation between the present VOB and the preceding VOB (s). The connection relation is divided into SINGLE and MERGE. FIG. 7B shows the VOB connection relation information for the reproduction scenario shown in FIG. 6A. According to FIG. 7B, VOB V #4 is reproduced after either VOB V #8 or V #10. That is, two VOBs in the exclusive reproduction merge into VOB V #4. Accordingly, when the present VOB has two preceding VOBs, the column shows MERGE; when the present VOB has one or no preceding VOB, the column shows SINGLE.

The "pre-connection VOB" column shows the preceding VOB. When the pre-connection type is MERGE, the column shows a plurality of VOBS.

The "post-connection type" shows the connection relation between the present VOB and the next VOB(s). The connection relation is divided into SINGLE and BRANCH. The SINGLE here is the same as the pre-connection type. VOB V #3 in FIG. 7B is defined as BRANCH. That is, a VOB before the exclusive reproduction is defined as BRANCH.

The "post-connection VOB" shows the next VOB. When the post-connection type is BRANCH, the column shows a plurality of VOBs.

The "interleave flag" column indicates whether the present VOB is reproduced in a VOB interleave (*note 7). In the case of the VOB interleave, the VOB is divided into a plurality of interleave units when it is recorded in a disc. The flag is set to ON for the VOB connection relation information in an exclusive reproduction block.

Figure 28:
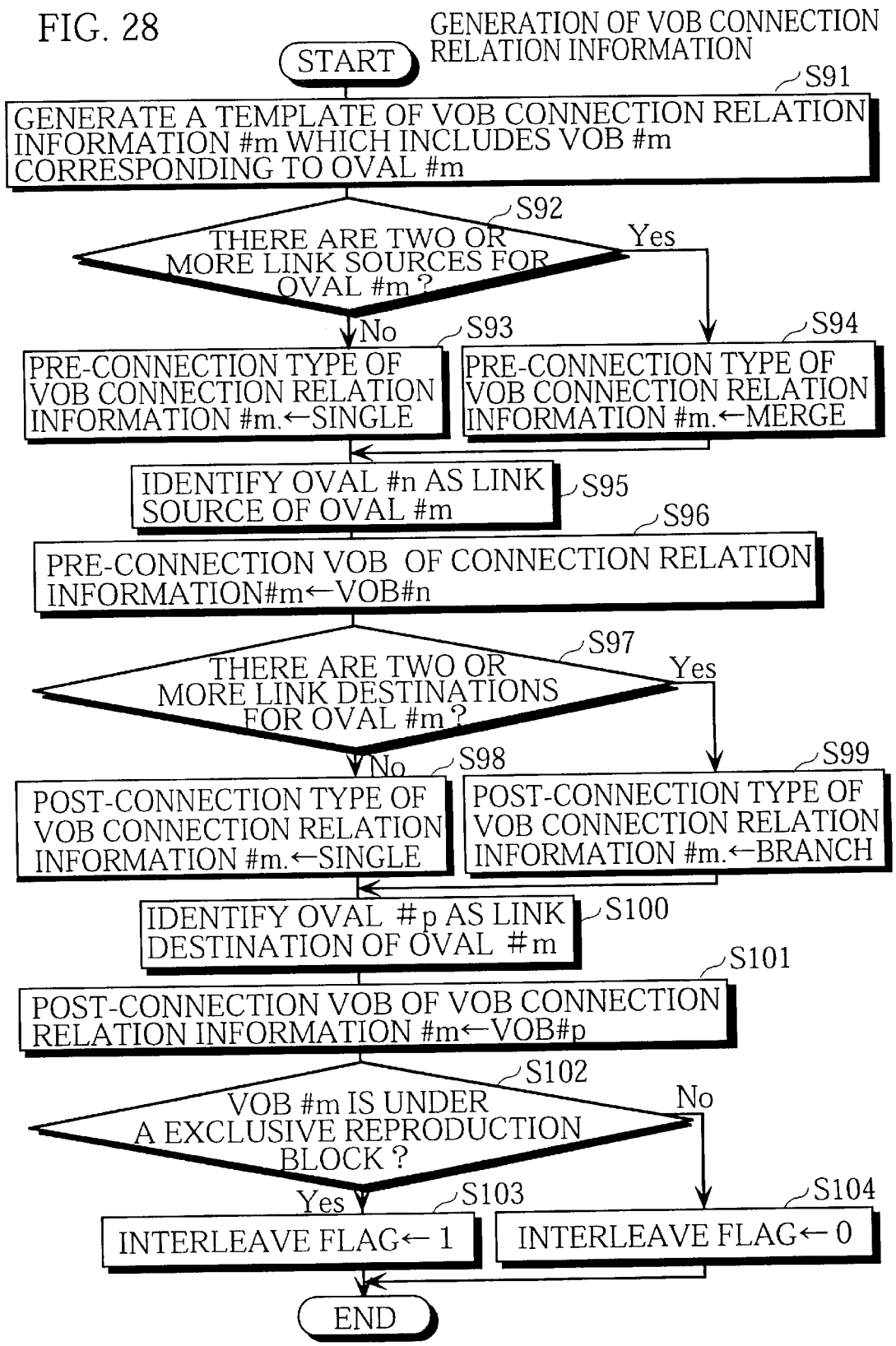
FIG. 28 shows a flowchart of the automatic generation of the VOB connection relation information.

FIG. 28 shows a flowchart of generating the VOB connection relation information from the reproduction scenario. The flowchart will be described in Chapter 3.

2.7.2: Management Unit

The management unit 17b controls the entire process management unit 17. The management unit 17b also controls the system encode unit 16, disc format convert unit 18, and data output apparatus 20. On receiving an instruction from the attached keyboard, the management unit 17b refers to the reproduction control information and parameters for the elementary encode check whether the temporary reproduction order of VOBs for the seamless reproduction has been changed by the edit unit 15. Synchronization between images and voices will go out of adjustment due to the difference between the sampling rates of the image and voice if the order is changed. The reason for this will be explained later in Chapter 3 in relation to the audio extraction process. When judging that the temporary reproduction order of VOBs has been changed, the management unit 17b instructs the audio extraction unit 14 to extract the certain section again in accordance with the changed reproduction order. After the re-extraction by the audio extraction unit 14, the management unit 17b instructs the system encode unit 16 to interleave the extracted audio elementary stream, the video, sub-picture, and management information elementary streams in one VOB. After the system encode process, the management unit 17b instructs the disc format convert unit 18 to generate a disc image.

Figure 29:
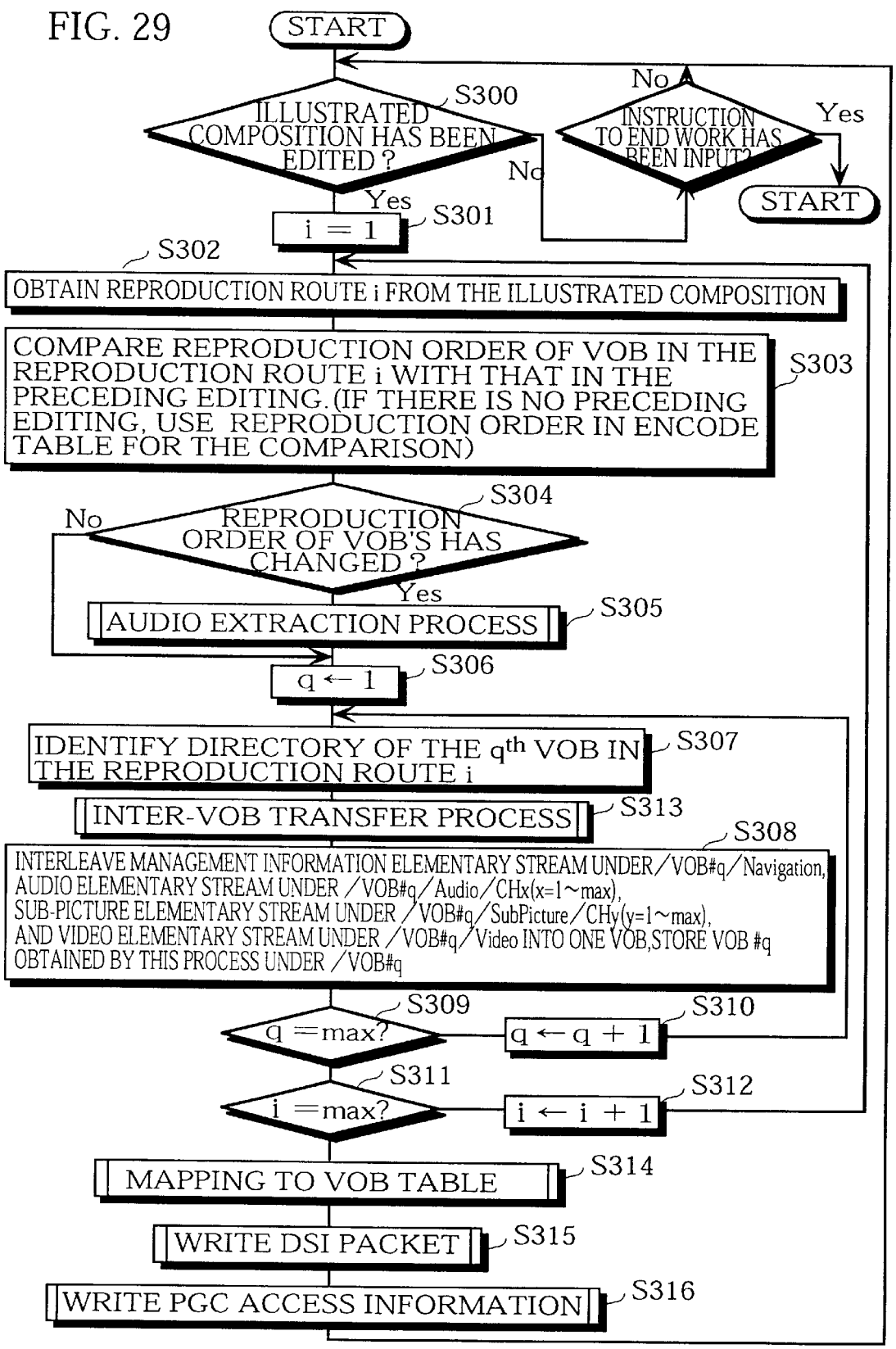
FIG. 29 shows a flowchart of the process management process performed by the process management unit 17.

FIG. 29 shows a flowchart of the process management process performed by the management unit. The flowchart will be described in Chapter 3.

2.8: System Encode Unit

The system encode unit interleaves the video, audio, sub-picture, and management information elementary streams into one VOB in accordance with system encode parameters generated by the process management unit 17. This interleave process is also called a system encode. The interleave process of the present embodiment is divided into a first stage and a second stage.

The first stage is performed to secure the seamless reproduction. In the first stage, the video and audio components transferred between continuously reproduced VOBs are identified and the transfer amount is calculated. In the present embodiment, the "component" is used as unit data to be stored in 2 KB-packs. A "component" is also called a block. With regard to the reason why the components need be transferred between VOBs, refer to *note 6 in Chapter 4.

The second stage is performed to system-encode each elementary stream in accordance with the VOB construction information and the transfer amount calculated in the first stage as parameters to generate the system stream.

2.9: Disc Format Convert Unit

The disc format convert unit 18 generates the disc image in accordance with an instruction from the management unit 17b. The "generation of the disc image" indicates that the reproduction scenario edited by the edit unit 15 and the VOBs interleaved by the system encode unit 16 are assigned logical addresses on the DVD area, and that the bitstream for recording (*note 9) is generated.

The information storage area on DVD is achieved on a spiral track formed in the direction from the center to circumference. The disc format convert unit 18 outputs the bitstream for recording in which the VOBs and the disc indexes are assigned addresses on the spiral track.

The "disc index" (*note 10) is information including the reproduction scenario edited by the edit unit 15.

2.10: Player Emulation Unit

The player emulation unit 19 receives the bitstream to be recorded into the DVD disc from the disc format convert unit 18 and temporarily reproduces the bitstream by emulating the reproduction function of the disc reproduction apparatus.

2.11: Data Output Apparatus

The data output apparatus 20, connected to a tape deck, records the input digital data into digital magnetic tape. As a result, the bitstream to be recorded into disc generated by the disc format convert unit 18 is eventually stored in the magnetic tape by the data output apparatus 20. The finished bitstream for recording is fetched from the authoring apparatus and shipped to the factory for pressing the DVD. In the factory, the bitstream is converted to a physical data sequence. The physical data sequence include volume data with ECC (Error Check Code), Eight-to-Sixteen conversion, data in the lead-in area and lead-out area. A master DVD disc is produced by using the physical data sequences. Then, DVD discs as the copies of the master DVD disc are manufactured by using a pressing machine.

Conventional CD manufacturing machines may be used for manufacturing the above-constructed DVDs except a part of logical data sequences related to the DVD data construction. With regard to this matter, please refer to Heitaro Nakajima and Hiroji Ogawa: Compact Disc Dokuhon, Ohmu Ltd. and Applied Physics Society Optics Meeting: Optical Disc System, Asakura Shoten.

2.12: Role of Each Element in Entire Process

Each component element of the authoring apparatus is described above. Now, the roles of such component elements in the entire process shown in FIG. 3 are described. In the elementary encode process of steps S4 to S7, the producer generates encode parameters using a keyboard attached to the elementary encode unit 14. By referring to the parameter table, the producer obtains information on the parts to be encoded among the video, audio, and sub-picture materials and also obtains information on the video information that may be included in the seamless reproduction. When instructed to start encode, the elementary encode unit 14, in accordance with the generated encode parameters, instructs the data input apparatus 13 to reproduce the video, audio, and sub-picture materials from the external magnetic tape or magneto-optical disc. The elementary encode unit 14 then encodes the reproduced materials to generate video, audio, and sub-picture elementary streams, respectively. The video information that may be included in the seamless reproduction is encoded with a reduced bit rate. The encoded elementary streams are stored in the directories in the record unit 12.

In step S8 of the scenario edition process, the producer uses the monitor, keyboard, and mouse attached to the edit unit 15 to edit the scenario of reproduction. In this edition process, a plurality of VOBs to which the seamlessness should be given are determined, and the reproduction control information for achieving the interactive operations in the reproduction by the reproduction apparatus is also set. When all the editing processes are complete, a GUI is used to store the generated reproduction scenario in the record unit 12. The sub-picture element stream and management information element stream are also generated as the reproduction control information is set. These elementary streams are stored in the VOB directories in the record unit 12. In addition, the encode parameter table is updated.

In step S9 of the system encode process, the producer activates the process management unit 17 by inputting instructions to the keyboard attached to the process management unit 17 to generate system encode parameters before the system encode.

The system encode parameters include the VOB construction information and VOB connection relation information.

After the system encode parameters are generated, it is checked whether the temporary reproduction order of VOBs for the seamless reproduction, which has been made with the encode parameters, has been changed. When it is judged that the temporary reproduction order has been changed, a certain section of an audio elementary stream is extracted again in accordance with the changed reproduction order to prevent synchronization between images and voices from going out of adjustment. The management unit 17b instructs the system encode unit 16 to interleave the extracted audio elementary stream, the video, sub-picture, and management information elementary streams in one VOB.

In the system encode process, the transfer amount of the VOBs for seamless reproduction is calculated and VOBs are generated based on the calculated transfer amount.

In the calculation of the transfer amount, it is judged, in accordance with the VOB connection relation information, whether the audio component and video component of the end of a VOB need be transferred to the start of the next VOB. When it is judged so, the transfer amount of the audio component, and video component if necessary, of the end of the VOB is calculated.

After the transfer amount is calculated, a system stream is generated by interleaving necessary elementary streams in accordance with the VOB construction information and the calculated transfer amount.

In step S10 of the format process, the producer activates the system encode unit 16 by inputting instructions to the attached keyboard to generate parameters used for generating the bitstream to be recorded into a disc. More particularly, the producer generates, in accordance with the reproduction scenario, parameters which indicate VOBs for the VOB interleave. After the parameters are generated, the disc format convert unit 18 arranges the VOBs stored in the record unit 12 in accordance with the data structure for DVD and generates the bitstream. In doing so, the VOBs for the VOB interleave are subjected to necessary processes in accordance with the parameters.

The preview process is then performed. In step S14, it is judged whether the size of the bitstream is within the capacity of the DVD. If it is judged so, in step S11, the player emulation unit 19 emulate-reproduces the bitstream to preview the reproduction defined by the scenario. In step S12, it is judged whether every scene from the opening scene to the ending scene in the reproduction is satisfactory. If it is judged so, the generated bitstream is shipped to a factory for pressing the DVD.

When it is judged as negative in step S14 or S12, for example, when an NG scene is detected, control goes to step S13. In step S13, the producer agitates the scenario again by fetching an appropriate scene for replacement from other elementary streams. Control then returns to step S8. In step S8 of this round, the producer uses a GUI to edit the scenario by replacing a defect scene to the fetched scene.

Chapter 3: Operation of Each Component
3.1: Operation of Encode Control Unit The encode control unit performs a management control, video encode control, audio encode control, sub-picture encode control. These operations are described below with reference to the flowcharts.

3.1.1: Management Control

FIG. 24A is a flowchart showing the procedure of the management control performed by the elementary encode control unit 14e. The variable i appearing in this flowchart specifies an arbitrary encode parameter among a plurality of manually input encode parameters in the encode parameter table. The variable i is regarded as an ordinal number. Accordingly, in the present flowchart, "encode parameter i" indicates the $i^{th}$ encode parameter in the encode parameter table. The maximum value of the variable i is represented as "max" in the present flowchart.

In step S21, the process waits for the producer to enter an instruction to start the encode. When it is judged in this step that the producer has entered the instruction, control goes to step S22. In step S22, it is judged whether the encode parameters, videotape, audiotape, TIFF file are loaded into the data input apparatus 13. When judged so, control goes to step S23. In step S23, the TIFF file recorded in a magneto-optical disc is encoded with the run-length method to generate a sub-picture elementary stream. In the succeeding step S24, audio data of an audiotape is encoded with Dolby AC-3 method to generate a primary audio elementary stream.

In the following step S25, variable i is set to "1." In step. S26, encode parameter i is read from the encode parameter table. In step S27, it is judged by analyzing the read encode parameter i whether the data to be encoded is video data. When it is judged so, control proceeds to the flowchart shown in FIG. 24B to perform a video data encode control.

In step S28, it is judged by analyzing the read encode parameter i whether the data to be encoded is audio data. When it is judged so, control proceeds to the flowchart shown in FIG. 24D. In step S29, it is judged by analyzing the read encode parameter i whether the data to be encoded is sub-picture data. When it is judged so, control proceeds to the flowchart shown in FIG. 24C.

Control returns to step S30 of the present flowchart from the respective processes shown in FIGS. 24B, 24C, and 24D. In step S30, it is judged whether the variable i is equal to "max." When it is judged that the variable i is not equal to "max," control goes to step S301. In step S301, the variable i is incremented by 1, and control returns to step S26.

3.1.2: Video Encode Control

FIG. 24B is a flowchart showing the procedure of the video data encode control. In step S31, encode parameter i, which is input manually by the producer, is read, a section specified by the start time code and the end time code included in the read encode parameter i is determined as an encoding target, and the data input apparatus 13 is instructed to reproduce the section. The data input apparatus 13 reproduces only the section of the video tape specified by the start time code and the end time code. In step S32, it is judged whether the seamless flag of the encode parameter i is ON.

When it is judged in step S32 that the seamless flag of the encode parameter i is OFF, control goes to step S33. In step S33, a transfer rate for the video data is calculated based on the number of voices and sub-pictures specified in the parameter table, where the maximum transfer rate here is 10 Mbps.

In step S34, a video elementary stream i is generated by encoding the video data which has been reproduced with calculated transfer rate. When it is judged in step S32 that the seamless flag of the encode parameter i is ON, control goes to step S37. In step S37, a transfer rate for the video data is calculated, where the maximum transfer rate here is 8 Mbps. In the following step S38, a video elementary stream i is generated. The generated video elementary stream i is composed of only closed GOPs.

In step S35, the encode parameter i and VOB number "#k" are read. In step S36, the video elementary stream i is stored in the record unit 12 as a file under a directory "/VOB #k/Video."

Through the above-described video elementary encode, a lot of scenes are collected, including auxiliary scenes for replacement.

3.1.3: Audio Encode Control

FIG. 24D is a flowchart showing the procedure of the audio data encode control. In step S44, the audio extraction unit 14c extracts a section specified by the start time code and the end time code included in the read encode parameter i to generate an audio elementary stream i.

In the previous step S24, the whole digital audio data of an audiotape is encoded to generate a primary audio elementary stream. This is arranged so that in step S44, a section is extracted from the primary audio elementary stream to generate an audio elementary stream.

In step S45, VOB number "#k" is read from the encode parameter i. In step S46, channel number "CHj" is read from the encode parameter i. In step S47, the audio elementary stream i is stored in the record unit 12 as a file under a directory "/VOB #k/Audio/CHj." To achieve this, first, the VOB name is read from the audio elementary stream i to create a directory having the same directory name as the read VOB name. Eight audio element streams can be interleaved into the VOB at maximum. Therefore, the directory should be secured in the record unit 12 so that eight audio element streams are separately stored under the directory. A sub-directory for audio is created under the directory of the corresponding VOB. Further, sub-directories for respective channels are created under the sub-directory for audio. The audio elementary stream is stored for each channel as a file under directory "/VOB #k/Audio/CHj."

3.1.4: Sub-Picture Encode Control

FIG. 24C is a flowchart showing the procedure of the sub-picture data encode control. In step S40, the sub-picture elementary encode unit 14d encodes, with the run-length method, a TIFF file output by the data input apparatus 13. The start time code and the end time code are read from the read encode parameter i. A time stamp is generated using the read start and end time codes, the time stamp indicating that the disc reproduction displays the digital sub-picture data for a period specified by the time codes. The time stamp is added as the header data to the run-length method data to generate a sub-picture elementary stream i. In step S41, VOB number "#k" is read from the encode parameter i. In step S42, channel number "CHj" is read from the encode parameter i. In step S43, the sub-picture elementary stream i is stored in the record unit 12 as a file under a directory "/VOB #k/SubPicture/CHj." To achieve this, first, the VOB name is read from the audio elementary stream i to create a directory having the same directory name as the read VOB name. 32 sub-picture element streams can be interleaved into the VOB at maximum. Therefore, the directory should be secured in the record unit 12 so that 32 sub-picture element streams are separately stored under the directory. A sub-directory for sub-picture is created under the directory of the corresponding VOB. Further, sub-directories for respective channels are created under the sub-directory for sub-picture. The sub-picture elementary stream is stored for each channel as a file under directory "/VOB #k/SubPicture/CHj."

Now, the operation of the edit unit 15 is described below.

3.2: Edit Unit

Figure 25B:
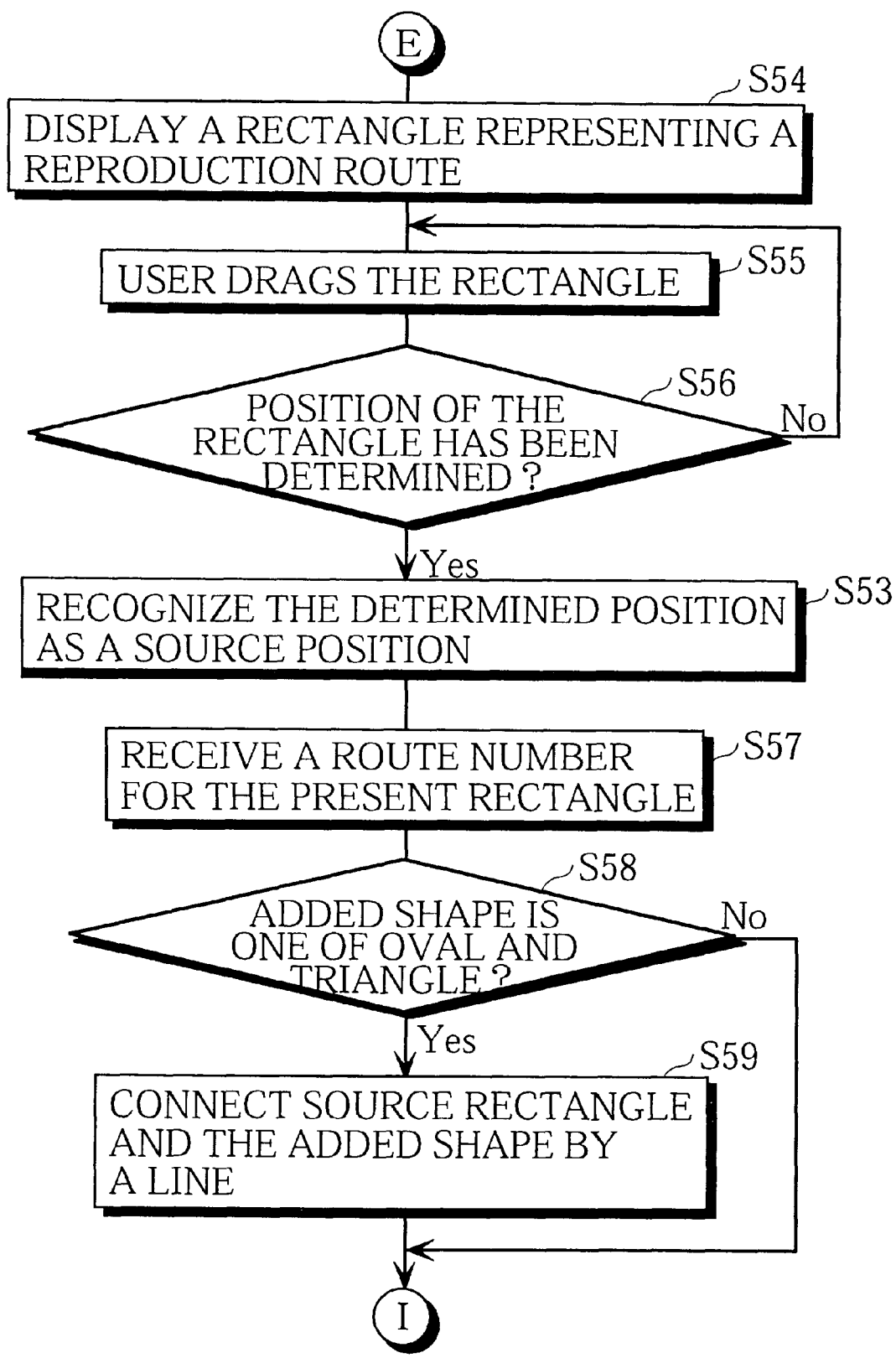

FIG. 25A is a flowchart showing the procedure of the scenario editor of the edit unit 15. FIGS. 8A–8B, 9A–8D, 10A–10E, and 12A–12C, which show display examples, are also cited to help understanding of the present flowchart. These display examples show, in time series, screens displayed on a display unit corresponding to the processes shown in FIGS. 25A–25E.

In step S50, it is judged whether any of the small images in the tool box has been specified.

3.2.1: Route Add Mode

When it is judged in step S50 that the route add mode has been specified, control goes to step S54 in the flowchart shown in FIG. 25B. In step S54, a rectangle is displayed on the screen as shown in FIG. 8A, the rectangle representing a reproduction route. In step S55, the user drags the rectangle to an appropriate position. The user determines the position by operating the mouse. In step S56, it is judged whether the position of the rectangle has been determined. When it is judged so, control goes to step S53. In step S53, the determined position is recognized as a source position. In step S57, the scenario editor receives a route number for the present rectangle as shown in FIG. 8B. In following step S58, it is judged whether the source is one of oval and triangle or neither of them.

When it is judged in step S58 that the source is one of oval and triangle, the rectangle and the source is connected by a line in step S59, and the present process ends.

3.2.2: VOB Add Mode

Figure 25C:
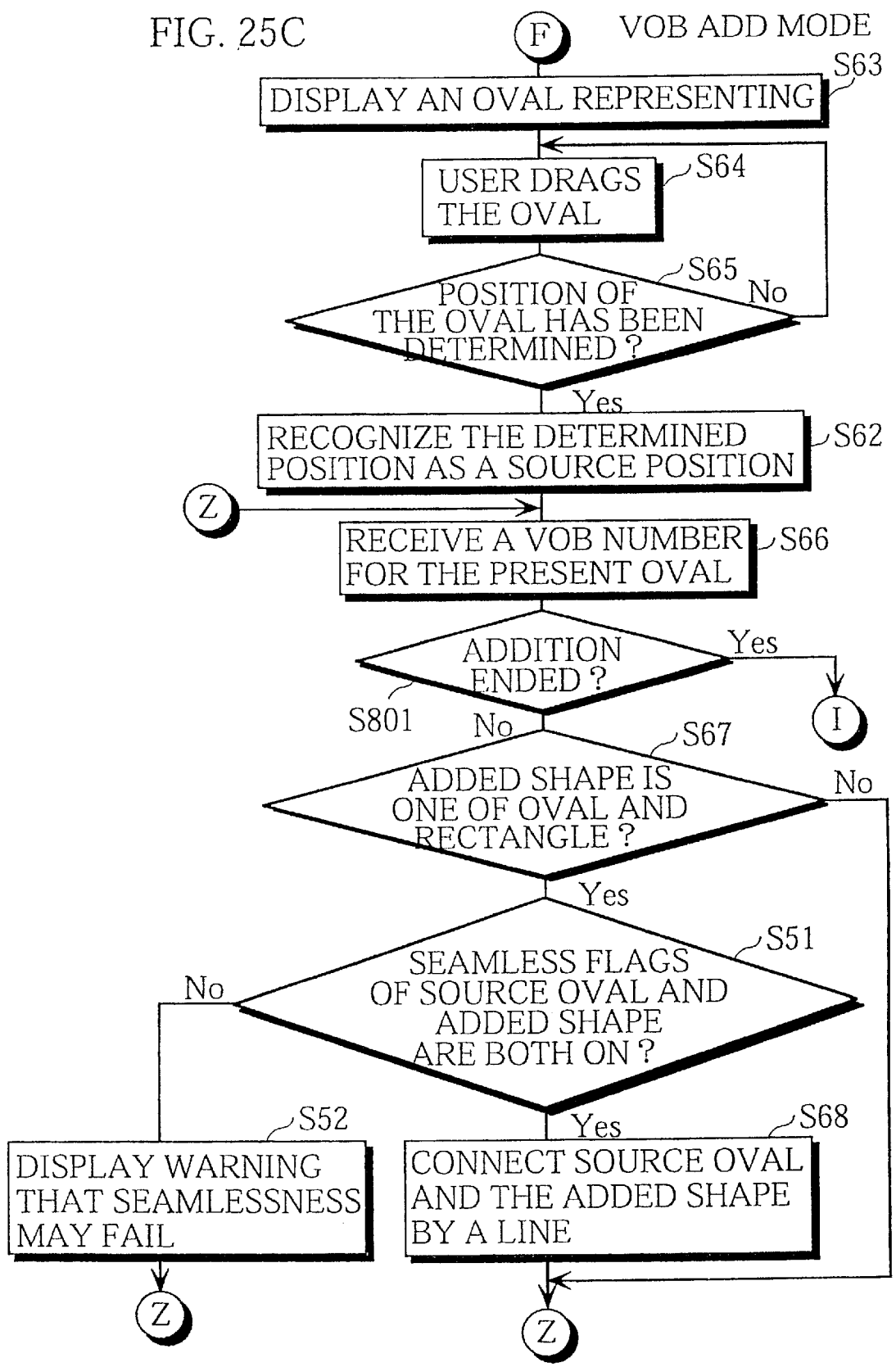

When it is judged in step S50 that the VOB add mode has been specified, control goes to step S63 in the flowchart shown in FIG. 25C. In step S63, an oval is displayed on the screen as shown in FIG. 9A, the oval representing a VOB. In step S64, the user drags the oval to an appropriate position. The user determines the position by operating the mouse. In step S65, it is judged whether the position of the oval has been determined. When it is judged so, control goes to step S62. In step S62, the determined position is recognized as a source position. In step S66, the scenario editor receives a VOB number for the present oval. In the following step S67, it is judged whether the source is one of oval and rectangle or neither of them.

Figure 11A:
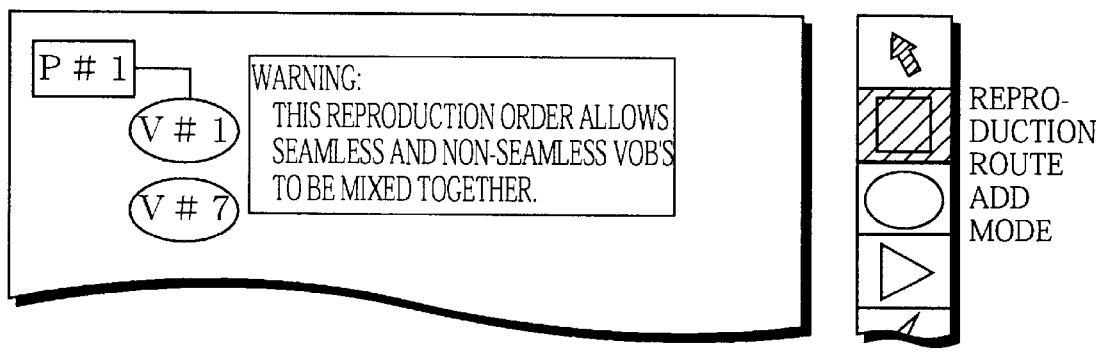
FIGS. 11A–11B show a warning displayed during the first editing by the edit unit 15.

When it is judged in step S67 that the source is one of oval and rectangle, control goes to step S51. In step S51, it is judged whether seamless flags of the oval and the source are both ON. When at least one of them is OFF, control goes to step S52. In step S52, a warning is displayed to convey that the seamlessness may fail. The warning is achieved by changing the color of the source oval or the like, as shown in FIG. 11A. The process ends after step S52.

Figure 10A:
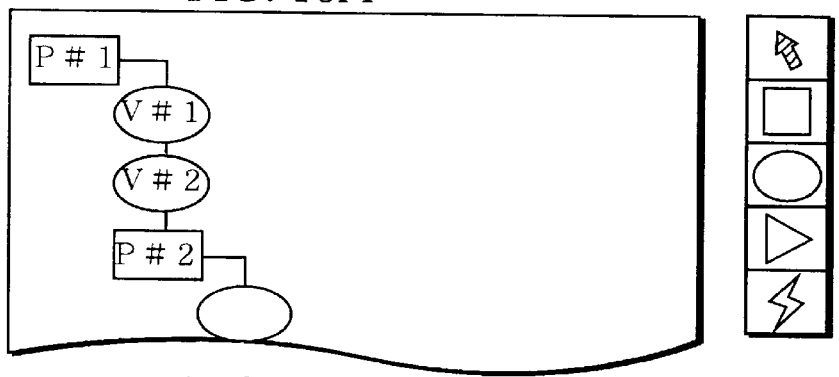
FIGS. 10A–10E show an illustrated composition of the reproduction scenario being edited in the first editing by the edit unit 15.

When it is judged as affirmative in step S51, control goes to step S68. In step S68, the oval and the source is connected by a line as shown in FIG. 9B, and the present process ends. As the above steps are repeated, VOBs are added as shown in FIGS. 9C–9D and FIG. 10A. The oval and the source are connected by a line each time the scenario editor receives an addition end operation in S66, it is judged in Step S801 that the addition has been ended, and the entire process of the present flowchart ends.

3.2.3: Exclusive reproduction Block Add Mode

When it is judged in step S50 that the exclusive reproduction block add mode has been specified, control goes to step S73 in the flowchart shown in FIG. 25D. In step S73, a triangle is displayed on the screen, the triangle representing an exclusive reproduction block. In step S74, the user drags the triangle to an appropriate position. The user determines the position by operating the mouse. In step S75, it is judged whether the position of the triangle has been determined. When it is judged so, control goes to step S72. In step S72, the determined position is recognized as a source position. In step S76, the scenario editor receives an exclusive reproduction block number for the present triangle. In following step S77, it is judged whether the source is one of oval and rectangle or neither of them.

Figure 10B:
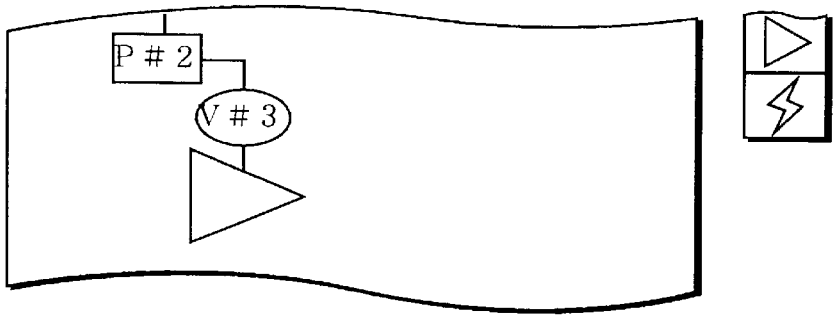
Figure 10C:
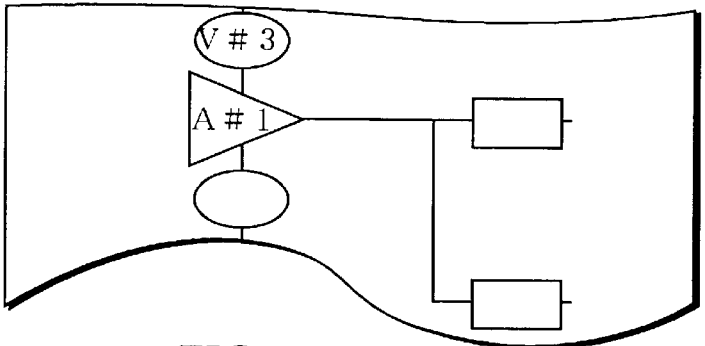
Figure 10D:
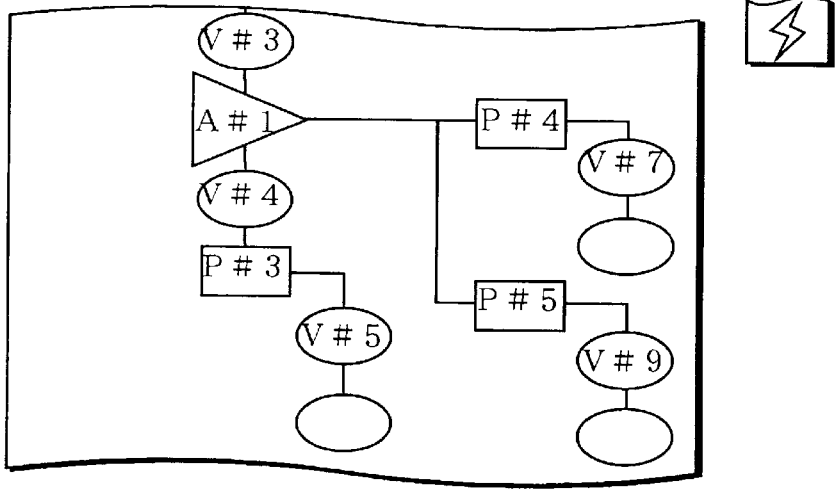
Figure 10E:
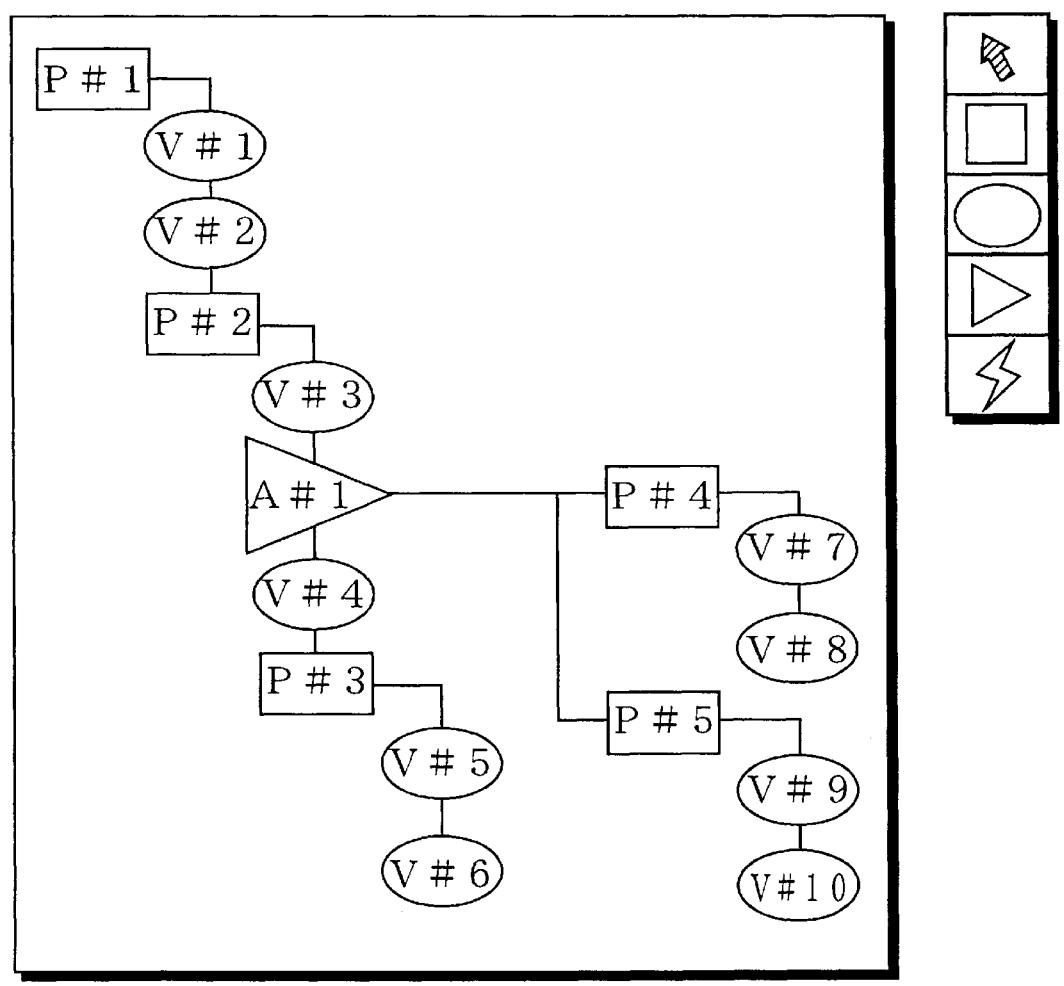
Figure 11B:
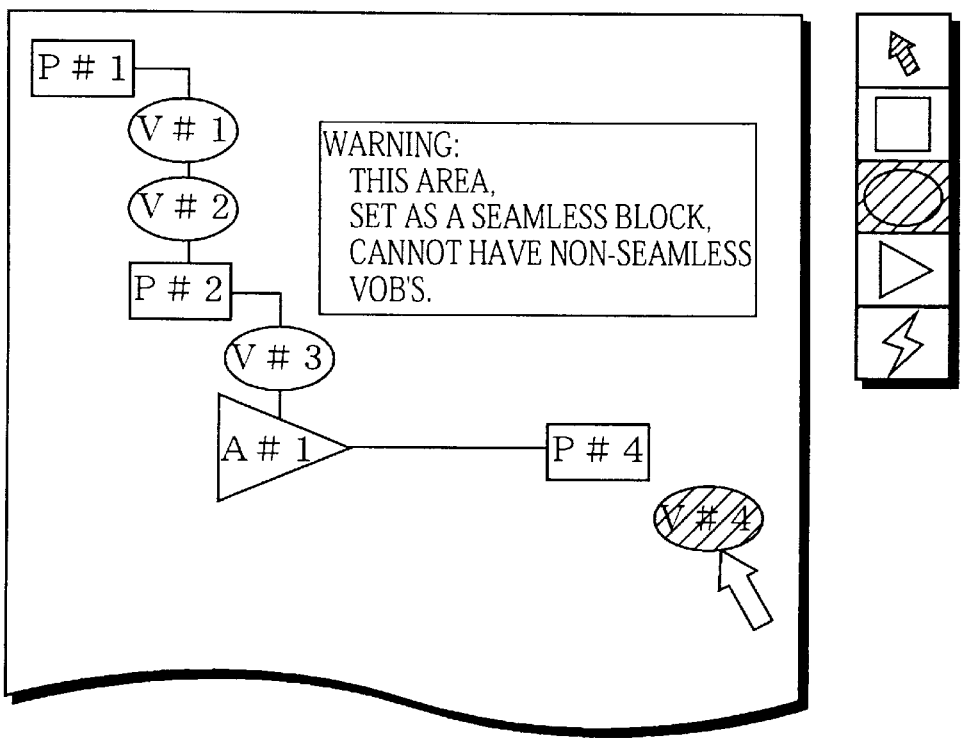

When it is judged in step S77 that the source is one of oval and triangle, the rectangle and the source is connected by a line in step S78, and the present process ends. FIG. 10B shows the screen after the rectangle and the source is connected by a line. Other rectangles or ovals are added to the present block as shown in FIG. 10C. It should be noted that after a triangle is added as described above, non-seamless ones cannot be connected to the ovals succeeding to the triangle. FIG. 11B shows a warning conveying that a non-seamless VOB cannot be connected to the oval.

3.2.4: Route Change Mode

Figure 25E:
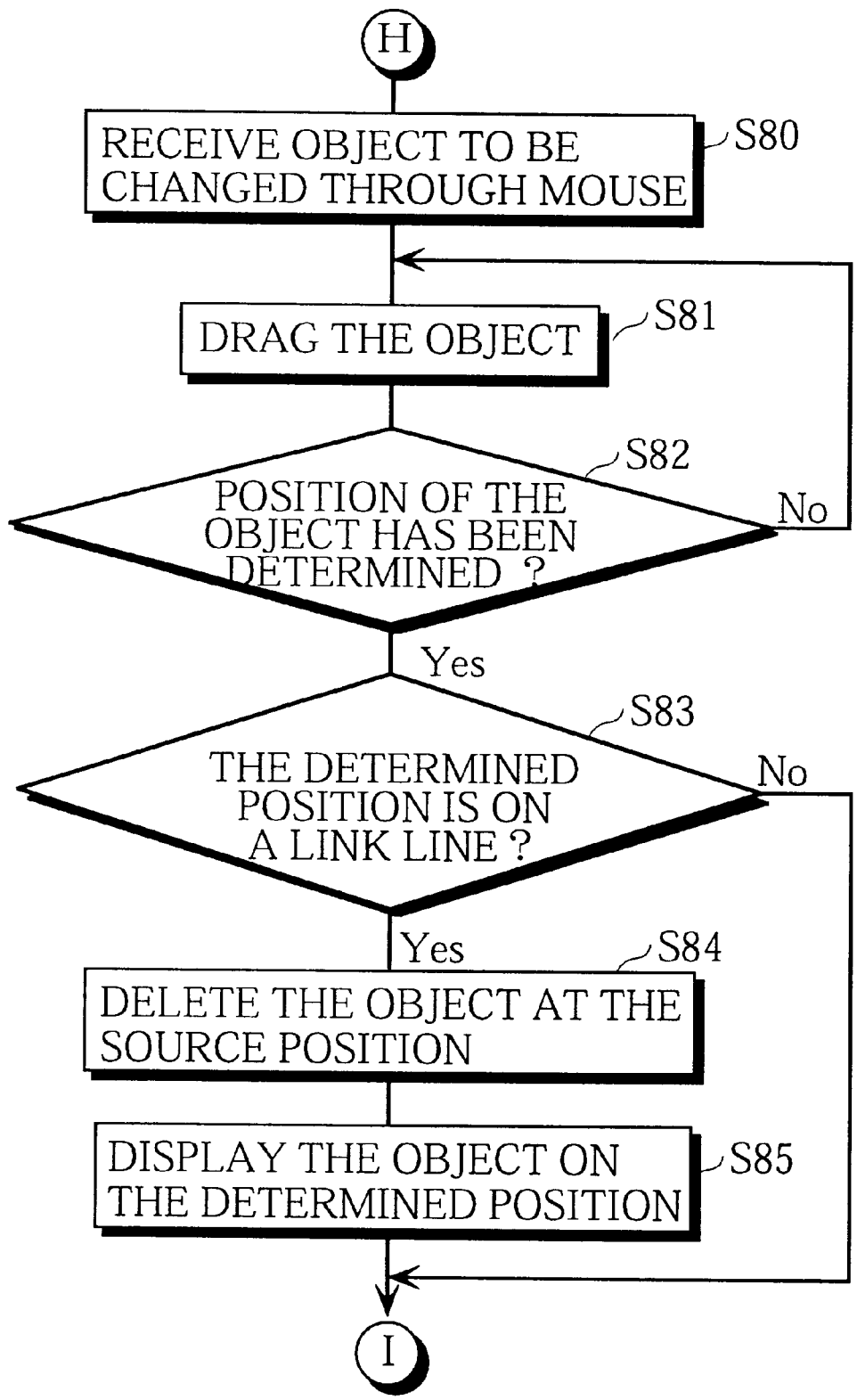

When it is judged in step S50 that the route change mode has been specified, control goes to step S80 in the flowchart shown in FIG. 25E. In step S80, the scenario editor recognizes an object to be changed which is specified by the user with an operation of the mouse. In step S81, the user drags the object to an appropriate position. The user determines the position by operating the mouse. In step S82, it is judged whether the position of the object has been determined. When it is judged so, control goes to step S83. In step S83, it is judged whether the determined position is on a link line. When it is judged so, control goes to step S84. In step S84, the object at the source position is deleted. In the following step S85, the object is displayed on the determined position.

3.2.5: Interactive Control Add Mode

Figure 26A:
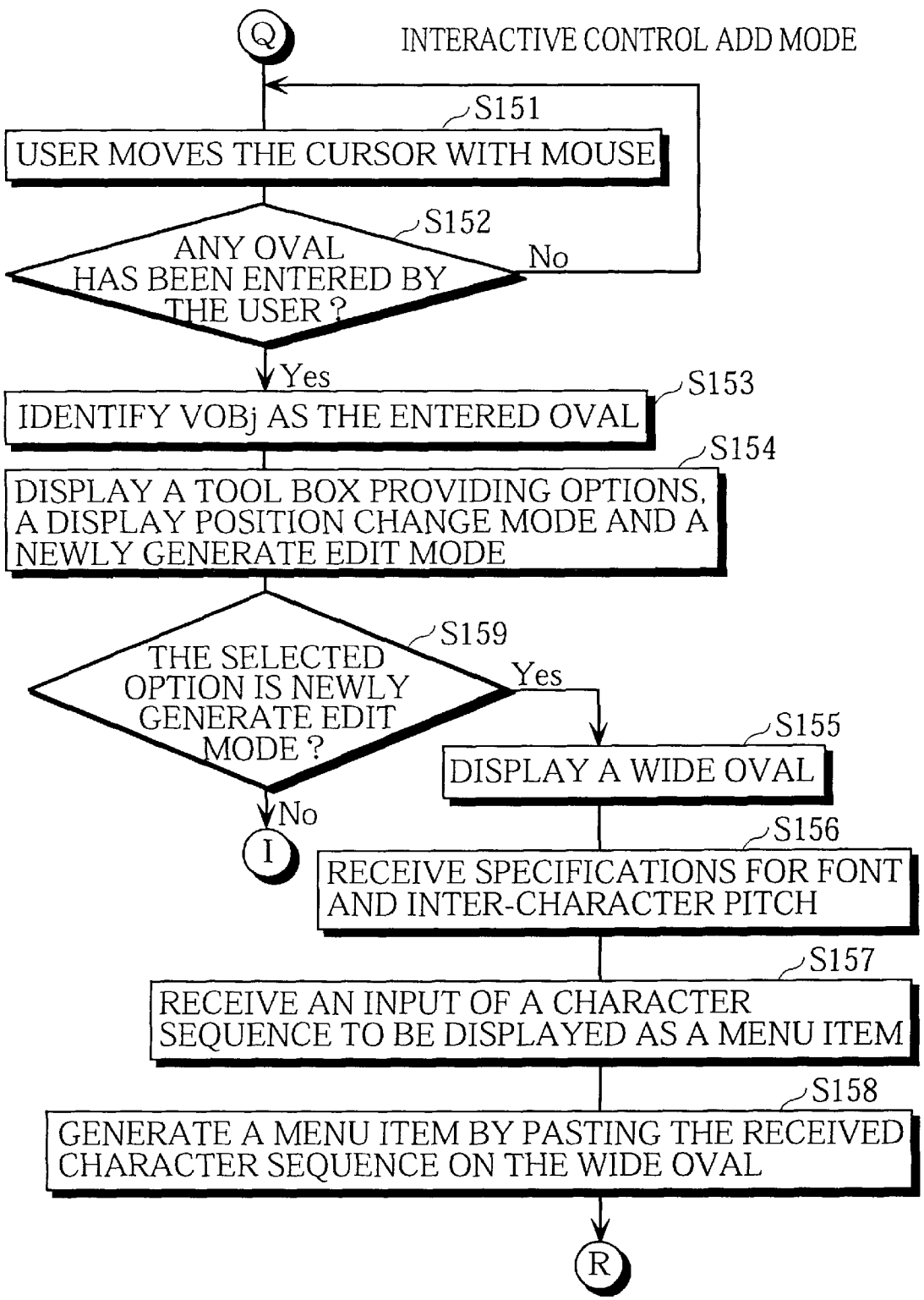
FIGS. 26A–26D are flowcharts of the procedures of the interactive control add mode by the system encode unit 16.

When it is judged in step S50 that the interactive control add mode has been specified, control goes to step S151 in the flowchart shown in FIG. 26A. In step S151, the user moves the cursor by operating the mouse. In step S152, it is judged whether any oval has been entered by the user. When it is judged so, the VOBj as the entered oval is identified in step S153. The management information elementary stream is to be interleaved into the entered VOB. In the following steps, the reproduction control information that is to be written into the management information elementary stream is generated.

Figure 12A:
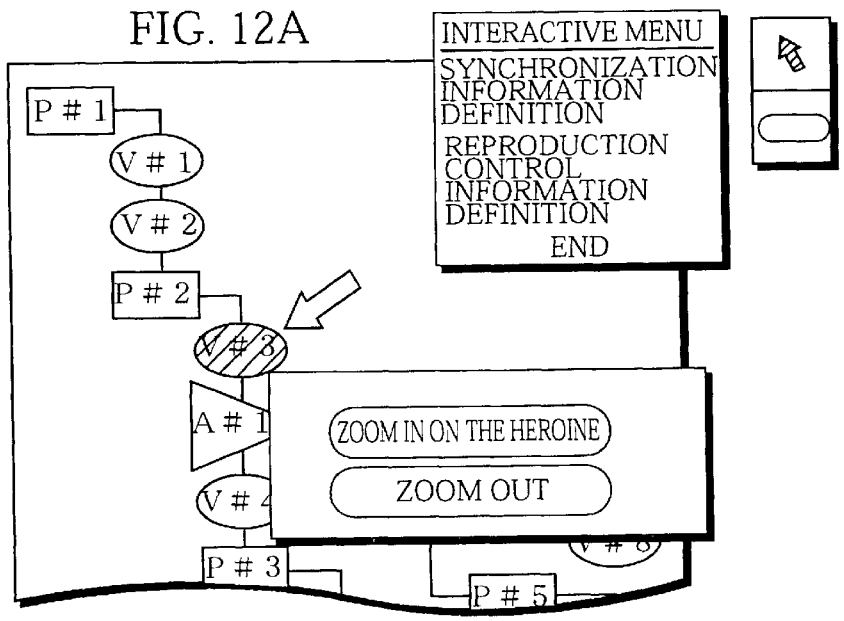
FIGS. 12A–12C show an illustrated composition of the reproduction scenario being edited by the edit unit 15.

In step S154, a tool box providing options, a display position change mode and a newly generate edit mode, is displayed. The user selects an option. In step S159, it is judged whether the selected option is the newly generate edit mode. When it is judged so, control goes to step S155. In step S155, a wide oval is displayed. In step S156, specifications for the font and inter-character pitch are received. In step S157, an input of a character sequence, which is to be displayed as a menu item, is received. In step S158, a menu item is generated by pasting the received character sequence on the wide oval. FIG. 12A shows a menu image which includes the character sequence received in step S157. The two wide ovals arranged vertically in FIG. 12A are menu items. The menu item may include numerals which correspond to numeral keys of a remote controller. The numerals indicate channel numbers. A menu item can be specified by a channel number input by the user. Hereinafter, the menu items are called channel items.

3.2.6: Synchronization Information Generate Mode

Figure 12B:
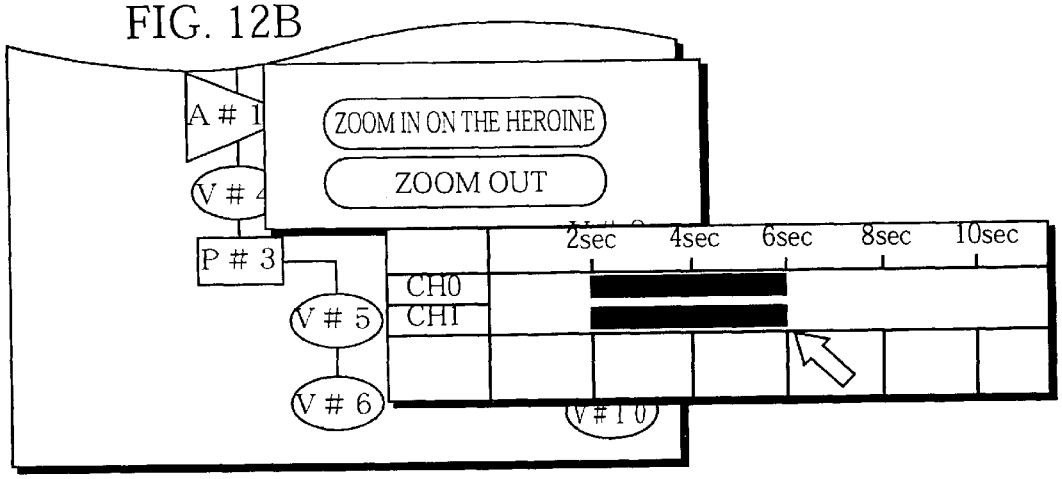
Figure 26B:
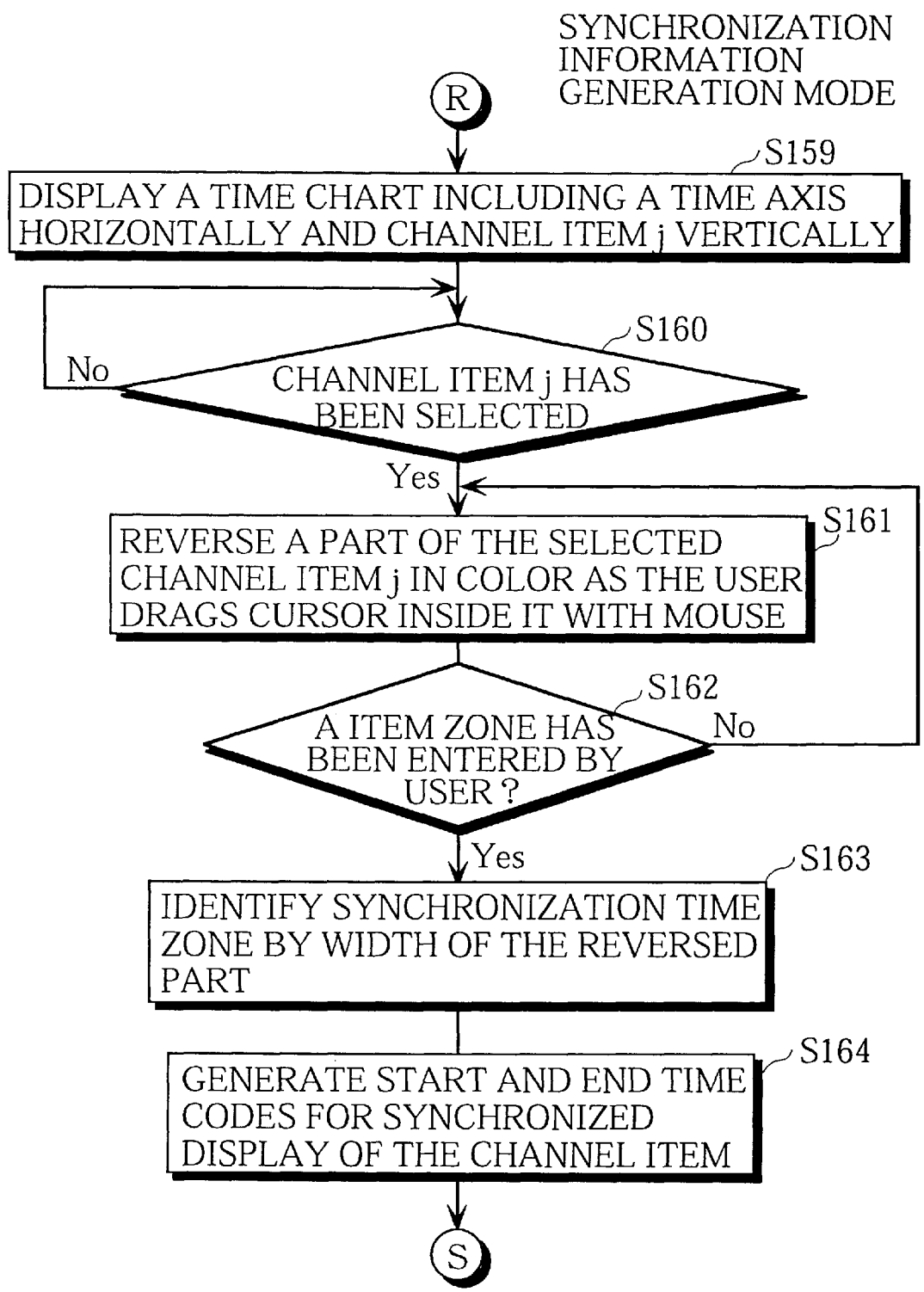

After the channel items are created, control proceeds to step S159 shown in FIG. 26B for the synchronization information generation. In step S159, a time chart is displayed. The time chart includes a time axis in the horizontal direction, and channel item j in the vertical direction. FIG. 12B shows a time chart which includes channel items with j=1,2 for channels CH1 and CH2.

In step S160, it is judged whether a channel item j has been selected. When it is judged so, control goes to step S161. In step S161, a part of the selected channel item j is reversed in color as the user drags the cursor inside the channel item by operating the mouse. In step S162, it is judged whether a time zone has been entered by the user. When it is judged so, control goes to step S163. In step S163, a time zone is identified by the width of the reversed part, where the menu item is displayed in synchronization during the time zone. In step S164, the start and end time codes are generated so that the menu item is displayed in synchronization during the time zone.

3.2.7: Reproduction Control Information Enter Mode

Figure 26C:
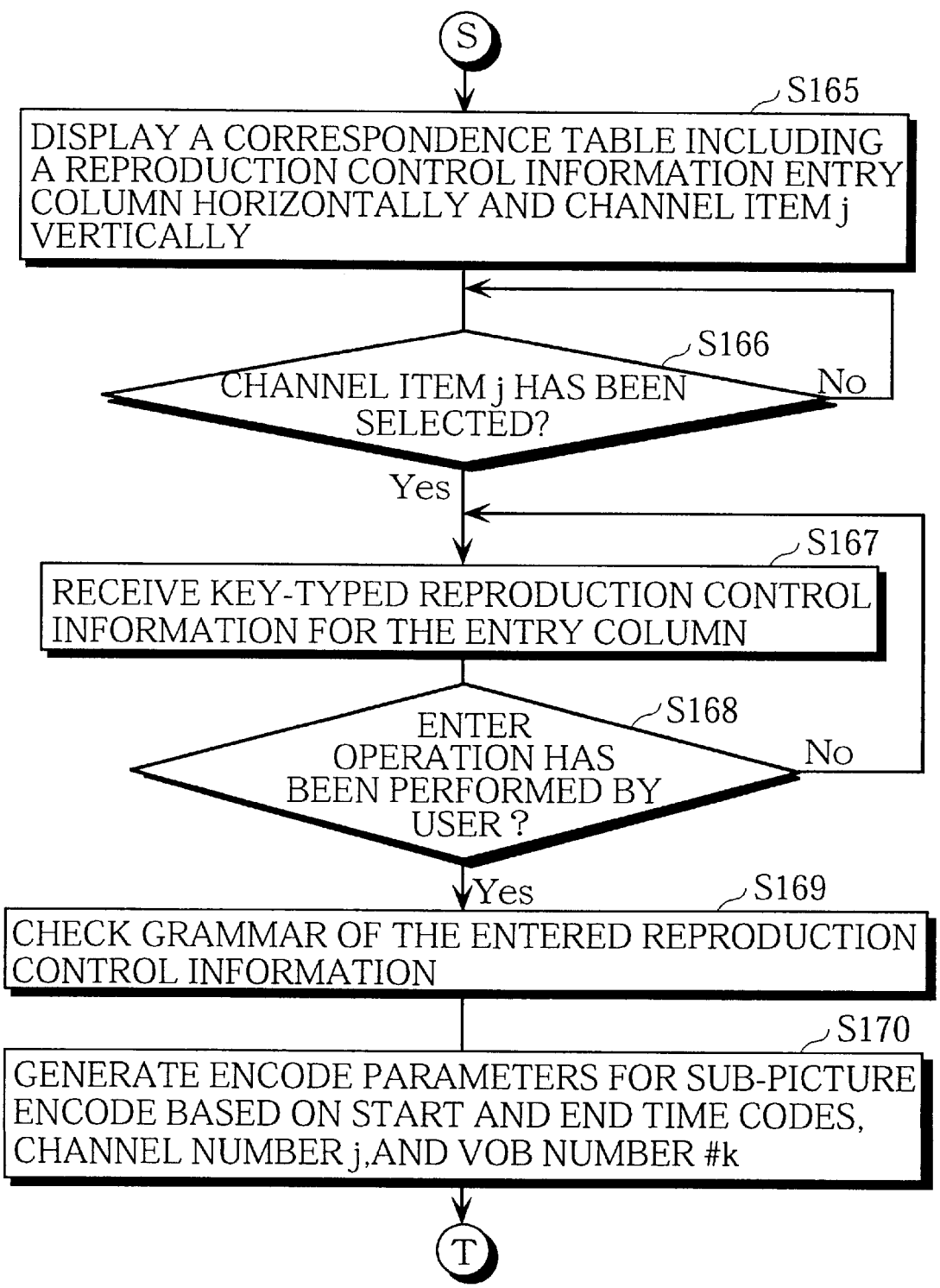

After the start and end time codes are generated, control proceeds to step S165 shown in FIG. 26C for the reproduction control information enter mode.

In step S165, a correspondence table is displayed. The correspondence table includes a reproduction control information entry column in the horizontal direction, and channel item j in the vertical direction. In step S166, it is judged whether a channel item j has been selected. When it is judged so, control goes to step S167. In step S167, key-typed reproduction control information is entered into the reproduction control information entry column for the selected channel item j. The reproduction control information includes a command (generally called highlight command) to be executed by the disc reproduction apparatus when the selected menu item is entered, a color (generally called a selection color) to be used for the selected menu item, a color (generally called an enter color) to be used for the entered menu item, and information showing correspondence between the "up," "down," "left," and "right" keys and menu items to be selected. After the reproduction control information including these contents is input as shown in FIG. 12C, control goes to step S169.

Figure 12C:
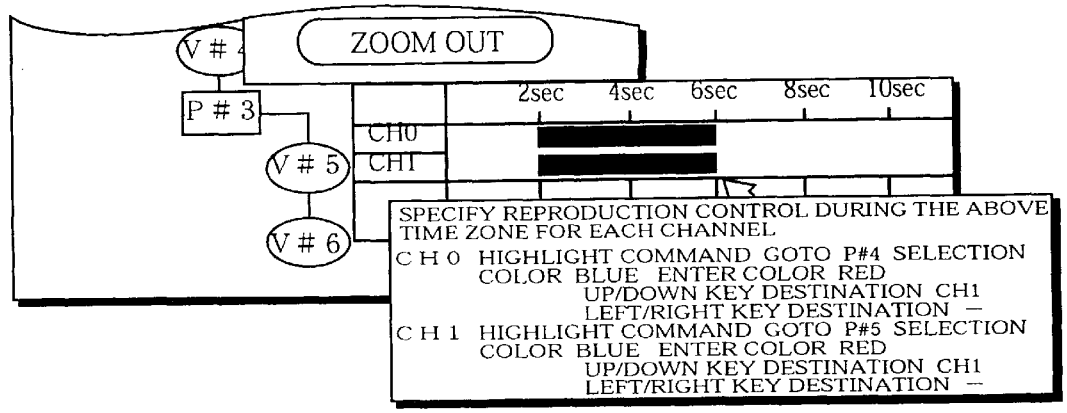

In the example shown in FIG. 12C, the reproduction control information instructs the disc reproduction apparatus to proceed to reproduce route P #2 shown in FIG. 6A when the menu item for CH0 is selected, and to reproduce route P #3 when the menu item for CH1 is selected.

In step S169, the grammar of the entered reproduction control information is checked. When no errors are found in the grammar check, control goes to step S170. In step S170, encode parameters for sub-picture encode are generated based on the start and end time codes, channel number j, and VOB number #k specified in the interactive control add mode.

Figure 26D:
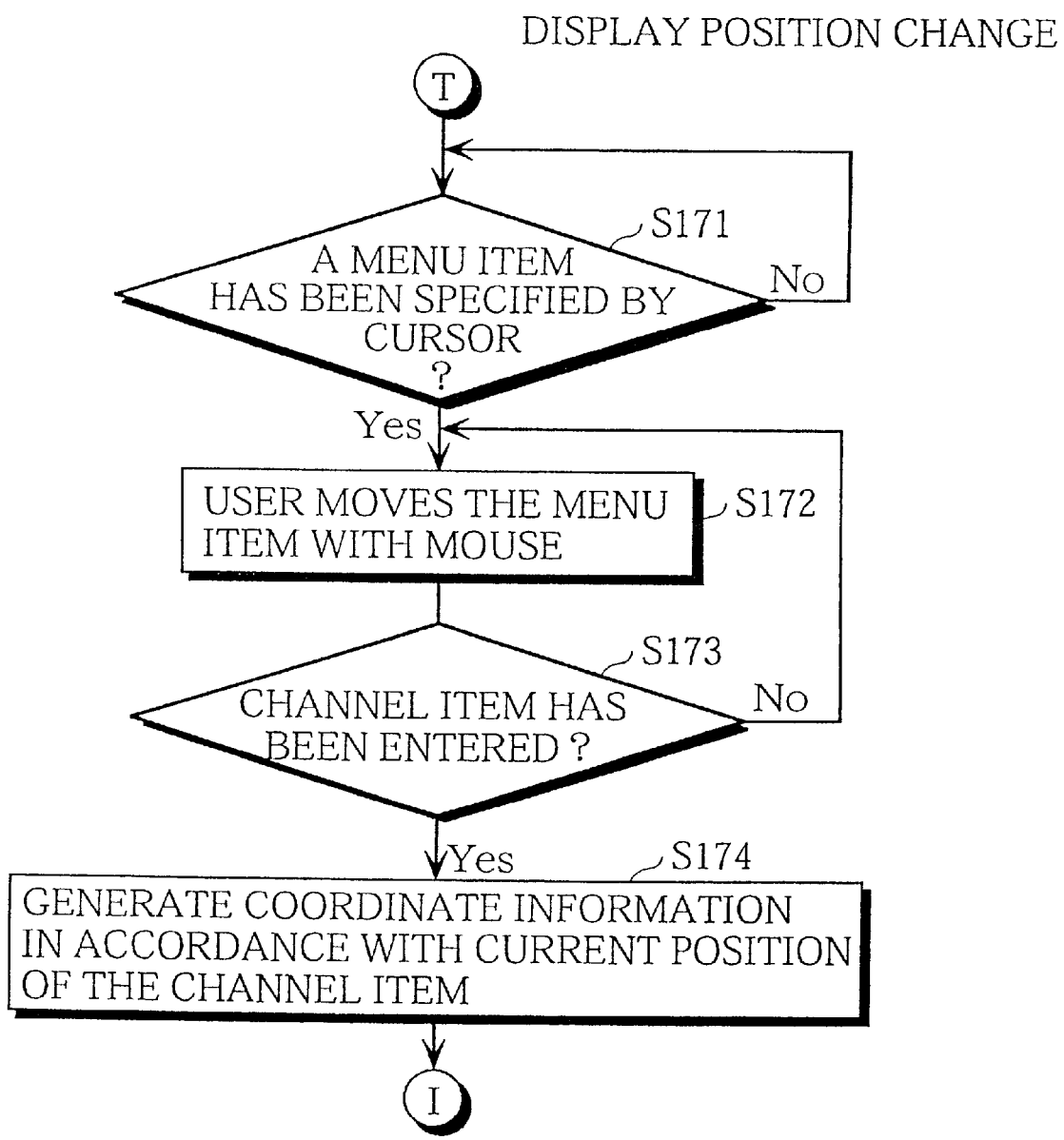

Control then goes to step S171 shown in FIG. 26D for changing the display position of the menu item. In step S171, it is judged whether a menu item is specified with the cursor. When it is judged so, control goes to step S172. In step S172, the user moves the menu item specified with the cursor by operating the mouse. In step S173, it is judged whether the menu item has been entered. When it is judged so, control goes to step S174. In step S174, coordinate information is generated in accordance with the current position of the menu item. A parameter table instructing the disc reproduction apparatus to display the menu item in accordance with the coordinate information is created.

When it is judged in step S50 that the editing process has been completed, control goes to step S176 shown in FIG. 25A. In step S176, directory/VOLUME is generated in the record unit 12. In the following step S177, the edited scenario is moved into the directory/VOLUME. The control then proceeds to step S180 shown in FIG. 27A.

3.2.8: Generation of Sub-Pictures

FIG. 27A is a flowchart showing the procedure of generating sub-picture elementary streams by the edit unit 15 based on the setting in the interactive control add mode.

The variable i appearing in this flowchart specifies an arbitrary menu item among a plurality of manually input menu items. The variable i is regarded as an ordinal number.

Accordingly, in the present flowchart, "menu item i" indicates the $i^{th}$ menu item. The variable i also specifies an arbitrary encode parameter among a plurality of encode parameters automatically generated in the interactive control add mode. Accordingly, "encode parameter i" indicates the $i^{th}$ encode parameter. The maximum value of the variable i is represented as "max" in the present flowchart.

In step S180, variable i is set to "1." In step S181, menu item i is encoded into a sub-picture elementary stream in accordance with the encode parameter i. In step S182, the VOB number #k corresponding to the encode parameter i is read. In step S183, the channel number #j corresponding to the encode parameter i is read. In step S184, a directory/VOB #k/SubPicture/CHj is generated. In step S185, the file of the sub-picture elementary stream is moved into the directory/VOB #k/SubPicture/CHj in the record unit 12. In step S186, a directory/VOB #k/Navigation is generated. In step S187, the reproduction control information is moved into the directory/VOB #k/Navigation. In step S188, it is judged whether variable i is equal to "max." When it is judged as negative, control goes to step S189. In step S189, the variable i is incremented by one. Control then returns to step S181.

3.2.9: Generation of Management Information

FIG. 27B is a flowchart showing the procedure of generating management information elementary streams by the edit unit 15.

The variable i appearing in this flowchart specifies an arbitrary directory among a plurality of directories in the record unit 12 corresponding to the respective VOBs. The variable i is regarded as an ordinal number. Accordingly, in the present flowchart, "directory VOB i" indicates the $i^{th}$ directory VOB. The maximum value of the variable i is represented as "max" in the present flowchart.

In step S200, variable i is set to "1." In step S201, a management information elementary stream being composed of management information packs having a time period of VOBi is generated under directory/VOB #k/Navigation. In doing so, the edit unit 15 obtains a transfer rate required to reproduce the video, audio, and sub-picture of around 0.5 seconds calculated in the first path of MPEG2 encode. The edit unit 15 also calculates the transfer rate for each of the video, audio, and sub-picture streams. The edit unit 15 also calculates the buffer size. The management information for specifying these pieces of information is converted into the pack data format defined in MPEG to generate management information packs. The management information elementary stream is generated by arranging these management information packs in a time series.

In step S202, it is judged whether reproduction control information i is set in VOBi. When it is judged so, control goes to step S203. In step S203, VOB units (hereinafter VOBUs, *note 4), VOBUj–VOBUk, which correspond to the time zone set in the reproduction control information i are identified. In step S204, the reproduction control information i is written in the PCI packet (*note 5) of the management information pack to be arranged in the start of VOBUj–VOBUk. In step S205, it is judged whether variable i is equal to "max." When it is judged as negative, control goes to step S206. In step S206, the variable i is incremented by one. Control then returns to step S201. The processes from step S201 to S205 are repeated until it is judged as positive in step S205. Then the process of the present flowchart ends. By this time, management information elementary stream has been generated for each VOB. The first round of the editing of the reproduction scenario ends with this.

Now, the operation of the process management unit 17 is described below.

3.3: Operation of Process Management Unit

The operation of the process management unit 17 is described with reference to the flowcharts shown in FIGS. 28, 29, and 30A.

3.3.1: Generation of VOB connection relation information

FIG. 28 is a flowchart showing the procedure of generating VOB connection relation information by the system encode parameter generation unit 17a.

The variable m appearing in this flowchart specifies an arbitrary VOB among a plurality of VOBs corresponding to the respective ovals in the reproduction scenario. The variable m is regarded as an ordinal number. Accordingly, in the present flowchart, "directory VOBm" indicates the $m^{th}$ directory VOB. The maximum value of the variable m is represented as "max" in the present flowchart.

In step S91, a template of the VOB connection relation information #m which includes VOB #m corresponding to the oval #m is generated. In step S92, it is judged whether there are two or more link sources for the oval #m. When it is judged as negative, control goes to step S93. In step S93, the pre-connection type of the VOB connection relation information #m is written as SINGLE. When it is judged as positive in step S92, control goes to step S94. In step S94, the pre-connection type of the VOB connection relation information #m is written as MERGE. In step S95, the oval #n, which is the link source of the oval #m, is identified. In step S96, the pre-connection VOB of the VOB connection relation information #m is written as VOB #n. In step S97, it is judged whether there are two or more link destinations for the oval #m. When it is judged as negative, control goes to step S98. In step S98, the post-connection type of the VOB connection relation information #m is written as SINGLE. When it is judged as positive in step S97, control goes to step S99. In step S99, the post-connection type of the VOB connection relation information #m is written as BRANCH. In step S100, the oval #p, which is the link destination of the oval #m, is identified. In step S101, the post-connection VOB of thee VOB connection relation information #m is written as VOB #p. In step S102, it is judged whether the VOB #m is under an exclusive reproduction block. When it is judged as positive, control goes to step S103. In step S103, the interleave flag is set to "1." When it is judged as negative in step S102, control goes to step S104. In step S104, the interleave flag is set to "0."

3.3.2: Process Management

FIG. 29 is a flowchart showing the procedure of the process management unit 17a.

The variable i appearing in this flowchart specifies an arbitrary rectangle (reproduction route) among a plurality of rectangles in the edited illustrated composition of a reproduction scenario. The variable i is regarded as an ordinal number. Accordingly, in the present flowchart, "reproduction route i" indicates the $i^{th}$ reproduction route. The maximum value of the variable i is represented as "max" in the present flowchart.

In step S300, it is judged whether the illustrated composition has been edited. When it is judged as positive, control goes to step S301. In step S301, the variable i is set to "1." In the succeeding step S302, the reproduction route i is obtained from the illustrated composition. In step S303, the reproduction order of VOB in the reproduction route i is compared with that in the preceding editing. In case there is no preceding editing, the reproduction order in the encode table is used for the comparison. In step S304, it is judged whether the reproduction order of VOBs has changed. When it is judged as positive, control goes to step S305. In step S305, the audio is extracted again. In the following steps S306 to S310, the system encode unit 16 is activated to generate a system stream. In steps S314 to S316, the disc format convert unit 18 is activated to generate a disc image.

3.3.3: Audio Extraction

FIG. 30A is a flowchart showing the procedure of the audio extraction.

The variable j appearing in this flowchart specifies an arbitrary VOB among a plurality of VOBs in a reproduction route whose reproduction order has been confirmed to have changed. The variable i is regarded as an ordinal number. Accordingly, in the present flowchart, "VOB j" indicates the $j^{th}$ VOB in the reproduction route whose reproduction order has changed. The maximum value of the variable j is represented as "max" in the present flowchart.

In step S321, the variable j is set to "1." In the succeeding step S322, it is judged whether "variable j–1" is equal to "0." When it is judged as negative, control goes to step S323. In step S323, a time lag dT between the end times of video elementary j–1 and audio elementary j–1 is calculated. In the following step S325, an audio extraction start time Ts is calculated based on the time lag dT. Such a time lag occurs due to the difference between the sampling accuracies of the audio and video. For example, the sampling accuracy of the NTSC-method video signal is about 33 msec, while the sampling accuracy of the Dolby-AC-3-method audio signal is about 32 msec. It indicates that there is about 1 msec of difference between their sampling accuracies, causing a time lag.

FIGS. 16A and 16B show a procedure of calculating the time lag dT, extraction start time Ts, and extraction length Ta when the reproduction order changes from VOB #1–VOB #2–VOB #3 to VOB #15–VOB #2–VOB #3. When VOB #1 is replaced with VOB #15, audio packs A1–A10 are replaced with audio packs A1–A7. However, there is time lag dT between the reproduction end times of the audio pack A7 and the video elementary stream. This indicates that the audio elementary stream of VOB #15 ends later than the video elementary stream of the same VOB by time lag dT. When this happens, the extraction start time Ts of the audio elementary stream for VOB #2 is delayed by the time lag dT.

When "variable j–1" is equal to "0," the extraction start time Ts is set to the start time of video elementary j. In step S326, a time period Tv of a video elementary to be interleaved into $j^{th}$ VOB in the reproduction route i is calculated. In the following step S327, the extraction time period Ta is determined so that the time lag between the end times of the video elementary and the extraction is equal to a certain time dx (Ta≈Tv). In the example shown in FIG. 16B, the extraction time period Ta is determined so that the audio elementary stream ends earlier than the video elementary stream by time dT and the time lag between the end times of the video elementary and the extraction is equal to the certain time dx. In step S328, audio elementary j with extraction time period Ta is extracted from the primary audio elementary stream. In step S329, the audio elementary j is moved into the directory/VOB #i/Audio/CHx/of the record unit 12. Then, control goes to step S322. In step S322 in the present example, it is judged that "variable j–1" is equal to "0." In step S323, a time lag dT between the end times of video elementary j–1 and audio elementary j–1 is calculated. In the following step S325, an audio extraction start time Ts is calculated based on the time lag dT. There is a time lag dT between the reproduction end times of the audio pack A19 and video elementary stream V6. That is, the audio elementary stream ends earlier than the video elementary stream by time dT in the reproduction of VOB #15. When this happens, the extraction start time Ts of the audio elementary stream for VOB #2 is advanced by the time lag dT.

3.4: Operation of System Encode Unit

The system encode unit 16 performs a transfer amount calculation process and a system encode process. In the transfer amount calculation process, the VOB connection relation information is referred to and the transfer amounts of the audio and video components at the start and end of a VOB are calculated for a seamless connection in accordance with the connection relation between VOBs. The system encode process is performed in accordance with the calculated transfer amounts.

3.4.1: Calculation of Transfer Amount

The process of calculating the transfer amounts of the audio and video components between VOBs is described below with reference to FIG. 30B. The variable k appearing in this flowchart specifies an arbitrary piece of VOB connection relation information among a plurality of pieces of VOB connection relation information automatically generated in accordance with the reproduction scenario. The variable k is regarded as an ordinal number. Accordingly, in the present flowchart, "VOB connection relation information k" indicates the $k^{th}$ piece of VOB connection relation information. The maximum value of the variable k is represented as "max" in the present flowchart.

In step S212, variable k is set to "1." In step S213, it is judged which of SINGLE and BRANCH the post-connection VOEm type of the VOB connection relation information k is. In step S214, the post-connection VOBm of the VOB connection relation information k is analyzed. In step S216, the audio packs being the audio components concentrating at the end of VOB #k are cut and transferred to the start of the VOB #m.

Figures 21A, 21B:
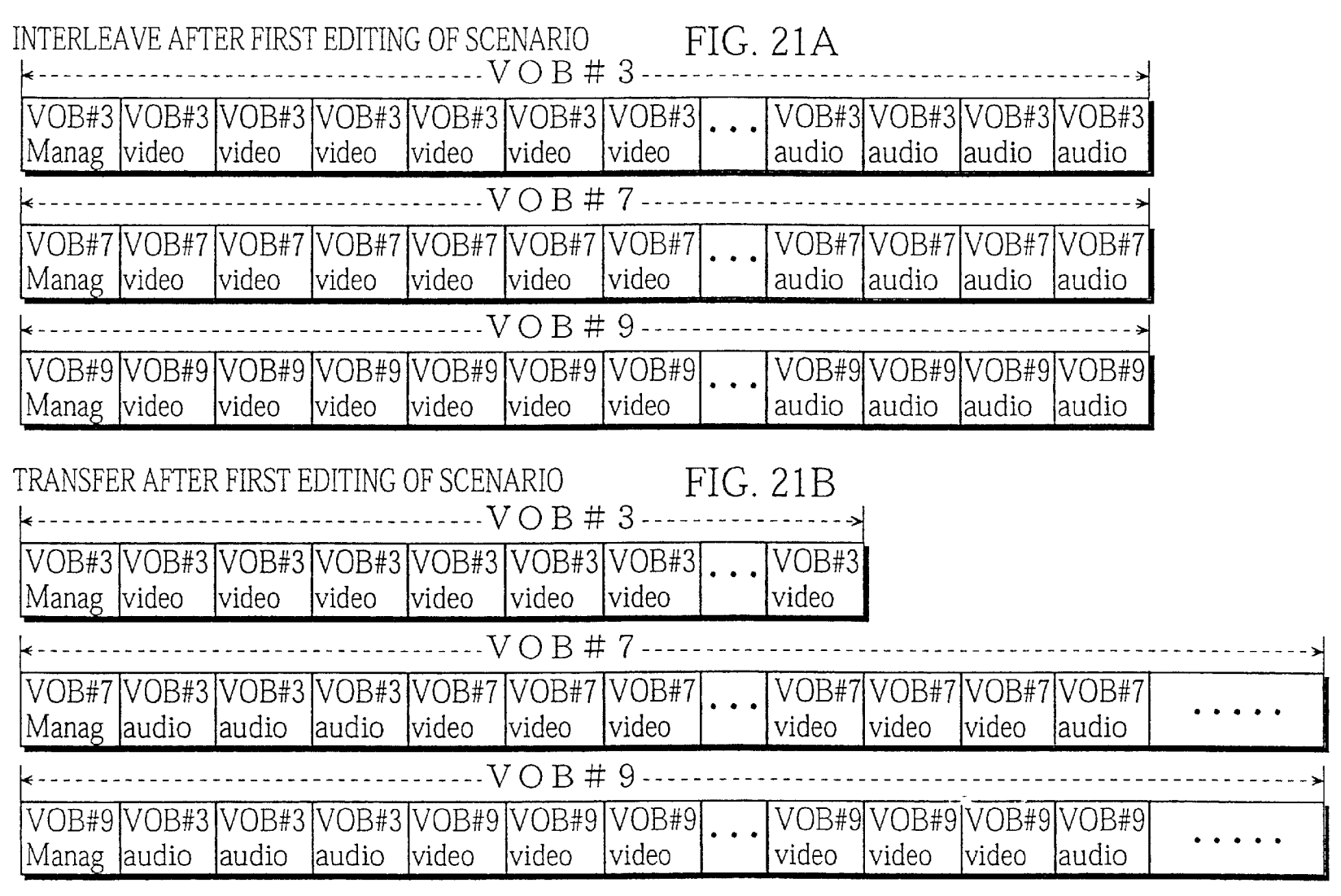

Suppose VOBs #3, #7, and #9, as shown in FIG. 21A, are obtained after the interleaving process by the system encode unit 16. It is understood by referring to FIG. 21A that audio components concentrates at the end of VOB #3. Suppose the VOB #3 is subjected to the transfer process of step S221. Here, it is recognized that the post-connection VOBm is VOBs #7 and #9 by referring to the VOB connection relation information. As a result, the audio components of the latter half of VOB #3 are cut and transferred to the former half of VOBs #7 and #9. FIG. 21B shows the construction of these VOBs after this process.

In step S219, it is judged whether the pre-connection VOB type of the VOB connection relation information is MERGE. When it is judged so, control goes to step S220. In step S220, the pre-connection VOBn of the VOB connection relation information k is analyzed. In step S221, the video and audio packs being the video and audio components concentrating at the start of VOB #k are cut and transferred to the end of the VOB #n video stream.

In step S223, the audio packs being the audio components concentrating at the end of VOB #n are cut and transferred to the start of the VOB #k. In step S226, it is judged whether variable k is equal to "max." When it is judged as negative, control goes to step S227. In step S227, the variable k is incremented by one. Control then returns to step S213. The steps S213 to S225 are repeated until the variable k reaches to "max" when the process of the present flowchart ends.

3.4.2: System Encode

After the audio extraction process, the system encode unit 16 performs the system encode process. In step S306 in FIG. 29, variable q is set to "1." In the following step S307, the directory of the $q^{th}$ VOB in the reproduction route i is identified. In step S308, the management information elementary stream of directory/VOB #q/Navigation, the audio elementary stream of directory VOB #q/Audio/CHx (x=1 to max), the sub-picture elementary stream of directory/VOB #q/SubPicture/CHy (y=1 to max), and the video elementary stream of directory/VOB #q/Video in the record unit 12 are interleaved into one VOB. Then, VOB #q obtained by this process is stored under directory/VOB #q. FIG. 15 shows that the management information elementary stream of directory/VOB #3/Navigation, the audio elementary streams of directories/VOB #3/Audio/CH1,/VOB #3/Audio/CH2, and/VOB #3/Audio/CH3, the sub-picture elementary streams of directory/VOB #q/SubPicture/CH1 and/SubPicture/CH2, and the video elementary stream of directory/VOB #3/Video in the record unit 12 are interleaved into one VOB.

In step S309, it is judged whether variable q is equal to "max." When it is judged as negative, control goes to step S310. In step S310, the variable q is incremented by one. Control then returns to step S307. The steps S307 to S309 are repeated until the variable q reaches to "max" when the control proceeds to step S311. In step S311, it is judged whether variable i is equal to "max." When it is judged as negative, control goes to step S312. In step S312, the variable i is incremented by one. Control then returns to step S302. The steps S302 to S311 are repeated until the variable i reaches to "max" when the control proceeds to step S314. In step S314, the disc format convert unit 18 assigns a relative address in the VOB table to each VOB. In step S315, an address of an interleave unit is written in the DSI packet (*note 8) in the management information pack in each VOB. In step S316, PGC access information is written. Control then returns to step S300.

3.5: Operation of Disc Format Convert Unit 18

The disc format convert unit 18 generates the bitstream for recording by assigning logical addresses on the DVD to the reproduction scenario edited by the edit unit 15 and to the VOBs into which various kinds of data are interleaved by the system encode unit 16.

3.5.1: VOB Mapping

Figure 31A:
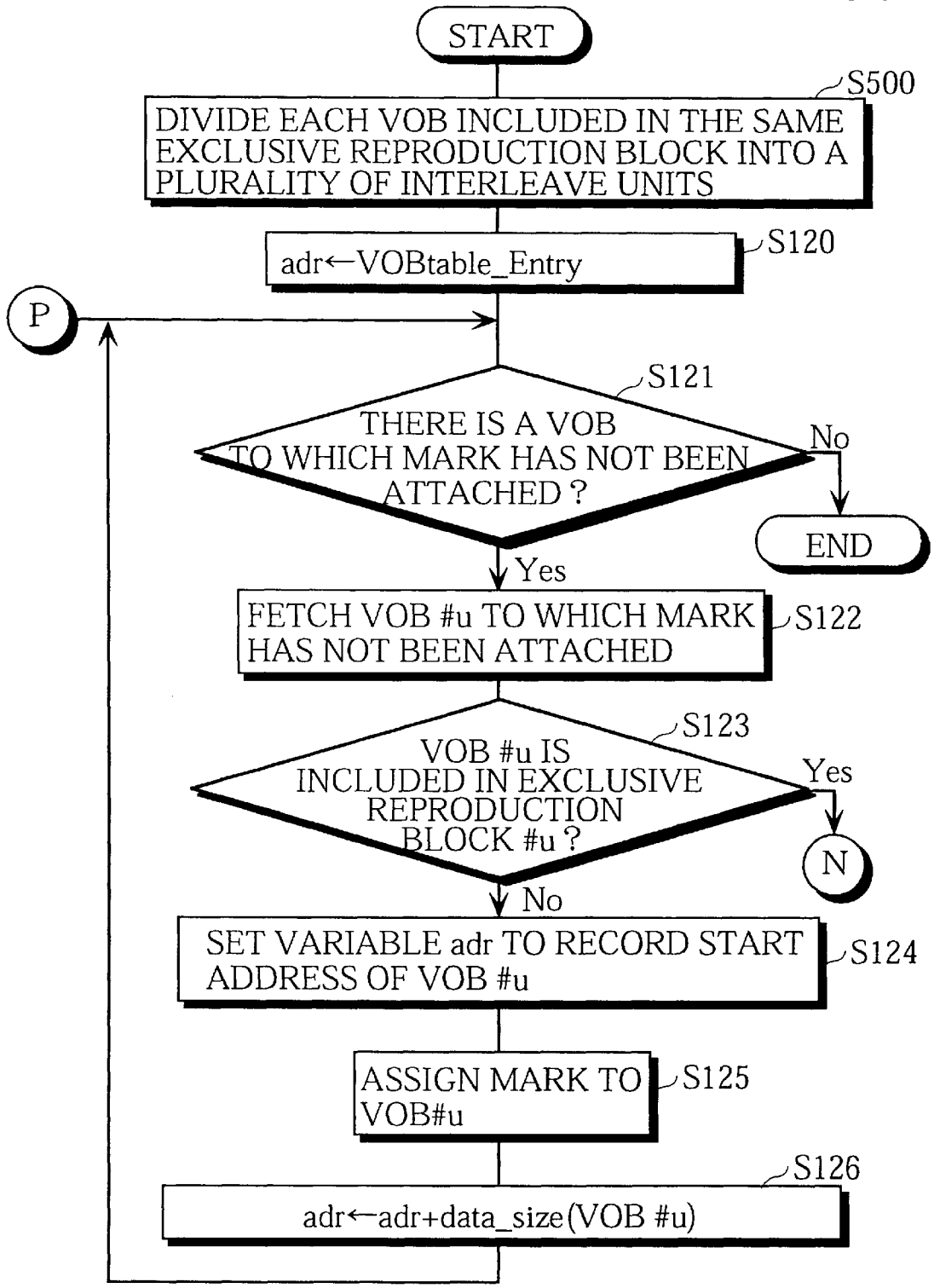
FIGS. 31A–31B are flowcharts of the procedures of the VOB table address assignment.
Figure 31B:
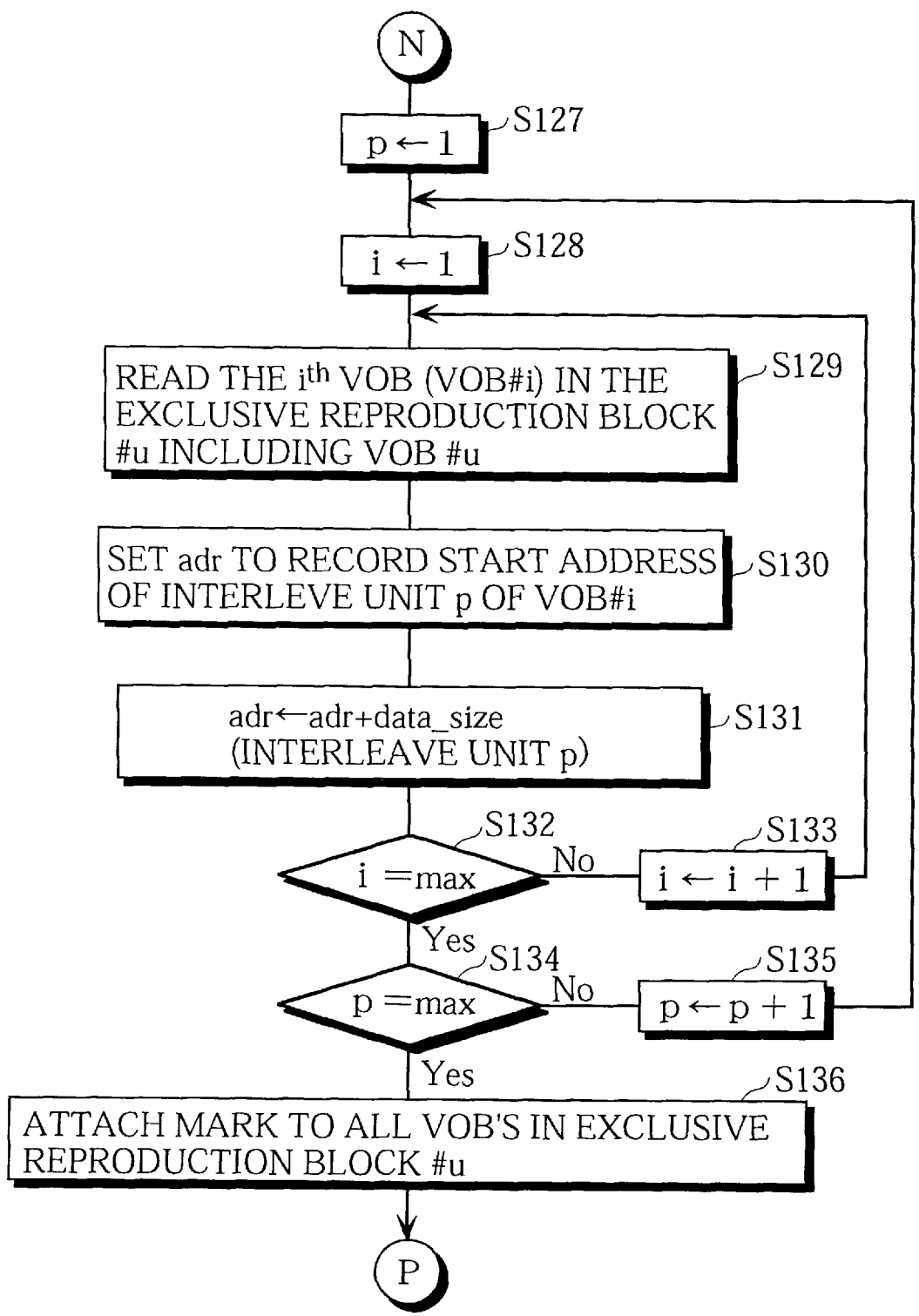

The addresses are assigned to the VOBs and disc indexes in accordance with the flowcharts shown in FIGS. 31A and 31B.

In the flowcharts shown in FIGS. 31A and 31B, "adr" represents a variable used to determine the record start address of each VOB. Also, "mark" represents a tag used to remove address-assigned VOBs from the processes of the flowcharts.

In step S500, each of a plurality of VOBs included in the same exclusive reproduction block is divided into a plurality of interleave units based on a presence of correlation to a previous frame, wherein each interleave unit has a certain time period. In the following step S120, the variable adr is set to the start address of the VOB table, "VOBtable_Entrey." In step S121, it is judged whether there is a VOB to which the mark has not been attached, where the mark indicates that the VOB has been assigned an address. When it is judged as positive, control goes to step S122. In step S122, a VOB to which the mark has not been attached is fetched as VOB #u. In step S123, it is judged whether the VOB #u is included in an exclusive reproduction block #u. When it is judged as negative, control goes to step S124. In step S124, the variable adr is set to the record start address of the VOB #u. In the following step S125, the VOB #u is assigned the mark. In step S126, the data size of the VOB #u is added to the variable adr. Control then returns to step S121.

When, in step S123, it is judged that the VOB #u is included in an exclusive reproduction block #u, control goes to step S127 shown in FIG. 31B. In step S127, variable p is set to "1." In the following step S128, variable i is set to "1." The variable i appearing in this flowchart specifies an arbitrary VOB among a plurality of VOBs included in a singe-out reproduction block. The variable i is regarded as an ordinal number. Accordingly, in the present flowchart, "VOB i" indicates the $i^{th}$ VOB in the singe-out reproduction block. The maximum value of the variable i is represented as "max" in the present flowchart.

Also, the variable p appearing in this flowchart specifies an arbitrary interleave unit among the plurality of interleave units included in the $i^{th}$ VOB in the singe-out reproduction block. The variable p is regarded as an ordinal number. Accordingly, in the present flowchart, "interleave unit p" indicates the $p^{th}$ interleave unit in the i VOB. The maximum value of the variable p is also represented as "max" in the present flowchart.

In step S129, the $i^{th}$ VOB (VOB #i) in the singe-out reproduction block #u, which includes VOB #u, is read. In the following step S130, the variable adr is set to the record start address of the interleave unit p of the VOB #i. In step S131, the data size of the interleave unit p is added to the variable adr.

In step S132, it is judged whether variable i is equal to "max." When it is judged as negative, control goes to step S133. In step S133, the variable i is incremented by one. Control then returns to step S129. The steps S129 to S132 are repeated until the variable i reaches to "max" when the control proceeds to step S134. In step S134, it is judged whether variable p is equal to "max." When it is judged as negative, control goes to step S135. In step S135, the variable p is incremented by one. Control then returns to step S128.

The steps S128 to S135 are repeated until the variable p reaches to "max" when the control proceeds to step S136. In step S136, the mark is attached to all the VOBs in the exclusive reproduction block #u. Control then returns to step S121.

FIG. 18A shows the VOB access table in which VOBs have been assigned addresses after the above processing. It is presumed that only VOB #3 has a time period of 20 seconds and that the other VOBs each have 10 seconds. It is also presumed that each VOB having 10 seconds has data size of 8 MB.

VOB #1 (10 sec) is mapped to the first 8 MB-area of the VOB access table (+0 MB to +8 MB). VOB #2 (10 sec) is mapped to the second 8 MB-area of the VOB table (+8 MB to +16 MB). VOB #3 (20 sec) is mapped to a 16 MB-area following the second 8 MB-area (+16 MB to +32 MB). In the following 32MB-area, interleave units of VOB #7 and #9 are mapped alternately in order, where each interleave unit has a time period of one second and 0.8 MB.

3.5.2: Writing into DSI Packet

Figure 32A:
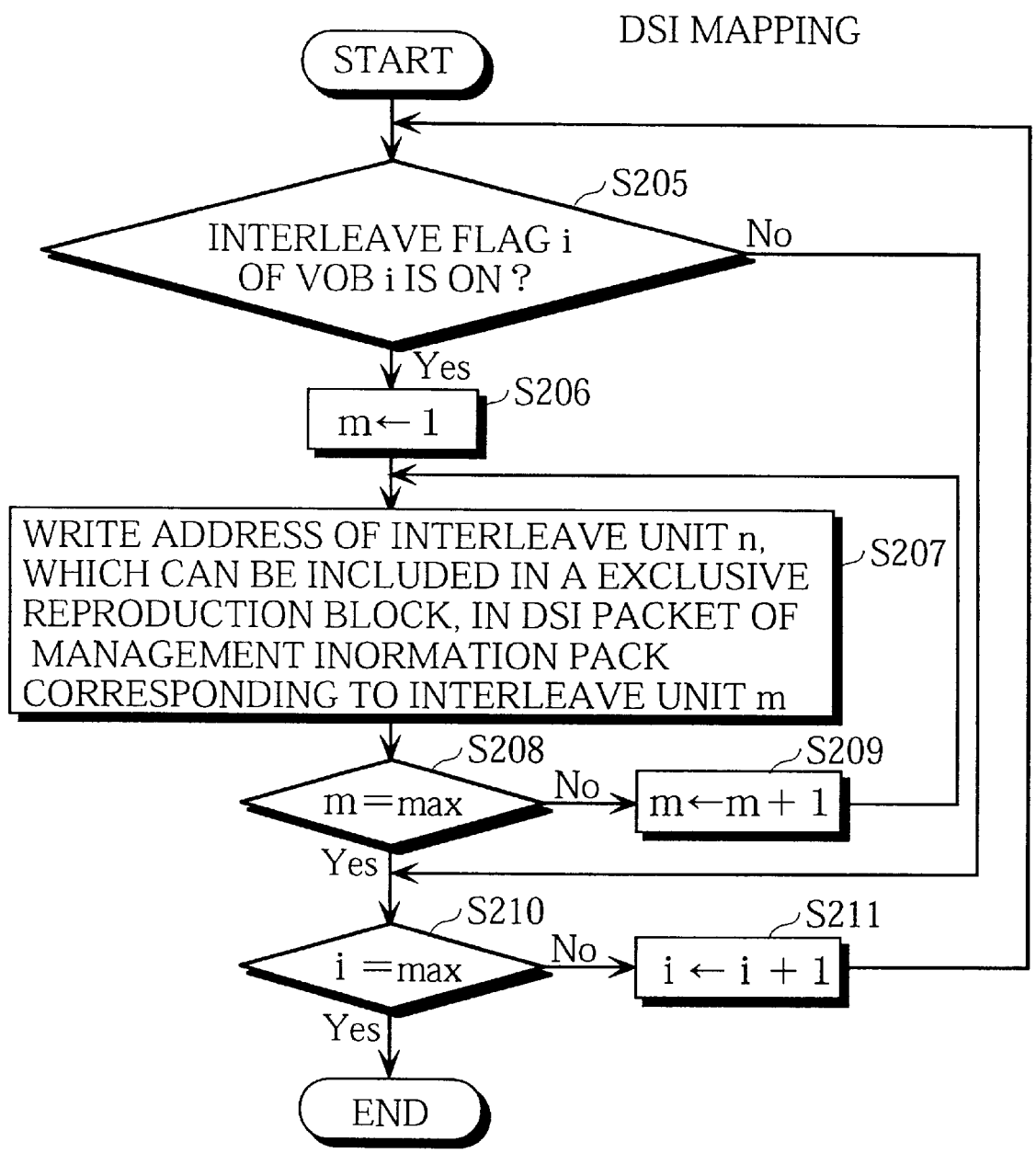
FIG. 32A is a flowchart of the procedures of writing information into the DSI packet of the management information pack.

A process of writing information into the DSI packet of the management information pack in an interleave unit is described with reference to the flowchart shown in FIG. 32A. The variable i appearing in this flowchart specifies an arbitrary VOB among a plurality of VOBs included in a singe-out reproduction block. The variable i is regarded as an ordinal number. Accordingly, in the present flowchart, "VOB i" indicates the $i^{th}$ VOB in the singe-out reproduction block. The maximum value of the variable i is represented as "max" in the present flowchart.

Also, the variable m appearing in this flowchart specifies an arbitrary interleave unit among the plurality of interleave units included in the $i^{th}$ VOB in the singe-out reproduction block. The variable m is regarded as an ordinal number. Accordingly, in the present flowchart, "interleave unit m" indicates the $m^{th}$ interleave unit in the $i^{th}$ VOB. The maximum value of the variable p is also represented as "max" in the present flowchart.

In step S205, it is judged whether interleave flag i of the VOB i is ON. When it is judged as positive, control goes to step S206. In step S206, the variable m is set to "1." In the following step S207, the address of interleave unit n, which can be included in an exclusive reproduction block, is written in the DSI packet of the management information pack corresponding to the interleave unit m. In the example shown in FIG. 18A, interleave units of VOB #7 and #9 are arranged alternately, each interleave unit having 0.8 MB. Accordingly, as shown in FIG. 14A, the start address of the interleave unit of VOB #9 as 0.8 MB ahead is written in the DSI packet of the management information pack corresponding to the VOB #7. Also, the start address of the interleave unit of VOB #7 as 0.8 MB ahead is written in the DSI packet of the management information pack corresponding to the VOB #9.

In step S208, it is judged whether variable m is equal to "max." When it is judged as negative, control goes to step S209. In step S209, the variable m is incremented by one. Control then returns to step S207. The steps S207 to S209 are repeated until the variable m reaches to "max" when the control proceeds to step S210. In step S134, it is judged whether variable i is equal to "max." When it is judged as negative, control goes to step S211. In step S211, the variable i is incremented by one. Control then returns to step S205. The steps S205 to S210 are repeated until the variable i reaches to "max" when the process of the present flowchart ends.

After the relative addresses of the VOB table are assigned to VOBs and addresses are written in the DSI packets, the disc indexes for reproducing these VOBs are generated, and logical addresses on the spiral track are assigned to the disc indexes.

3.5.3: Writing into PGC Information

The most important component of the disc index is PGC information. The PGC information defines the order of VOBs to be read. The PGC information also defines various controls performed by the disc reproduction apparatus while the VOBs are reproduced in this order. The various controls include, for example, a reproduction control for achieving a viewing limitation differently imposed on adults and children. The various controls are not described in detail since they are described in many documents.

The disc format convert unit 18 writes the VOB access information (a table defining, for each piece of PGC information, the order of VOBs to be accessed) in the PGC information based on the illustrated composition. This process, which is very important, is described with reference to the flowchart shown in FIG. 32B.

The variable m appearing in this flowchart specifies an oval among a plurality of manually input ovals as a link destination of rectangle #Pi in the illustrated composition of a reproduction scenario. The variable n appearing in this flowchart specifies an oval among a plurality of manually input ovals as a link destination of the oval #m.

At first, the entire size of the PGC information table is calculated based on the number of required pieces of PGC information which is calculated from the number of rectangles in the illustrated composition.

Five rectangles are shown in the illustrated composition of FIG. 6A. Hence the number of required pieces of PGC information is determined as five. When it is presumed that the data size of the PGC information is 128 KB, the entire size of the PGC information is calculated as 640 KB (128 KB×5). Note that the value 128 KB is determined by estimating the amount of information required for the various controls.

Figure 32B:
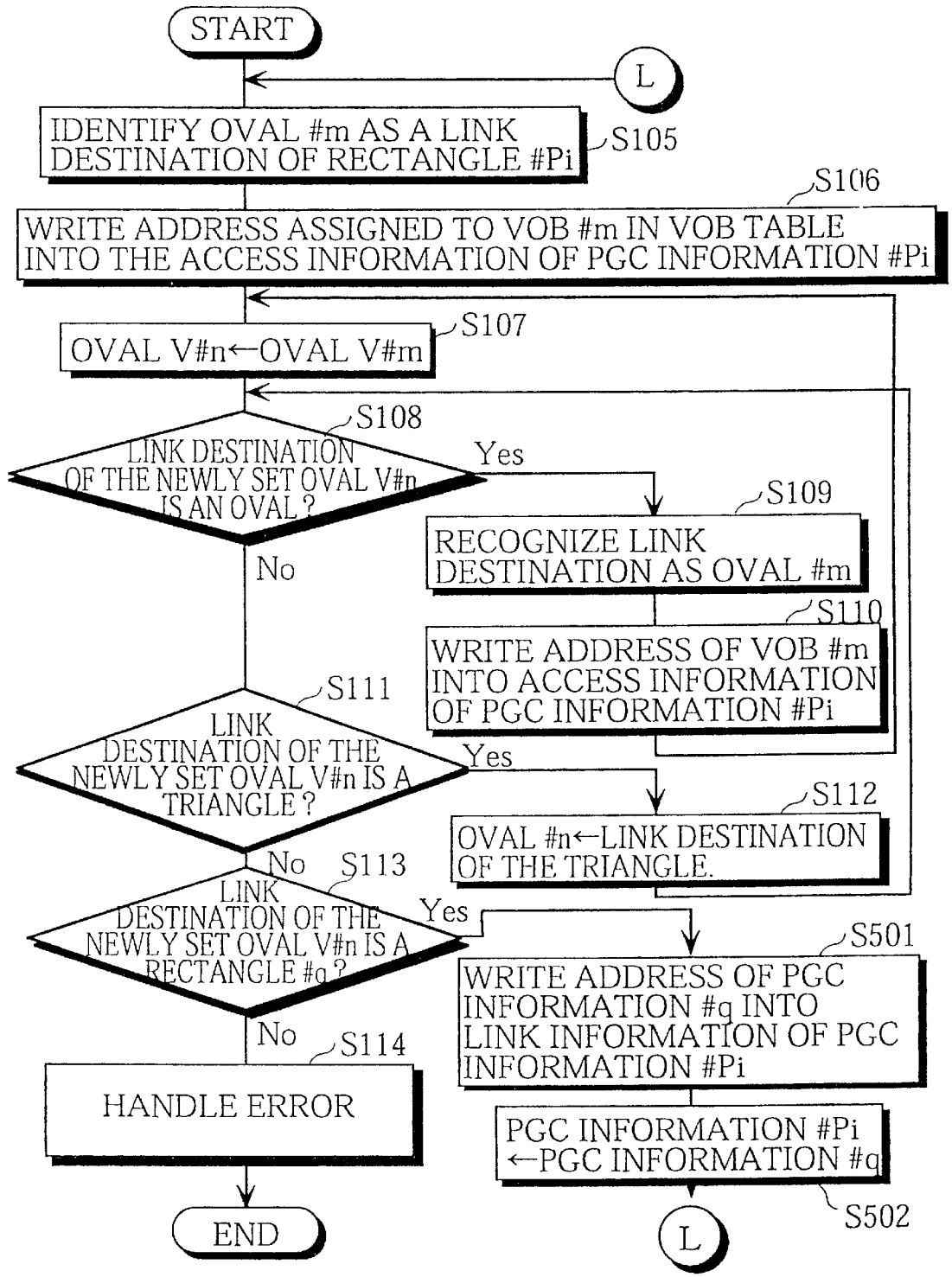
FIG. 32B is a flowchart of the procedures of writing connection information into the PGC information.
Figure 34:
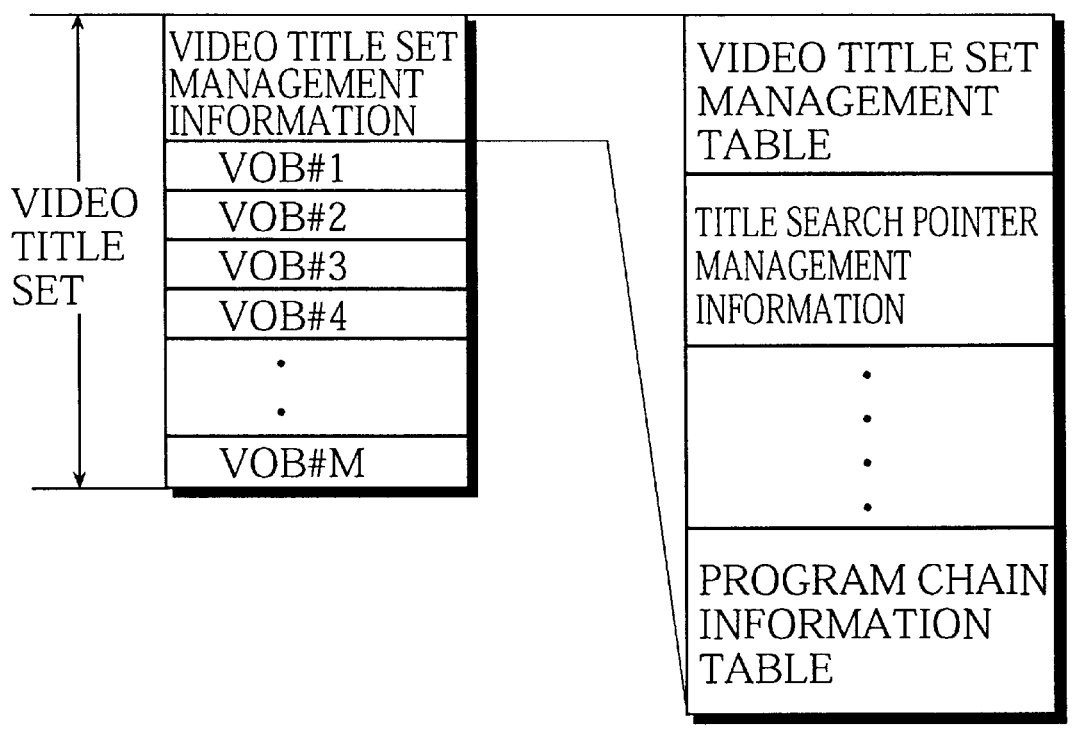
FIG. 34 shows a disc index.

After the above process, in step S105 in FIG. 32B, oval #m as a link destination of rectangle #Pi is identified. In the following step S106, VOB #m corresponding to the identified oval #m is identified from the PGC information corresponding to the rectangle #Pi. The address assigned to the VOB #m in the VOE table is written into the access information of the PGC information #Pi.

Here, assume that the variable i is "1" and that the rectangle #PI specifies PGC information #1. In the illustrated composition shown in FIG. 6A, the link destination of rectangle #P1 is oval VI which corresponds to VOB #1. Meanwhile, in the VOB table shown in FIG. 18, relative addresses for 0 MB–8 MB are assigned to the VOB #1. Therefore, the relative addresses for 0 MB–8 MB are written into the access table in the PGC information #1.

In step S107, the oval V#n is set to the oval V#m. This is done in order to deal with the oval V#n, which has been dealt with as a link destination, as a link source and trace the ovals ahead of the oval V#n.

In step S108, it is judged whether the link destination of the newly set oval V#n is an oval. When it is judged so, control goes to step S109. In step S109, the link destination is recognized as oval V#m.

Here, it is presumed that the oval V#n is set to oval V#1 in step S107. Then, it is judged in step S108 that the link destination of the oval V#1 is oval. In the succeeding step S108, the oval #2 being the link destination of the oval #1 is recognized as oval #m. The oval #2 corresponds to VOB #2. In the VOB table shown in FIG. 18A, relative addresses for 8 MB–16 MB are assigned to the VOB #2. Therefore, the relative addresses for 8 MB–16 MB are written into the access table in the PGC information #1.

As described above, ovals #1 and #2 are traced from the rectangle #1, and relative addresses of the VOBs #1 and #2 corresponding to the ovals #1 and #2 are written into the access information of the PGC information.

When the link destination of the oval #n is a triangle, it is judged as negative in step S108 and control goes to step S111. In step S111, it is judged whether the link destination of the newly set oval V#n is a triangle. In the present example, it is judged as positive and control goes to step S112. In step S112, the oval #n is set to an oval which is the link destination of the triangle. Control then returns to step S108.

In step S113, it is judged whether the link destination of the newly set oval #n is a rectangle. When it is judged as positive, control goes to step S501. In step S501, the relative address of the PGC information #q is written into the link information of the PGC information #Pi.

Here it is supposed that the PGC information #Pi is PGC information #1 and that the oval #n is oval #2 which links to rectangle #2. The rectangle P#2 corresponds to PGC information #2. Therefore, the relative address of the PGC information #2 is obtained. Here, the size of the PGC information table has been calculated as 640 KB. Here, it is presumed that an area starting from "128 KB" is assigned to the PGC information #2. Then, the relative address "128 KB" of the PGC information #2 is written into the link information of the PGC information #1.

Figure 19A:
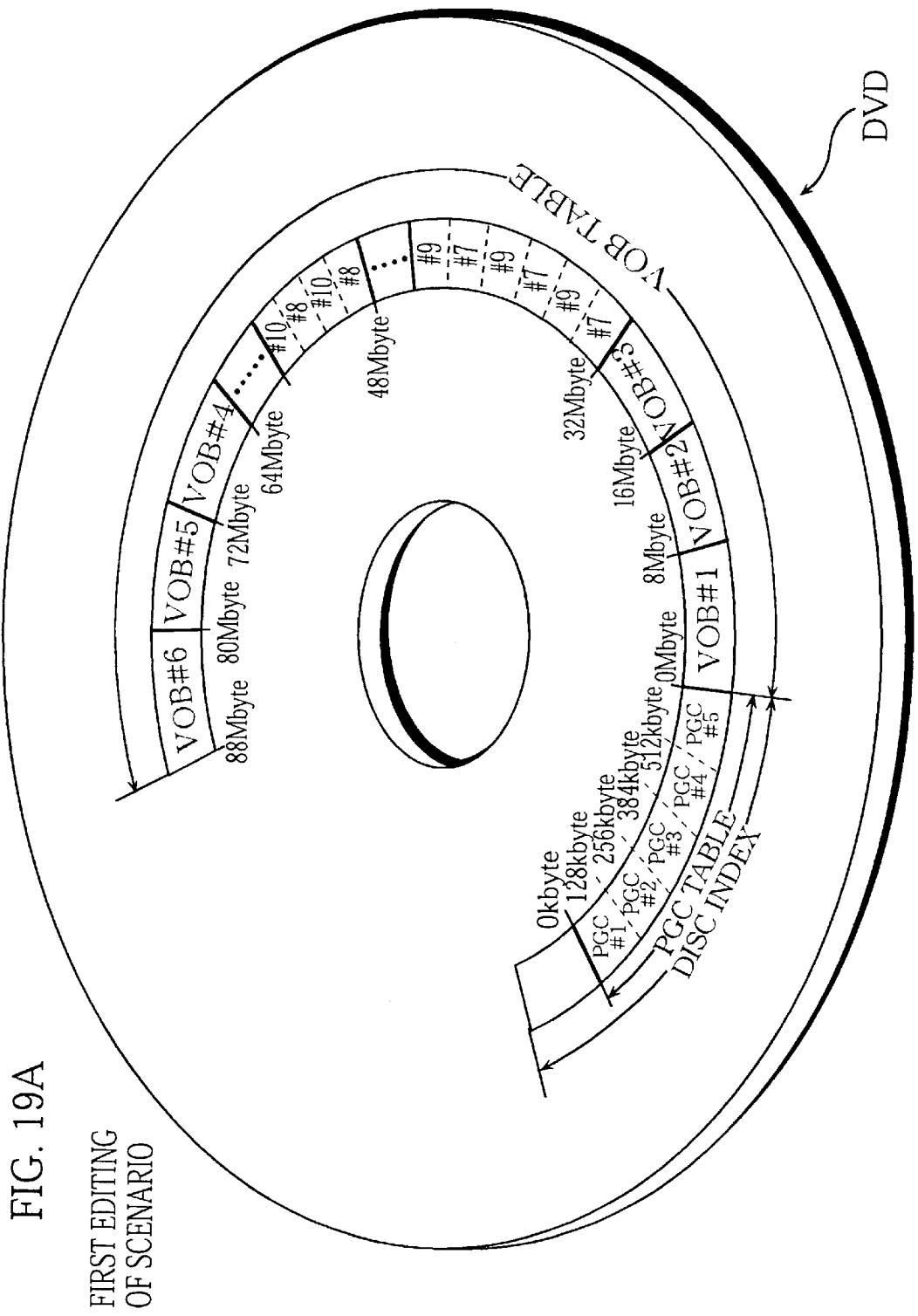
FIG. 19A is a schematic representation of DVD in which the bitstream for recording has been arranged after the first editing of the reproduction scenario.

After the step S501, control goes to step S502. In step S502, the PGC information #Pi is set to PGC information #q. In the preset example, the PGC information #Pi is set to PGC information #1 since the PGC information #Pi corresponds to PGC information #2. Control then returns to step S105. When, in step S113, it is judged as negative, the link destination of the newly set oval V#n is judged as NULL, and control goes to step S114. In step S114, an error handling process is performed. The process of the present flowchart then ends. FIG. 17A shows the PGC information whose access information includes VOBs to be read. After this, other pieces of information of the disc index are generated. Absolute addresses of the PGC information table and the VOB table are assigned. The bitsream that can be recorded in the DVD is generated thus. FIG. 19A is a schematic representation of the DVD in which the bitstream for recording has been arranged after the first editing of the reproduction scenario. In the present drawing, the bitstream for recording is stored in the curving area on the spiral track. The drawing also shows that PGC information #1–#5 and VOBs #1–#10 are sequentially read as the DVD is rotated by the disc reproduction apparatus for reproduction. This indicates that PGC information #1–#5 and VOBs #1–#10 are arranged in best positions and read with little disc seek.

Figure 23:
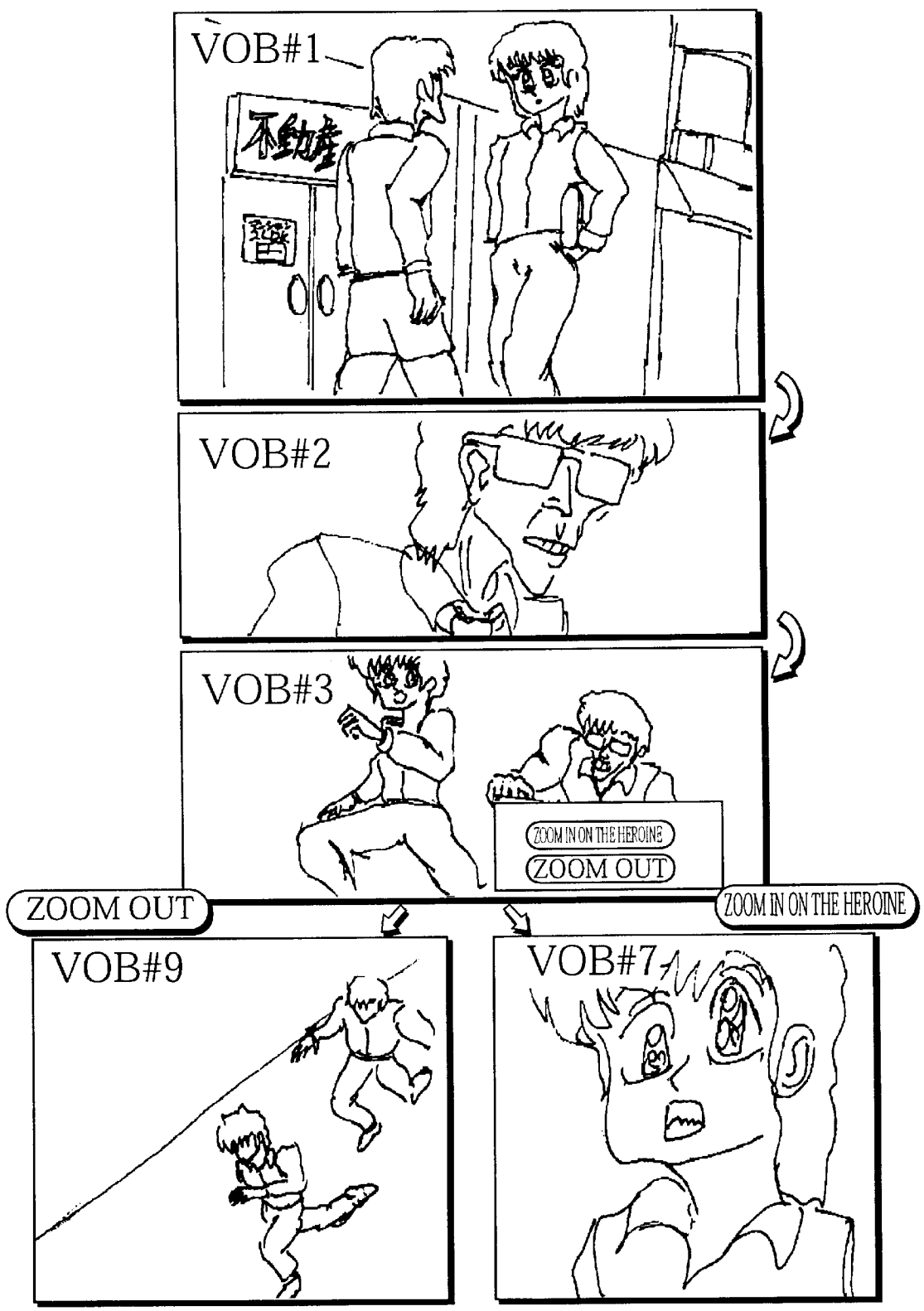
FIG. 23 shows a change of screens displayed in the emulation by the player emulation unit 19.

The player emulation unit 19 performs a test preview for checking a plurality of versions recorded in the DVD by temporarily reproducing the bitstream for recording. FIG. 23 shows contents of a test preview. The present drawing shows images in frames included in the video elementary streams in each of VOBs #1, #2, #3, #7, and #9. The reproduction order, which is determined in accordance with the reproduction scenario shown in FIG. 6A, is indicated by the arrow signs. The menu items "Zoom in on the heroine" and "Zoom out" shown in the image of VOB #3 have been interleaved into the management information elementary stream of VOB #3 in the interactive control add mode. When the menu item "Zoom in on the heroine" is entered, the reproduction shifts to VOB #7; when the menu item "Zoom out" is entered, the reproduction shifts to VOB #9.

Figure 20A:
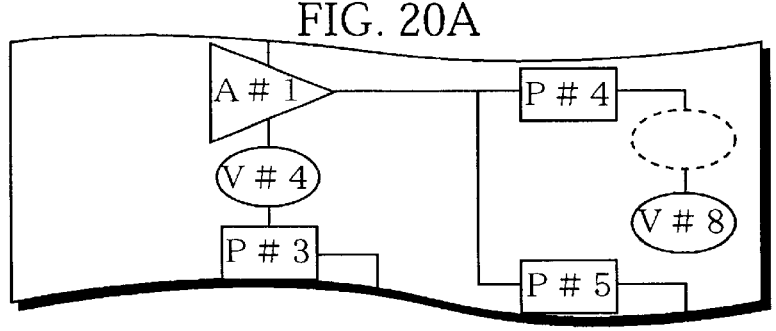
FIGS. 20A–20E show an illustrated composition of the reproduction scenario being edited in the second editing by the edit unit 15.
Figure 20B:
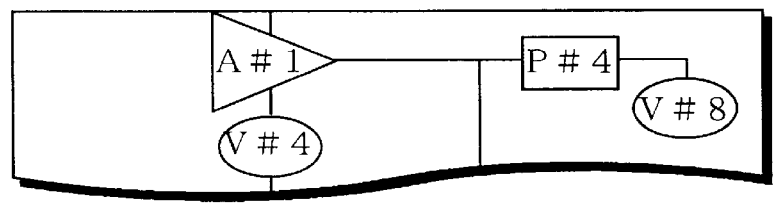
Figure 20C:
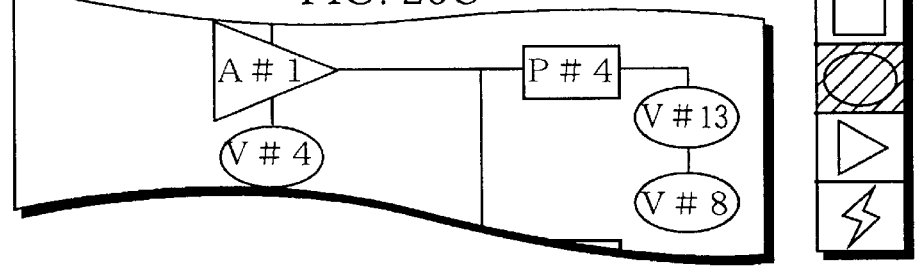

3.6: Operation of Re-Editing Reproduction Scenario and Re-Generating Bitstream for Recording When the data size of the generated bitstream for recording exceeds the capacity of DVD, in the present example, the producer deletes VOB #7 as shown in FIGS. 20A and 20B by activating the elementary encode unit 14 and displaying the illustrated composition. After the deletion, VOB #13 with a small data size is added to in front of VOB #8 in the VOB add mode, as shown in FIG. 20C.

Figure 20D:
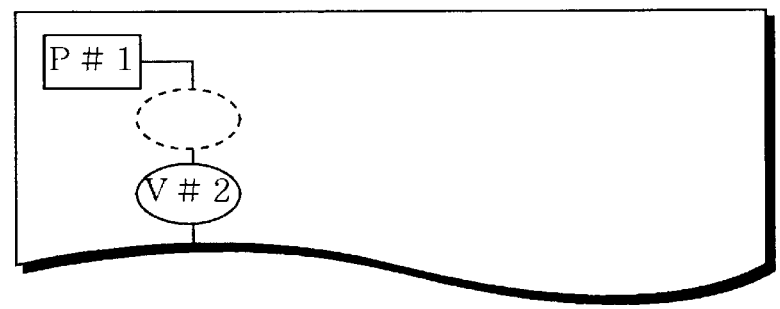
Figure 20E:
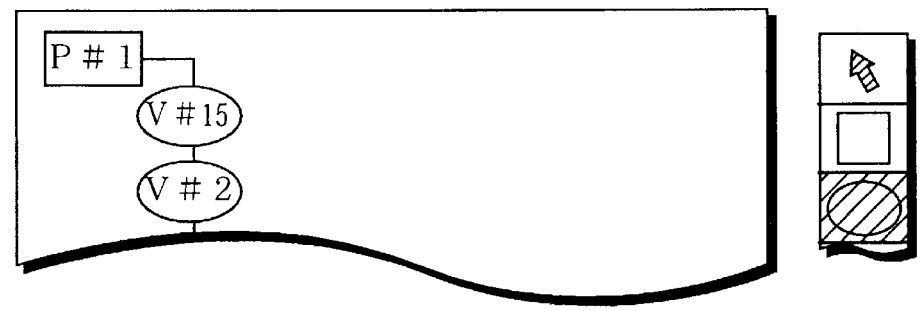

When it is determined that still the data size of the bitstream exceeds the capacity of DVD and that VOB #1 should be replaced with another VOB, the producer deletes VOB #1 as shown in FIG. 20D by activating the elementary encode unit 14 and displaying the illustrated composition. Then, the producer adds VOB #15 with a small data size is added to in front of VOB #2 in the VOB add mode, as shown in FIG. 20E.

After the second editing of the reproduction scenario is performed as described above, the audio extraction unit 14c extracts the audio elementary stream. The length of video stream of VOB #13 is longer than VOB #7. As a result, audio extraction unit 14c extracts the audio elementary stream of VOB #13 in accordance with the length of video stream of VOB #13. In doing so, the audio extraction unit 14c also extracts the audio elementary stream of VOB #9 that succeeds to VOB #13.

FIG. 16B shows the audio elementary stream extracted in the second editing of the reproduction scenario.

After the extraction, the process management unit 17 instructs to calculate the amount of audio packs transferred between VOBs. After the second editing of the reproduction scenario, the VOB connection relation information of VOB #3 shows that the post-connection VOBs are VOBs #13 and #9. Therefore, the post-connection VOBm is identified as VOBs #13 and #9. When this happens, the latter half of the audio component of VOB #3 is cut, as shown in FIG. 22B, and transferred to the former half of the VOBs #13 and #9, as shown in FIG. 22B.

After the transfer, the video, audio, sub-picture elementary streams are interleaved. Then, the disc format convert unit 18 determines the arrangement of the VOBS, maps each VOB into the VOB table as shown in FIG. 18B, and the DSI packet of VOBs is written again.

After the mapping, the disc format convert unit 18 is re-activated to convert the reproduction scenario edited by the elementary encode unit 14 into the disc index. FIG. 17B shows PGC information after the conversion.

Figure 19B:
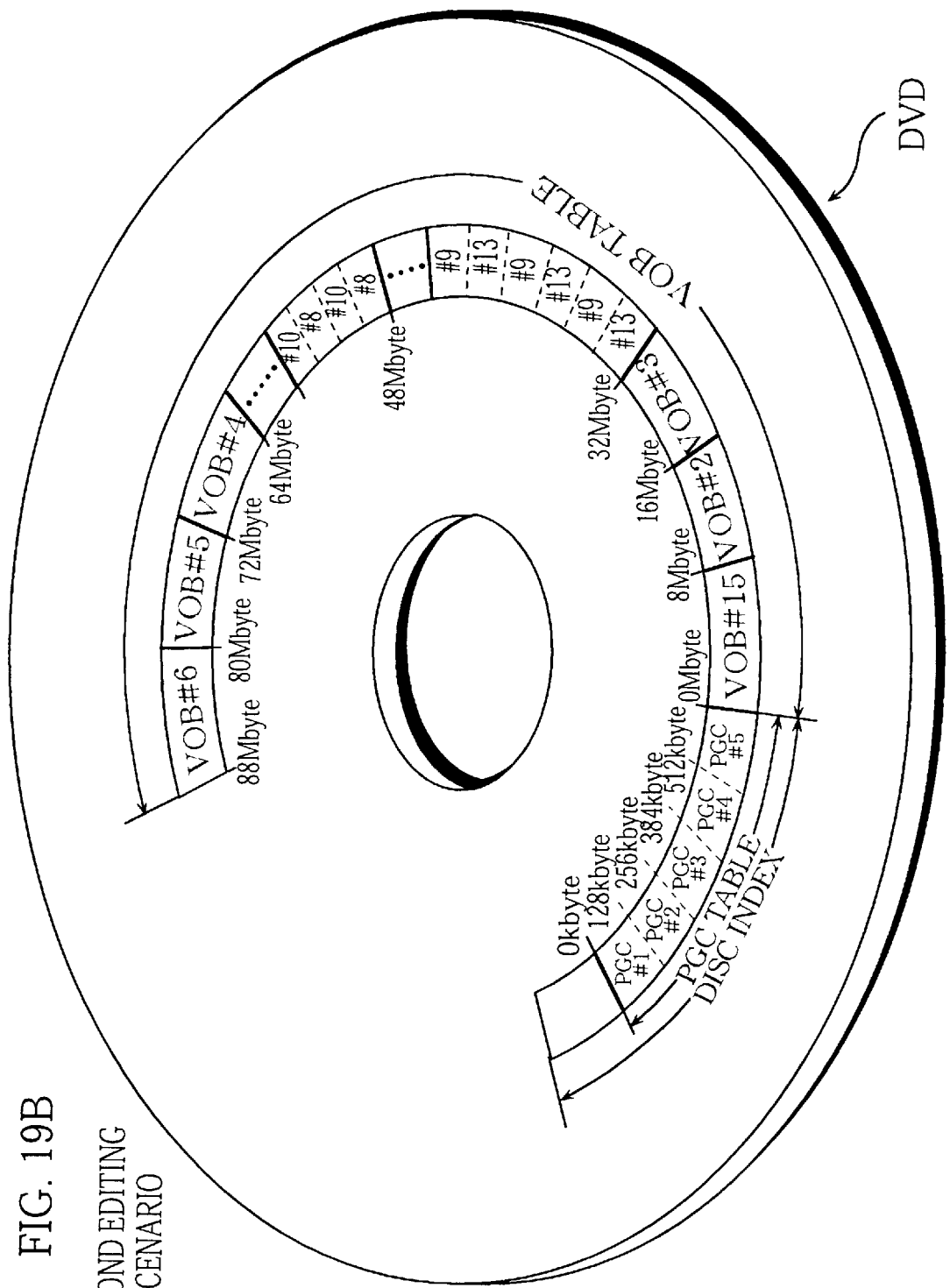
FIG. 19B is a schematic representation of DVD in which the bitstream for recording has been arranged after the second editing of the reproduction scenario.

FIG. 19B is a schematic representation of the DVD in which the bitstream for recording has been arranged after the second editing of the reproduction scenario. In the present drawing, the bitstream for recording is stored in the curving area on the spiral track. The drawing also shows that PGC information #1–#5 and VOBs #15, #2, #3, #13, and #9 are sequentially read as the DVD is rotated by the disc reproduction apparatus for reproduction.

3.7: Conclusion

As described above, the present embodiment enables the encoding process to be separated from the entire process. With this arrangement, the reproduction order of the VOBs can be changed, even for an exclusive reproduction block, after the generation of elementary streams.

When the temporary reproduction order of the VOBs in an exclusive reproduction block, which is determined during elementary encoding, is changed, the synchronization between Audio and Video is maintained by, immediately before the interleave process, re-generating the audio elementary streams for the changed VOBS.

Chapter 4: Detailed Description of Terms

*note 1: Encoding with a Reduced Bit Rate

The bit rate of the video information included in VOBs for the interleave blocks should be smaller than that of the ordinary VOBs. The "bit rate" mentioned here indicates the amount of digital data assigned to compressed images of a certain time period. With a reduced bit rate, the digital data is compressed to image data of a smaller amount, and of course, the quality of the image is deteriorated in some degrees. The reason for reducing the bit rate is that the VOB interleave block is reproduced by repeating disc seeks. In the seek operation, the pickup moves on the disc to read data. The time taken by the seek operation is called a seek time or a seek wait. It is needless to say that data is not read from the disc during the seek operation.

For the above reason, the data fetch and transfer rate of the disc reproduction apparatus decreases during the interleave block. As a result, the video elementary streams with the seamless flag ON need be encoded with a reduced bit rate since the video elementary streams may be used in the VOB interleave block. More particularly, the data fetch and transfer rate is reduced to about 8 Mbps during reproduction of the VOB interleave block from about 10 Mbps of the ordinary reproduction. The bit rate of the video data is reduced in accordance with the data fetch and transfer rate. Note that the value "10 Mbps" is determined based on the jump performance of the optical pickup and the buffer capacity of the reproduction apparatus. Practically, a plurality of pieces of audio data and sub-picture data are also interleaved into each VOB as well as the video data. Accordingly, the bit rate of the video information is determined in consideration of the bit rates of these kinds of data. For example, for five pieces of audio information with a bit rate of about 200 Kbps and 32 pieces of sub-picture information with a bit rate of about 20 Kbps, the bit rate for these pieces of data is 1.64 Mbps (200×5+20×32=1,640). In this case, the bit rate of the ordinary video information is 8.36 Mbps (10−1.64=8.36); the bit rate of the video information for the VOB interleave block is 6.36 Mbps (8−1.64=6.36).

As described above, the bit rate of the VOB video information is determined in consideration of the number of pieces of audio and sub-picture information to be interleaved into the same VOB and whether the VOB may be used for the interleave block.

*note 2: Closed GOP

The "GOP" is the minimum unit in compressing/decompressing the video elementary streams. One GOP is composed of a set of serial pictures. Ordinary GOPs have correlation with components of the preceding and succeeding GOPs. However, closed GOPs do not have such correlation. It should be noted here that the reproduction can start from any GOP in the interleave block since the interleave block is composed of only closed GOPs.

*note 3: Interleaving into VOBs

The interleaving of compressed video and audio data into a VOB is described with reference to FIG. 15.

FIG. 15 shows video data sequences, audio data sequences, and sub-picture data sequences, as well as VOBs. These types of data conform to MPEG2 concerning with their compression method and data format.

The video data sequences are compressed serial data sequences. The video data sequences are represented in the present drawing as video1, video2, video3 . . . in units of GOPs (Group Of Pictures). The "GOP" is a unit in compressing/decompressing the video elementary streams. One GOP is composed of about 12–15 frames of video data, and corresponds to video data of about 0.5–1 seconds. The video data of one GOP is further divided into packs being 2 KB-units. The size of the pack, 2 KB, corresponds to the sector size of the DVD optical disc. That means, each pack of data is stored in a sector of the DVD.

The audio data sequence is composed of audio signals including the LR components of the stereo audio and the surround components. The audio data sequences are represented in the present drawing as audio A-1, audio A-2 . . . audio B-1, audio B-2 . . . audio C-1, audio C-2 . . . Each of these pieces of audio data is composed of one or more audio packs, each pack having 2 KB of data.

The sub-picture data sequence includes graphics. The sub-picture data sequences are represented in the present drawing as SP A-1, SP A-2 . . . SP B-1, SP B-2 . . . Each of these pieces of sub-picture data is composed of one or more sub-picture packs, each pack having 2 KB of data.

It should be noted here that in FIG. 15, the video, audio, and sub-picture data sequences are separately stored for the sake of convenience. However, practically, these types of data are stored alternately in units of packs.

*note 4: VOBU

"VOBU" is short for the VOB unit which is the minimum unit including the management information and other types of data. FIGS. 35A–35E show the data formats of the video, audio, and sub-picture data and the management information stored in packs to be interleaved into VOBs.

Each piece of data in VOBs is stored in a packet or a pack conforming to MPEG2. In the present embodiment, one pack at least includes a PES (Packetized Elementary Stream) packet. The management information pack is composed of two packets. Each of the video, audio, and sub-picture data pack is composed of one packet.

Each pack, having 2 KB, is composed of a pack header, a packet header, and a data field. The pack header indicates the start of a pack. The packet header indicates the start of a packet. The pack header and the packet header are not detailed here since they conform to MPEG2. Here, the synchronization information for the reproduction of packs and information concerning with data types are described below.

The pack header includes SCR (System Clock Reference) as synchronization information for reproduction. The packet header includes PTS (Presentation Time Stamp) and DTS (Decoding Time Stamp). The DTS indicates a time when the video or audio data in the packet is decoded. The DPS indicates a time when the decoded video or audio is output. The SCR provides the standard time for the PTS and DTS.

The relationships between the SCR, PTS, DTS, and the reproduction apparatus are described as follows. The reproduction apparatus has a clock (STC) inside. The reproduction apparatus resets the clock by referring to the SCR of the first pack of a VOB after reading the VOB from a disc and storing the VOB in a buffer. The reset clock is updated over time. The reproduction apparatus transfers a pack from the buffer to the decoder when the value of the clock matches the SCR of the pack. The docoder docodes the transferred pack when the DTS of the packet of the pack matches the value of the clock. The pack is then output when the PTS of the pack matches the value of the clock.

The SCR is set so that the pack transfer rate is 8 Mbps for the interleave VOBs, namely, VOBs whose interleave flag in the connection relation information is ON. The SCR is set so that the pack transfer rate is 10 Mbps for the other VOBs.

Now, the information concerning with data types is described.

The "stream ID" field, having an eight-bit length, in the packet header indicates which of the video packet, private packet, and MPEG audio packet the present packet is. The video packet includes a video data sequence. The private packet is defined by the MPEG2 standard to store arbitrarily defined data. In the present embodiment, the private packet 1 is defined to store audio or sub-picture data and the private packet 2 is defined to store the management information.

The private packet 1 further includes a sub-stream ID field. The sub-stream ID field, having an eight-bit length, indicates either of audio or sub-picture data. For the private packet 1, eight types of audio data, #0–#7, can be set at maximum for each of the linear PCM method and the AC-3 method, and 32 types of sub-picture data, #0–#31, can be set at maximum.

The data field stores video data compressed with the MPEG2 method, audio data compressed with the linear PCM method, AC-3 method, or the MPEG method, and sub-picture data being graphics data compressed with the run-length method.

*note 5: PCI packet, *note 8: DSI packet

Figure 35A:
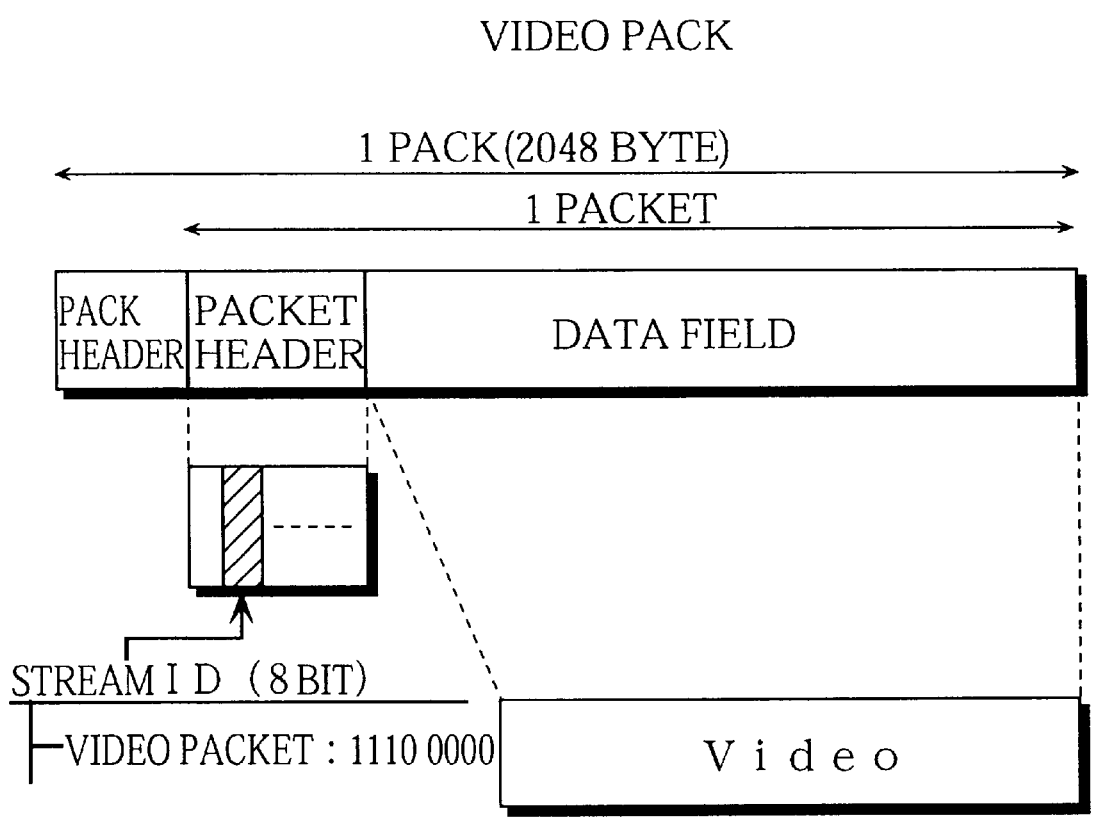
FIG. 35A shows a format of the video pack.
Figure 35B:
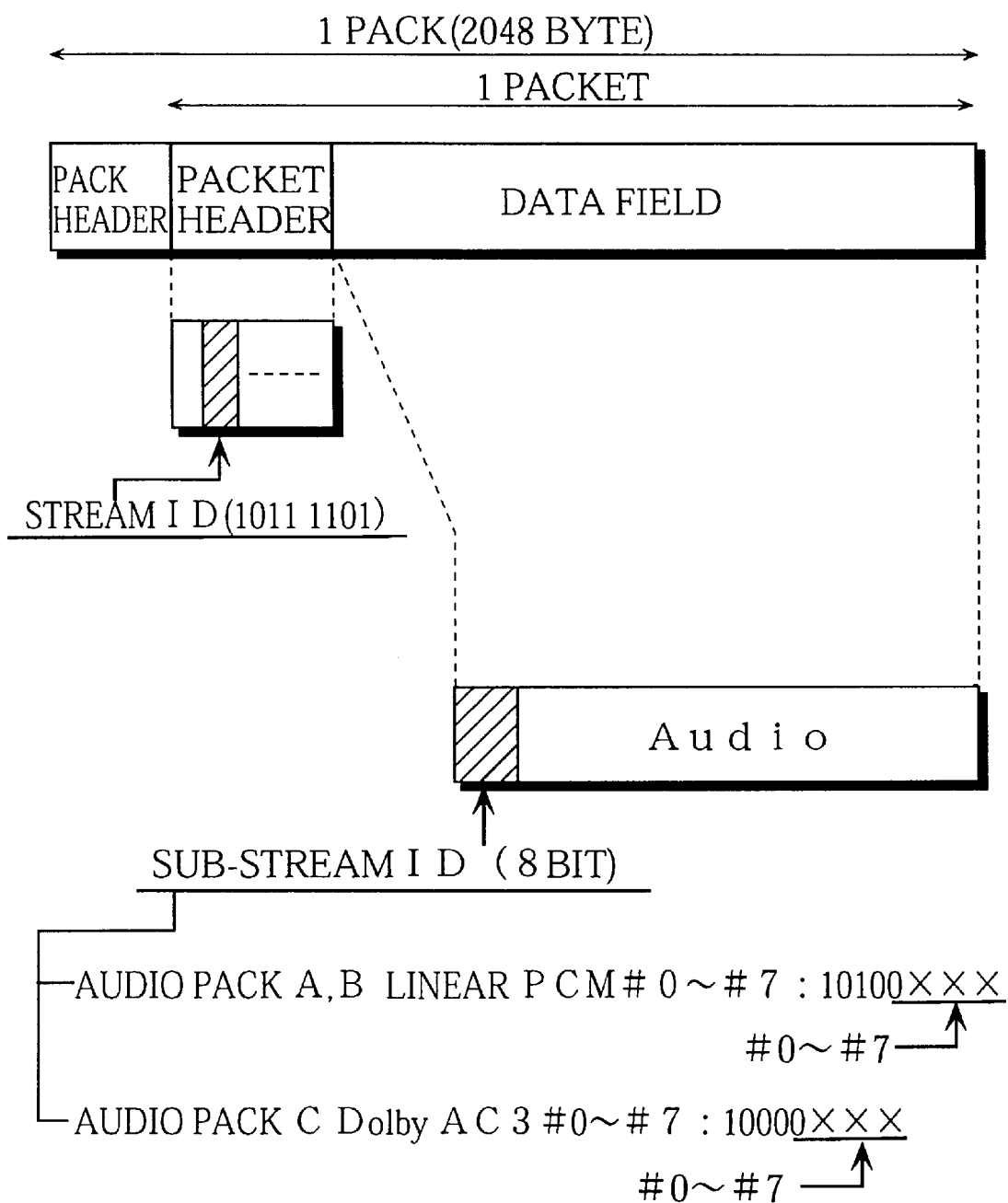
FIG. 35B shows a format of the audio pack.
Figure 35D:
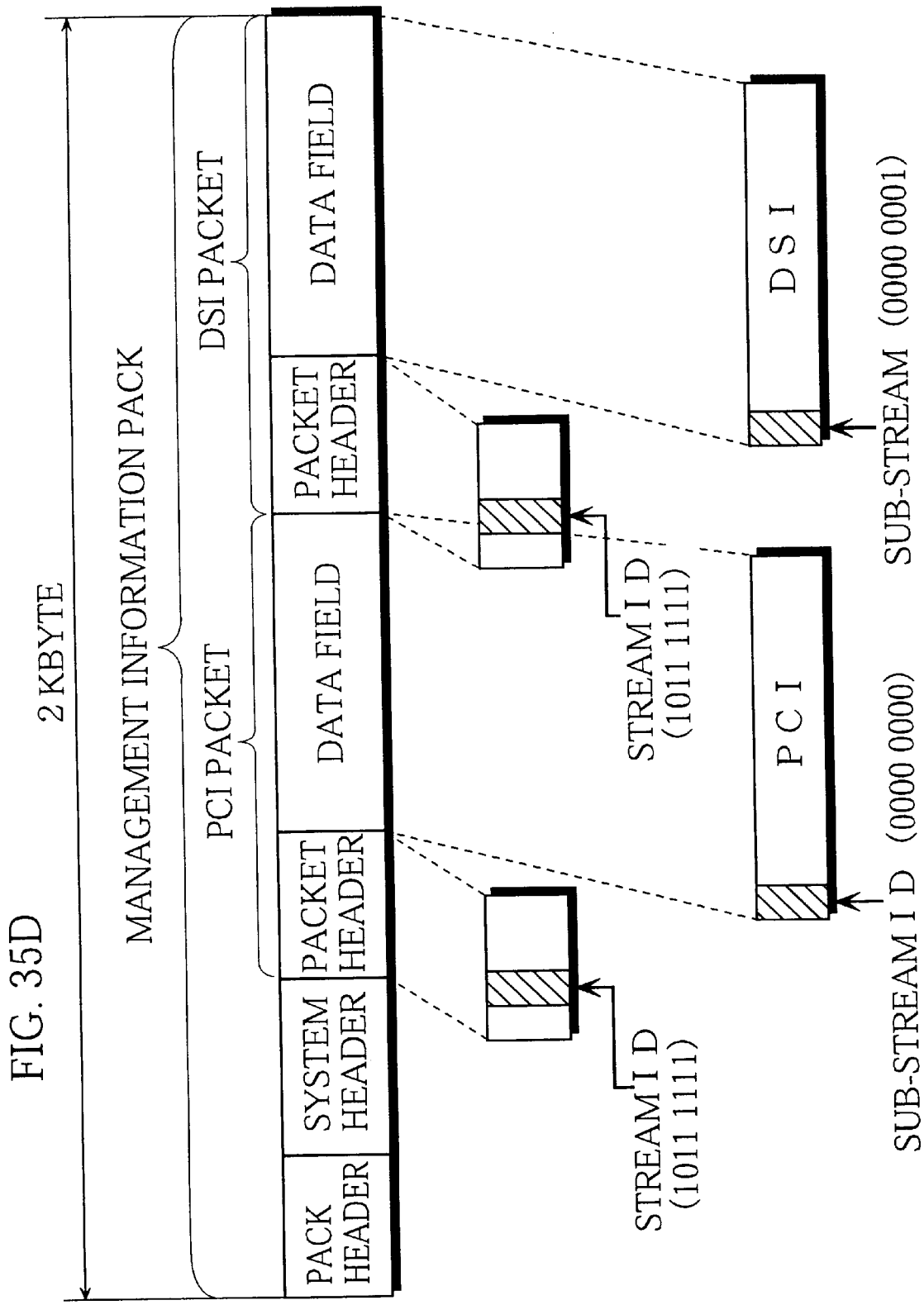
FIG. 35D shows a format of the management information pack.

As shown in FIG. 35D, the management information pack includes two types of packets, the PCI (Presentation Control Information) packet and the DSI (Data Search Information) packtet. The PCI packet includes control information used to achieve interactive reproductions in response to an instruction input from the producer. The DSI packet includes control information used to achieve special reproductions such as "fast forward."

*note 6: Transfer Process

The transfer process basically denotes a process in which the audio components concentrating at the end of one VOB are transferred to the start of the next VOB in the seamless reproduction. This process is performed to change the display rates in sequential reproduction of video objects.

More particularly, the audio components concentrating at the end of the audio data to be included in one VOB are cut and the cut audio components are added to the start of the audio data to be included in the next VOB, which is also called a correction process. In the above correction process, the audio components that are arranged behind the last video component in the VOB are cut.

Now, the reason for performing the correction process is described below with reference to FIG. 36.

Figure 36:
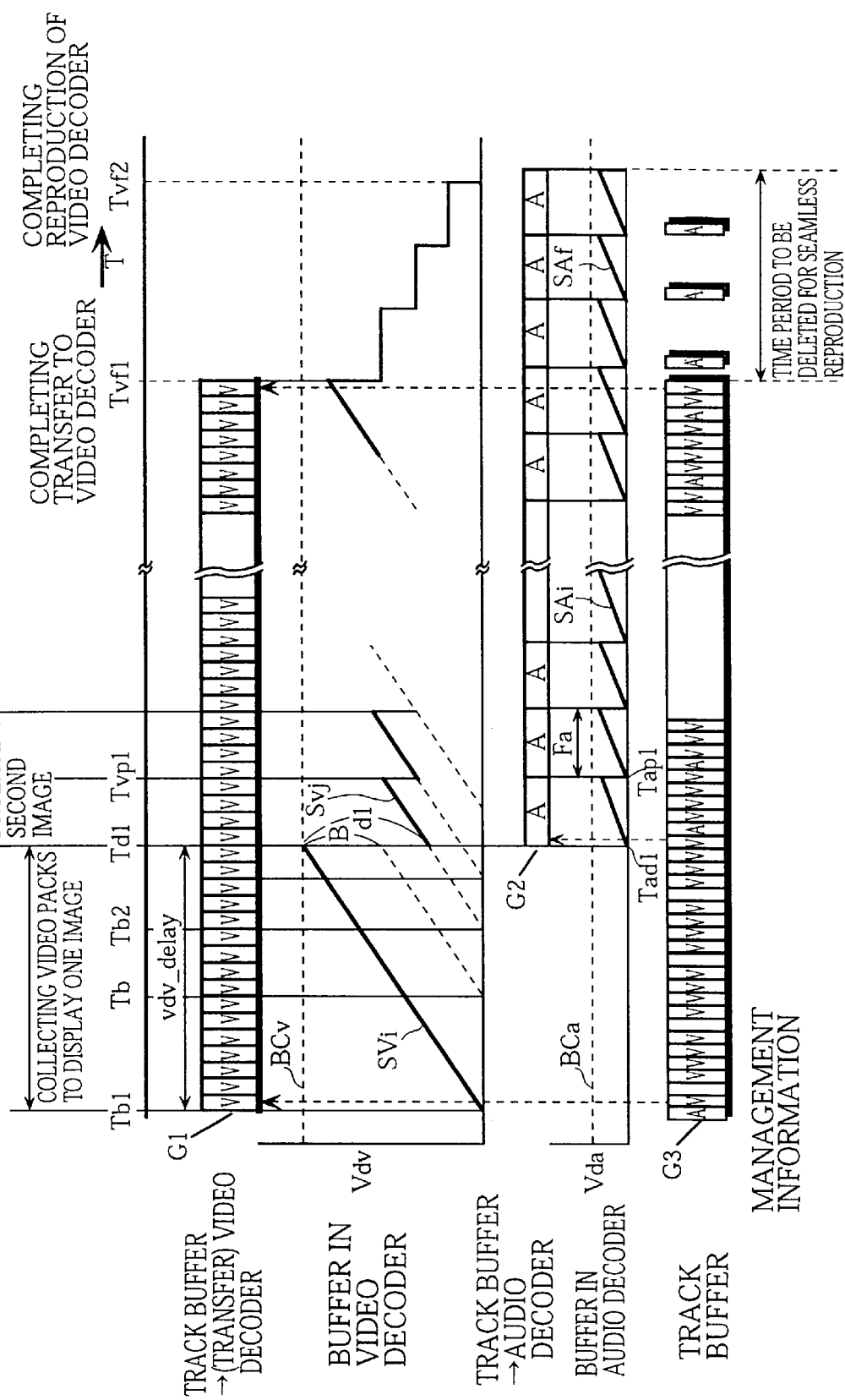
FIG. 36 is a schematic representation of the transfer of video and audio packs in the disc reproduction apparatus.

FIG. 36 is a schematic representation of the transfer of VOB packs from the track buffer. The drawing is used to explain the timing of the transfer and the change of the buffering amount for video and audio decoders. Note that in the disc reproduction apparatus, the video, audio, and sub-picture decoders are implemented on the AV decoder unit. Accordingly, the AV decoder unit is a generic name of decoders of the disc reproduction apparatus. In FIG. 36, G3 represents the track buffer storing VOBs. G1 represents video packets transferred from the track buffer of G3 to the video decoder. G2 represents audio packets transferred from the track buffer of G3 to the audio decoder. G1, G2, and G3 are on the same time axis which is shown above G1. The small rectangles in G3 represent packs. The first pack of the VOB shown in G3 is the management information pack. The packs with character "TV" represent video packs. The packs with character "A" represent audio packs. Each pack in G3 is transferred to the AV decoder unit when the SCR of the pack header matches the system clock (STC) of the reproduction apparatus. The packs input into the AV decoder are classified into video, audio, and sub-picture. These packs are input to the video, audio, and sub-picture decoders, respectively. The STC is reset by the SCR of the first pack of each VOB.

G1 represents video packets input from the system decoder into the buffer in the video decoder. The small rectangles represent packets. The area below G1 is a graph showing the amount of data stored in the buffer in the video decoder. In other words, the graph shows the buffer consumption amount. The buffer consumption amount increases as the number of stored video packets increases and decreases as the data is decoded to be output as images. As understood from FIG. 36, the video packs for the first image are stored in the buffer during times Tb1–Tb2. At the same time, the number of stored video title sets increases as indicated by slant line SVi. At time Td1 when the video pack data is decoded and output, the number of stored video packs decreases by d1.

The video packs for the second image are stored in the buffer during a period between times Td1–Tvp1. At the same time, the number of stored video packs increases as indicated by slant line SVj. SVj is smaller than Svi. This is because only the difference between the first and the second images is decoded when the second image is decoded.

The transfer of all the video packets in G1 is complete at time Tvf1. The decoding and output of these video packets are complete at time Tvf2. As described above, there is a time lag between the transfer completion time and the data output completion time in the video decoder. That means, there is a wait time between the start of transferring a VOB from the track buffer to the AV decoder and the actual display of the second image. In FIG. 36, the wait time is a period between times Tbf1 and Tbf2. On the other hand, after the transfer is complete, the image output continues. In the example of the present drawing, after the transfer of the video packets is complete at time Tvf1, the image output using the data stored in the buffer continues until time Tvf2.

G2 represents audio packets input from the system decoder into the buffer in the audio decoder. The small rectangles represent packets. The area below G1 is a graph showing the amount of data stored in the buffer in the audio decoder. The relationship between the buffer consumption amount and the number of stored audio packets is the same as the video decoder. The data input at time Tad1 is output at time Tap1. It should be noted here that the buffer in the audio decoder has a capacity far smaller than that of the video decoder. As a result, the audio data is not stored in the buffer with the same timing as the video data. Hence, the audio data is interleaved in VOBs so that the audio data is input into the audio decoder with a timing immediately before the corresponding video data is output. This is why no audio packs are arranged around the start of the VOB of G3. The first audio pack starts to be transferred to the audio decoder arranged at time Td1 when the first image is displayed. On the other hand, audio packs for storing the audio data corresponding to the image having been transferred to the video decoder by the time Tvf are arranged at the end of the VOB of G3.

As understood from the above description, generally, audio packs gather at the end of a VOB. The next VOB is not processed until all the audio packs at the end of the current VOB are transferred even if all the video packs of the current VOB have been transferred.

For the reason described above, the system encode unit 16 transfers the audio packs concentrating at the end of one VOB to the next VOB. It should be noted here that this process is available due to the establishment of the VOB route information. For achieving branches from the routes, special processes are further required. For example, for the VOB connection relation information shown in FIG. 7A, certain processes should be performed for VOBs v#3, #7, and #9 which relate to the reproduction at a branch point, and VOBs v#8, V#10, and v#4 which relate to the reproduction at a merge point. For the reproduction at a branch point, the reproduction proceeds from VOB v#3 to either of VOB #7 and VOB #9. Therefore, the audio packs concentrating at the end of VOB v#3 are sent to the starts of both VOB #7 and VOB #9. As for the reproduction at a merge point, the reproduction proceeds from either of VOB #v4 and VOB #v8 to VOB #v4. Therefore, it is not available to simply transfer the audio packs concentrating at the end of one VOB to the start of the next VOB. As a result, all the GOPs of the merge point, VOB #v4, are transferred to the ends of VOBs #v8 and #v10. This makes both images immediately before the transfer the same. With this arrangement, the same image is; reproduced at the end of VOBs #v8 and #v10 when the reproduction proceeds from either of them to VOB V#4. After this process, audio packs are transferred in the same way.

*note 7: VOB Interleave with Interleave Units

The VOB interleave with interleave units is indispensable for achieving the seamless reproduction.

The seamless reproduction of two different VOBs is achieved in spite of the occurrence of the disc seek if the buffer of the reproduction apparatus has a sufficient capacity. That is, images are displayed without gaps if the disc seeks end and the first screen of the next image is prepared before the data stored in the buffer has been reproduced. The maximum distance in the disc seek for achieving the seamless reproduction, namely, the physical distance between VOBs arranged on the disc is obtained from the buffer capacity. That is, the VOBs for the seamless reproduction need be arranged within the maximum seek distance. However, all the disc reproduction apparatuses are not necessarily be equipped with a memory with sufficient capacity. Especially, commercial AV apparatuses used as the disc reproduction apparatuses are subject to a strict restriction on the capacity of the memory. As a result, the maximum seek distance is about 10,000 sectors in case of such commercial AV apparatuses. 10,000 sectors correspond to 20 MB. It cannot be said that this value is great from the viewpoint of the achievement of the seamless reproduction.

The reason for the above statement is that the maximum seek distance corresponds to image reproduction time of only about 40 seconds when the bit rate of the video information is set to 4 Mbps. Even when only two types of video data are provided as options for the exclusive reproduction, each option is reproduced for only about 40 seconds.

To achieve seamless, exclusive reproduction, each VOB is divided into interleave units which each have about one second, and all interleave units of the VOBs for the exclusive reproduction are alternately stored in a disc. The section on the disc alternately storing interleave units is called the interleave block. Note that VOBs themselves are interleaved based on MPEG. Accordingly, interleaving of VOBs are called the VOB interleave to be differentiated from the interleave block. By the above division of each VOB into interleave units, the maximum of eight VOBs for the exclusive reproduction are stored within the seek distance with which the seamless reproduction is possible in DVD. FIG. 33 shows how images are encoded based on the ON/OFF of the seamless flag. As shown in FIG. 33, the image information with the seamless flag OFF is encoded into a plurality of interleave units which each have one second.

*note 9: Bitstream for Recording

In the present embodiment, it is defined that the authoring apparatus creates data called a "video title set." The video title set is a unit including a plurality of video work titles. Each video title set includes a plurality of pieces of video information and information for controlling the reproduction of the plurality of pieces of video information. Note that it is desired that the plurality of titles in a video title set are managed together. In one method, for example, a plurality of titles having the same images in common are included in one video title set. In case of film applications, for example, various versions, such as a TV broadcast version and a theater version, of the same film are managed in one title set.

*note 10: Disc Index

The disc index used in the present embodiment is defined as information unique to "video title set management information" which is uniquely used for the video title set. The video title set management information includes a video title set management table, title search pointer management information, and a program chain information table.

The video title set management table shows the index, namely, the internal construction, of the video title set management information, such as information or tables included in the management information.

The program chain information table includes a plurality of pieces of program chain information, and a plurality of program chain attributes corresponding to respective pieces fo program chain information. The whole program chain attributes are called an attribute table.

The title search pointer management information is an index showing relationships between each title and each of a plurality of PGCs included in a video title set.

Chapter 5

The above embodiment describes a system only as an example that is considered to show the best effects at present. However, the present embodiment can be modified as follows:

(a) The process management unit 17 of the present embodiment extracts audio elementary streams for the VOBs which may generate a time lag obstructing synchronization. However, this process may be replaced by another process as far as conditions on the audio data are satisfied when it is reproduced in accordance with the edited reproduction scenario. Alternatively, the encode parameters may be processed.

In the present embodiment, the process management unit 17 transfers audio components between VOBs and performs the VOB interleave for the exclusive reproduction after the reproduction scenario has been edited. This process is also performed so that conditions on the audio data are satisfied when it is reproduced in accordance with the edited reproduction scenario. Accordingly, this process may also be replaced by another process.

(b) In the present embodiment, the authoring apparatus creates video works for the DVD as the recording medium. However, the apparatus may create video works for digital broadcasting in which MPEG streams are broadcast in the satellite broadcasting. In achieving this, a method, such as the frequency interleave method or the time-axis interleave method, is used to transmit a plurality of MPEG streams while keeping the MPEG streams available for the exclusive reproduction. In the time-axis interleave method, transmission of an MPEG stream for the exclusive reproduction is waited for, and the MPEG stream is reproduced with the transmission timing.

(c) In the present embodiment, the VOB access table in the PGC information stores address information which includes addresses of VOBs, and the disc reproduction apparatus reads the VOB based on the information. However, a part of the area recording each VOB may be written into the VOB position information so that a part of each VOB is read through the optical pickup. The part of the VOB is called a "cell." With such an arrangement, only a part of each VOB can be used effectively, improving the efficiency of using the video material.

(d) In the present embodiment, the sub-picture data is the image data of sub-titles. However, the sub-picture may be vector graphics or three-dimensional computer graphics (CG). By using such image data, it is possible to provide a game which is composed of a combination of compressed moving pictures taken on a spot and CG.

(e) In the present embodiment, one VOB unit corresponds to one GOP. However, one VOB unit may be composed of two or three GOPs as far as the time taken for reproducing the video of the VOB unit is about one second. In this case, the management information pack is arranged at the start of a plurality of consecutive GOPs, the management information pack including reproduction control information effective on the plurality of consecutive GOPs.

(f) In the present embodiment, the audio data is PCM data or AC-3 data. However, the audio data may be of another type as far as it can be interleaved into the system stream. For example, the audio data may be compressed PCM data, MPEG audio data, or MIDI data.

(g) In the present embodiment, the video data is digital video data based on the MPEG2 method. However, the video data may be of another type as far as it can be interleaved together with the audio and sub-picture data. For example, the video data may be digital video data based on the MPEG1 method. Alternatively, the video data may be digital data for which a conversion algorithm other than the DCT (Discrete Cosine Transform) is used.

(h) In the present embodiment, the management information pack is included in each GOP which is the unit of video reproduction. However, it will be obvious that when the compression method changes to another one, the management information pack is included in the unit unique to the method.

(i) A recording medium recording a machine-language program of the procedures of the data input unit 13, edit unit 15, system encode unit 16, process management unit 17, and disc format convert unit 18 (refer to FIGS. 24A–32B) may be marketed. For example, recording mediums such as an IC card, optical disc, and floppy disk can be used for this purpose. The machine-language programs recorded in such mediums are installed into generic computers for use. The computers achieve the function of the authoring apparatus described in the present embodiment by sequentially executing the installed programs.

INDUSTRIAL USE POSSIBILITY

As apparent from the above description, the method and apparatus of the present invention for generating bitstream help producers create film applications of a multi-version type in which different versions are managed together, where the different versions include, for example, versions with a viewing limitation differently imposed on adults and children, versions with different camera angles, versions for theaters, and versions for TV broadcasting. Accordingly, the present invention is effective in marketing such film applications of the multi-version type.

Also, the method and apparatus of the present invention for generating bitstream are effective in creating optical discs storing film applications of a multi-version type for commercial AV apparatuses which are not expensive and have a limitation on the capacity of the memory installed in the apparatuses.

What is claimed is:

1. A bitstream generation apparatus for generating a bitstream including a plurality of video objects to be stored in an information recording disc, the bitstream generation apparatus comprising:

a video encoder for encoding a plurality of pieces of input video information to obtain a plurality of pieces of video data;

an audio encoder for encoding a plurality of pieces of input audio information to obtain a plurality of pieces of audio data;

a recording means for recording the plurality of pieces of video data and the plurality of pieces of audio data;

a receiving means for receiving pairs of video data and audio data, among the plurality of pieces of video data and the plurality of pieces of audio data recorded in the recording means, where each pair of video data and audio data are to constitute a different one of the plurality of video objects;

an editing means for editing reproduction route information, in accordance with an instruction from an operator, the reproduction route information indicating a reproduction order of the plurality of video objects when the information recording disc is reproduced by a reproduction apparatus;

an interleaving means for interleaving the pairs of video data and audio data to obtain the plurality of video objects;

a generating means for generating the bitstream by sequentially arranging the plurality of video objects in accordance with the reproduction route information; and a first correcting means for, during a period after the editing means edits the reproduction route information and before the interleaving means completes interleaving, cutting a last block from audio data which is to constitute a video object and adding the cut block to the start of audio data which is to constitute another video object that is to be reproduced following the video object.

2. The bitstream generation apparatus of claim 1, wherein the reproduction route information includes specification information specifying the video object and link information of the next video object, and the first correcting means cuts one or more blocks located at the end of a piece of audio data which is to constitute a link source video object which links to a plurality of link destination video objects and adding the cut blocks to the start of other pieces of audio data which are to constitute the plurality of link destination video objects.

3. The bitstream generation apparatus of claim 2, wherein the correcting means includes:

a second correcting means for cutting one or more blocks located at the start of each piece of video and audio data which are to constitute a link destination video object which is linked from a plurality of link source video objects and adding the cut blocks to the end of other pieces of video and audio data which are to constitute the plurality of link source video objects, wherein the first correcting means (a) cuts one or more blocks located at the end of a plurality of pieces of audio data which are to constitute the plurality of link source video objects and have been corrected by the second correcting means and (b) adds the cut blocks to the start of another piece of audio data which is to constitute the link destination video object and has been corrected by the second correcting means.

4. The bitstream generation apparatus of claim 1, wherein each of the plurality of pieces of audio data obtained by the audio encoder uniquely includes a reproduction start time and a reproduction end time, and the first correcting means includes an adjusting unit for, based on a reproduction end time of a piece of audio data which is to constitute a video object, adjusting a reproduction start time of a piece of audio data which is to constitute a next video object.

5. A bitstream generation method for generating a bitstream including a plurality of video objects to be stored in an information recording disc; the bitstream generation method comprising:

a video encoding step for encoding a plurality of pieces of input video information to obtain a plurality of pieces of video data;

an audio encoding step for encoding a plurality of pieces of input audio information to obtain a plurality of pieces of audio data;

a receiving step for receiving pairs of video data and audio data, among the plurality of pieces of video data and the plurality of pieces of audio data, where each pair of video data and audio data are to constitute a different one of the plurality of video objects;

an editing step for editing reproduction route information in accordance with an instruction from an operator, the reproduction route information indicating a reproduction order of the plurality of video objects when the information recording disc is reproduced by a reproduction apparatus;

an interleaving step for interleaving the pairs of video data and audio data to obtain the plurality of video objects;

a generating step for generating the bitstream by sequentially arranging the plurality of video objects in accordance with the reproduction route information; and a first correcting step for, during a period after the editing means edits the reproduction route information and before the interleaving means completes interleaving, cutting a last block from audio data which is to constitute a video object and adding the cut block to the start of audio data which is to constitute another video object that is to be reproduced following the video object.

6. A computer-readable recording medium recording a program which allows a computer to generate a bitstream including a plurality of video objects to be stored in an information recording disc, the program allowing the computer to execute:

a video encoding step for encoding a plurality of pieces of input video information to obtain a plurality of pieces of video data;

an audio encoding step for encoding a plurality of pieces of input audio information to obtain a plurality of pieces of audio data;

a receiving step for receiving pairs of video data and audio data, among the plurality of pieces of video data and the plurality of pieces of audio data, where each pair of video data and audio data are to constitute a different one of the plurality of video objects;

an editing step for editing reproduction route information in accordance with an instruction from an operator, the reproduction route information indicating a reproduction order of the plurality of video objects when the information recording disc is reproduced by a reproduction apparatus;

an interleaving step for interleaving the pairs of video data and audio data to obtain the plurality of video objects;

a generating stop for generating the bitstream by sequentially arranging the plurality of video objects in accordance with the reproduction route information; and a first correcting step for, during a period after the editing means edits the reproduction route information and before the interleaving means completes interleaving, cutting a last block from audio data which is to constitute a video object and adding the cut block to the start of audio data which is to constitute another video object that is to be reproduced following the video object.

* * * * *